(12) United States Patent
Mashita et al.

(10) Patent No.: US 11,656,111 B2
(45) Date of Patent: May 23, 2023

(54) FLOWMETER, AND PHYSICAL QUANTITY MEASURING DEVICE

(71) Applicant: DENSO CORPORATION, Kariya (JP)

(72) Inventors: Hajime Mashita, Kariya (JP); Junzo Yamaguchi, Kariya (JP); Shinichi Kamiya, Kariya (JP); Akihumi Kurita, Kariya (JP)

(73) Assignee: DENSO CORPORATION, Kariya (JP)

( * ) Notice: Subject to any disclaimer, the term of this patent is extended or adjusted under 35 U.S.C. 154(b) by 198 days.

(21) Appl. No.: 17/150,326

(22) Filed: Jan. 15, 2021

(65) Prior Publication Data

US 2021/0164820 A1 Jun. 3, 2021

Related U.S. Application Data

(63) Continuation of application No. PCT/JP2019/028390, filed on Jul. 19, 2019.

(30) Foreign Application Priority Data

Jul. 20, 2018 (JP) .............................. JP2018-136646
Jul. 10, 2019 (JP) .............................. JP2019-128421

(51) Int. Cl.
*G01F 5/00* (2006.01)
*G01F 1/684* (2006.01)
*F02D 41/18* (2006.01)
*G01F 15/14* (2006.01)

(52) U.S. Cl.
CPC ........... *G01F 1/6847* (2013.01); *F02D 41/18* (2013.01); *G01F 15/14* (2013.01)

(58) Field of Classification Search
CPC ...... G01F 1/6847; G01F 15/14; G01F 15/006; G01F 15/043; G01F 1/69; G01F 5/00; G01F 1/6842; F02D 41/18
See application file for complete search history.

(56) References Cited

U.S. PATENT DOCUMENTS

| | | | |
|---|---|---|---|
| 9,658,092 B2 | 5/2017 | Frauenholz et al. | |
| 9,778,086 B2* | 10/2017 | Arai | G01F 15/006 |
| 10,408,656 B2* | 9/2019 | Briese | G01F 1/684 |
| 10,876,872 B2* | 12/2020 | Watanabe | G01F 1/684 |
| 2013/0061684 A1 | 3/2013 | Frauenholz et al. | |
| 2014/0331761 A1 | 11/2014 | Kaifu | |
| 2015/0192446 A1* | 7/2015 | Arai | B29C 66/232 |
| | | | 73/273 |
| 2016/0281659 A1 | 9/2016 | Kaifu | |

(Continued)

FOREIGN PATENT DOCUMENTS

| | | |
|---|---|---|
| DE | 10 2014 218 579 | 3/2016 |
| JP | 64-010127 | 1/1989 |

(Continued)

*Primary Examiner* — Freddie Kirkland, III
(74) *Attorney, Agent, or Firm* — Nixon & Vanderhye P.C.

(57) ABSTRACT

A flowmeter is configured to measure a flow rate of a gas flowing through a main passage. The flowmeter includes a housing and a flow rate detector. The housing is made of a resin and includes a bypass passage branched off from the main passage. The flow rate detector is disposed in the bypass passage and transmits detection signals in accordance with the flow rate of the gas flowing through the main passage. The housing includes a non-insulation portion including graphite.

16 Claims, 60 Drawing Sheets

(56) References Cited

U.S. PATENT DOCUMENTS

| | | |
|---|---|---|
| 2017/0343406 A1 | 11/2017 | Briese et al. |
| 2018/0187635 A1 | 7/2018 | Kaifu |
| 2018/0347524 A1 | 12/2018 | Kaifu |
| 2019/0120675 A1* | 4/2019 | Watanabe ............... G01F 1/684 |

FOREIGN PATENT DOCUMENTS

| | | |
|---|---|---|
| JP | 2000-320368 | 11/2000 |
| JP | 2003-238712 | 8/2003 |
| JP | 2008-24571 | 2/2008 |
| JP | 2011-106868 | 6/2011 |
| JP | 2014-196448 | 10/2014 |
| JP | 2017-150829 | 8/2017 |
| WO | 2019/049513 | 3/2019 |

\* cited by examiner

COOLING HEAT IN MOLDING (LATE COOLING)

FLOWMETER, AND PHYSICAL QUANTITY MEASURING DEVICE

CROSS REFERENCE TO RELATED APPLICATION

The present application is a continuation application of International Patent Application No. PCT/JP2019/028390 filed on Jul. 19, 2019, which designated the U.S. and claims the benefit of priority from Japanese Patent Application No. 2018-136646 filed on Jul. 20, 2018 and Japanese Patent Application No. 2019-128421 filed on Jul. 10, 2019. The entire disclosures of all of the above applications are incorporated herein by reference.

TECHNICAL FIELD

The present disclosure relates to a flowmeter, a physical quantity measuring device, and a method for manufacturing the physical quantity measuring device.

BACKGROUND

A flowmeter includes a housing that defines a bypass passage branched off from a main passage and a flow rate detector disposed in the bypass passage. The flow rate detector measures a flow rate of a fluid flowing through the main passage. An antistatic agent is added to resin material of the housing to restrict foreign matter wafting in the bypass passage from charging.

SUMMARY

A flowmeter is configured to measure a flow rate of a gas flowing thorough a main passage. The flowmeter includes a housing and a flow rate detector. The housing is made of a resin and includes a bypass passage branched off from the main passage. The flow rate detector is disposed in the bypass passage and transmits detection signals in accordance with the flow rate of the gas flowing through the main passage. The housing includes a non-insulation portion including graphite.

A physical quantity measuring device is configured to measure a physical quantity of a fluid. The physical quantity measuring device includes a housing, a physical quantity detector, and an electrical conductive portion. The housing includes at least a resin and defines a measuring passage through which the fluid flows. The physical quantity detector is configured to transmit detection signals in accordance with the physical quantity of the fluid flowing through the measuring passage. The electrical conductive portion is disposed on at least either one of an outer surface and an inner surface of the housing, contains a carbonized material to have an electric conductivity, and discharges an electric charge to a ground.

A method for manufacturing a physical quantity measuring device includes a preparing step and a heating step. The preparing step includes preparing a housing and a physical quantity detector. The housing defines a measuring passage through which a fluid flows and includes at least a resin. The physical quantity detector transmits detection signals in accordance with a physical quantity of the fluid flowing through the measuring passage. The heating step includes heating at least one of an outer surface and an inner surface of the housing to form an electrical conductive portion on the at least one of the outer surface and the inner surface such that an electric charge is discharged to a ground. The electric conductive portion contains a carbonized material to have an electrical conductivity.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
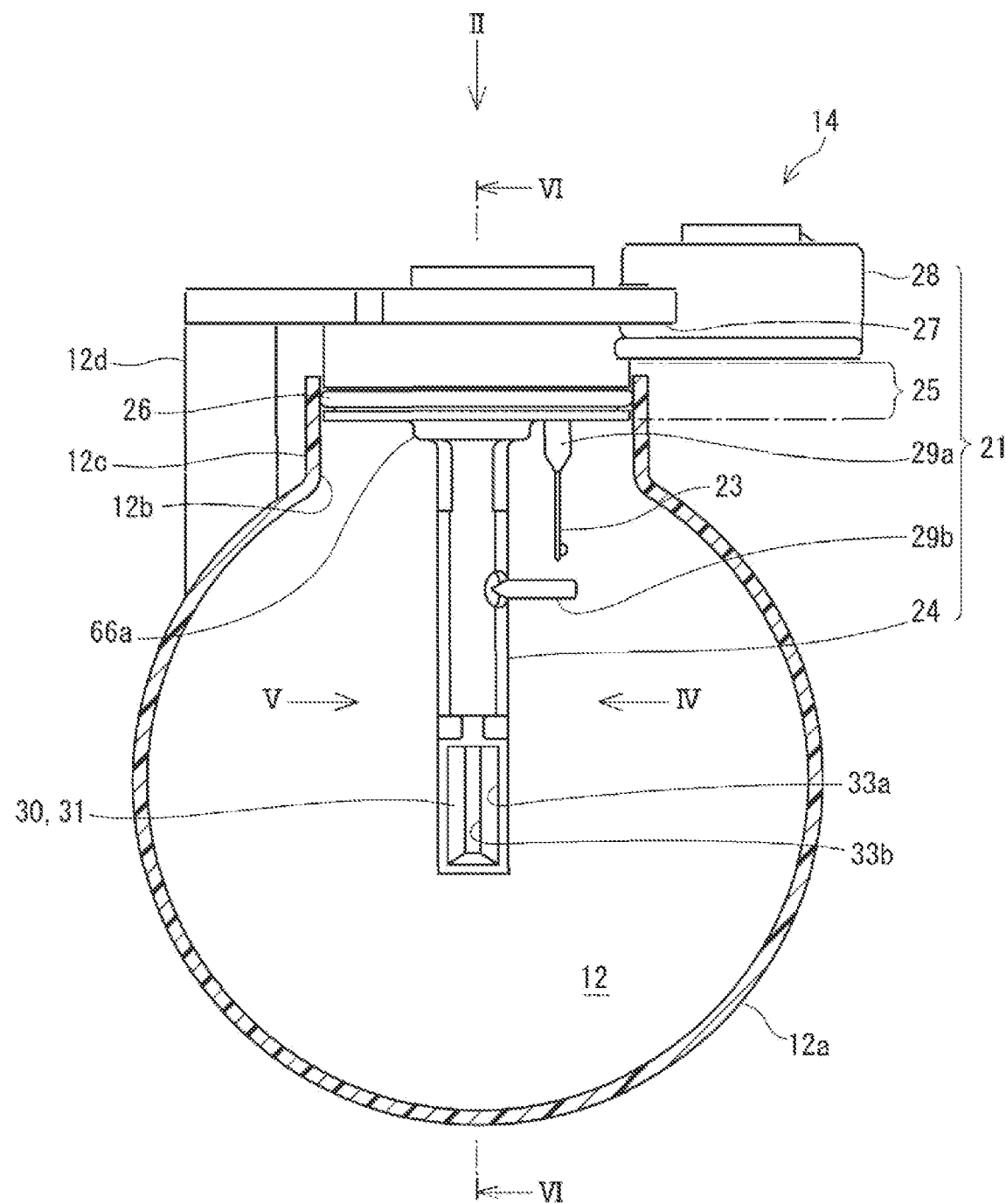
FIG. 1 is a schematic view of an air flowmeter in a first embodiment and an intake pipe to which the air flowmeter is attached.

To begin with, examples of relevant techniques will be described.

A flowmeter includes a housing that defines a bypass passage branched off from a main passage and a flow rate detector disposed in the bypass passage. The flow rate detector measures a flow rate of a fluid flowing through the main passage. When such flowmeter is used and foreign matters such as dusts wafting in the bypass passage are charged, the foreign matters may adhere to the flow rate detector. This may cause a difference of value detected by the flow rate detector.

An antistatic agent is added to resin material of the housing to restrict the foreign matter wafting in the bypass passage from charging.

However, when the housing contains the antistatic agent, an amount of resin used for the housing is decreased by an amount of the antistatic agent, which reduces a moldability of the housing.

The present disclosure is considered regarding above subjects and it is objective of the present disclosure to provide a flowmeter and a physical quantity measuring device that prevent a deviation in characteristic while keeping a moldability, and a method for manufacturing the physical quantity measuring device.

The flowmeter of the present disclosure includes a housing and a flow rate detector. The housing is made of a resin and includes a bypass passage branched off from a main passage. The flow rate detector is disposed in the bypass passage. The housing includes a non-insulation portion containing a graphite.

Since the housing includes the non-insulation portion containing the graphite, a charge of foreign matters such as dusts can be removed when the foreign matters get in contact with the housing. The non-insulation portion may be formed on a position with which the foreign matters are in contact or a position with which the foreign matters are not in contact. No matter where the non-insulation portion is located, the housing is polarized by including a portion having a non-insulation property. Thus, the foreign matters are restricted from adhering to the flow rate detector. Additionally, it is unnecessary to add antistatic agent to the resin of the housing. Thus, a moldability and a durability of the housing can avoid decreasing and a deviation in characteristic of the flowmeter can be reduced.

Preferably, the non-insulation portion is formed by converting a surface layer of a resin member with an electromagnetic wave and making the surface layer electric conductive. A part of the molecular structure of the resin member is converted into a graphite by irradiating the housing with the electromagnetic wave. Thus, the housing has an antistatic property. The housing is converted with energy of the electromagnetic wave as described above, thus only a desired portion of the housing can be converted. Therefore, the flowmeter is superior in processability.

The physical quantity measuring device of the present disclosure is a device configured to measure a physical quantity of a fluid. The physical quantity measuring device includes a housing, a physical quantity detector, and an electric conductive portion. The housing includes at least a resin and defines a measuring passage through which the fluid flows. The physical quantity detector is configured to transmit detection signals in accordance with the physical quantity of the fluid flowing through the measuring passage. The electric conductive portion is disposed on at least one of an outer surface and an inner surface of the housing, contains a carbonized material to have an electric conductivity, and discharge an electric charge to a ground.

A method for manufacturing the physical quantity measuring device of the present disclosure includes a preparing step and a heating step. The preparing step includes preparing a housing and a physical quantity detector. The housing defines a measuring passage through which a fluid flows and contains at least a resin. The physical quantity detector transmits detection signals in accordance with a physical quantity of the fluid flowing through the measuring passage. The heating step includes heating at least one of an outer surface and an inner surface of the housing to form an electric conductive portion on the at least one of the outer surface and the inner surface such that an electric charge is discharged to a ground. The electric conductive portion contains a carbonized material to have an electrical conductivity.

The electric conductive portion can remove the electric charge of foreign matters such as dusts that are in contact with the housing. Thus, a deviation in characteristics of the flowmeter can be reduced. Additionally, it is unnecessary to add an antistatic agent to a material of the housing, which causes an amount ratio of the resin in the housing to decrease. Therefore, the resin is kept sufficient and a moldability of the housing is restricted from impairing.

Various embodiments will be described with reference to the drawings. In the embodiments, substantially the same components are denoted by the same reference numerals and descriptions thereof are omitted.

First Embodiment

An air flowmeter 14 in FIG. 1 is disposed, for example, in a vehicle. The air flowmeter 14 is provided in an intake passage 12 as a main passage and measures physical quantities such as flow rate, temperature, humidity, and pressure of an intake air supplied into an internal combustion engine. The air flowmeter 14 is a physical quantity measuring device configured to measure a physical quantity of a fluid and corresponds to a flowmeter that measures an intake air as a gas.

The air flowmeter 14 is disposed at a position downstream of an air cleaner (not shown) and upstream of a throttle valve (not shown) in the intake passage 12. In this case, in the intake passage 12, the air cleaner is located at an upstream side of the air flowmeter 14 and a combustion chamber is located at a downstream side of the air flowmeter 14.

Figure 2:
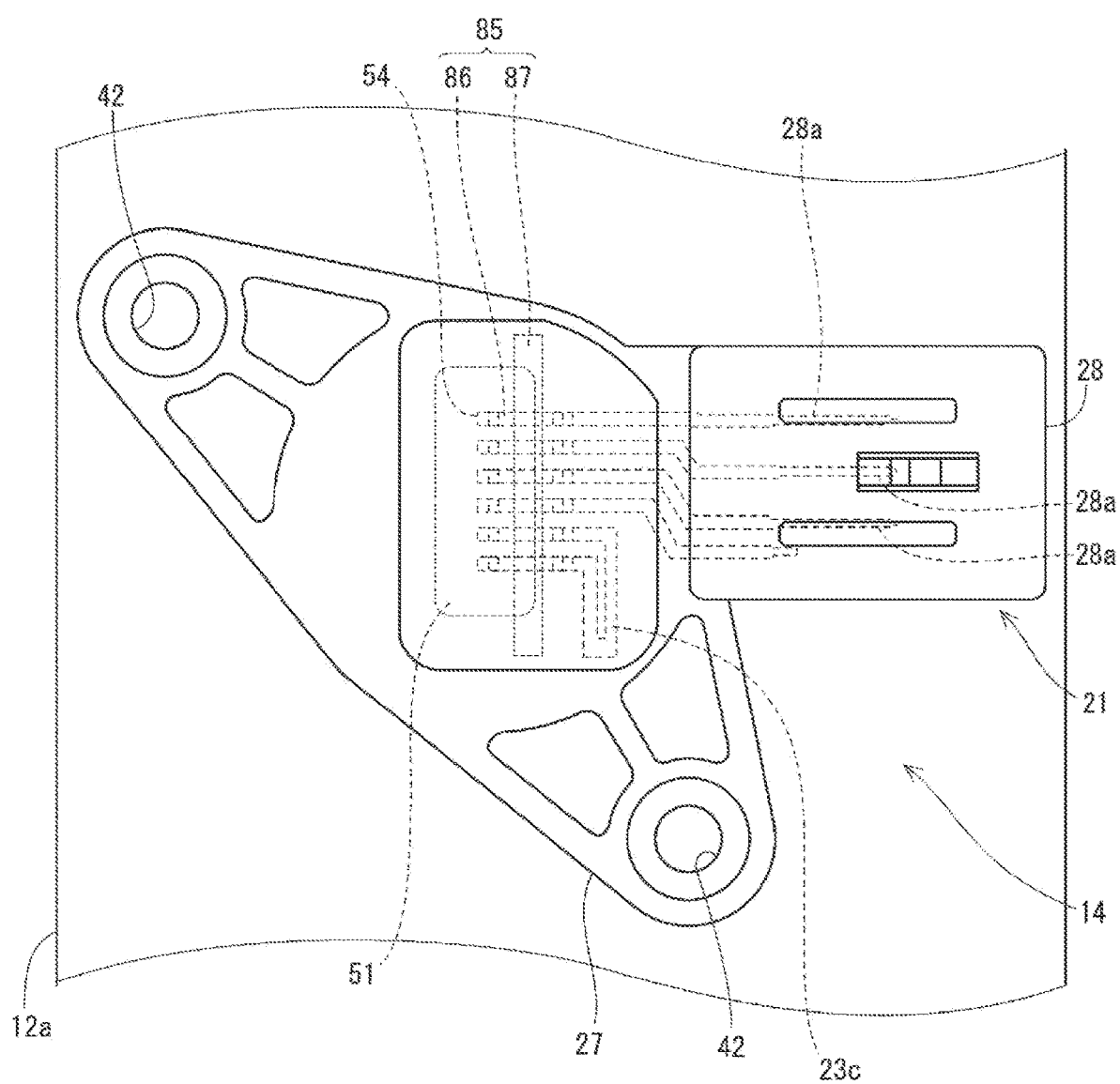
FIG. 2 is a schematic view of the air flowmeter in FIG. 1 in a direction of an arrow II.
Figure 3:
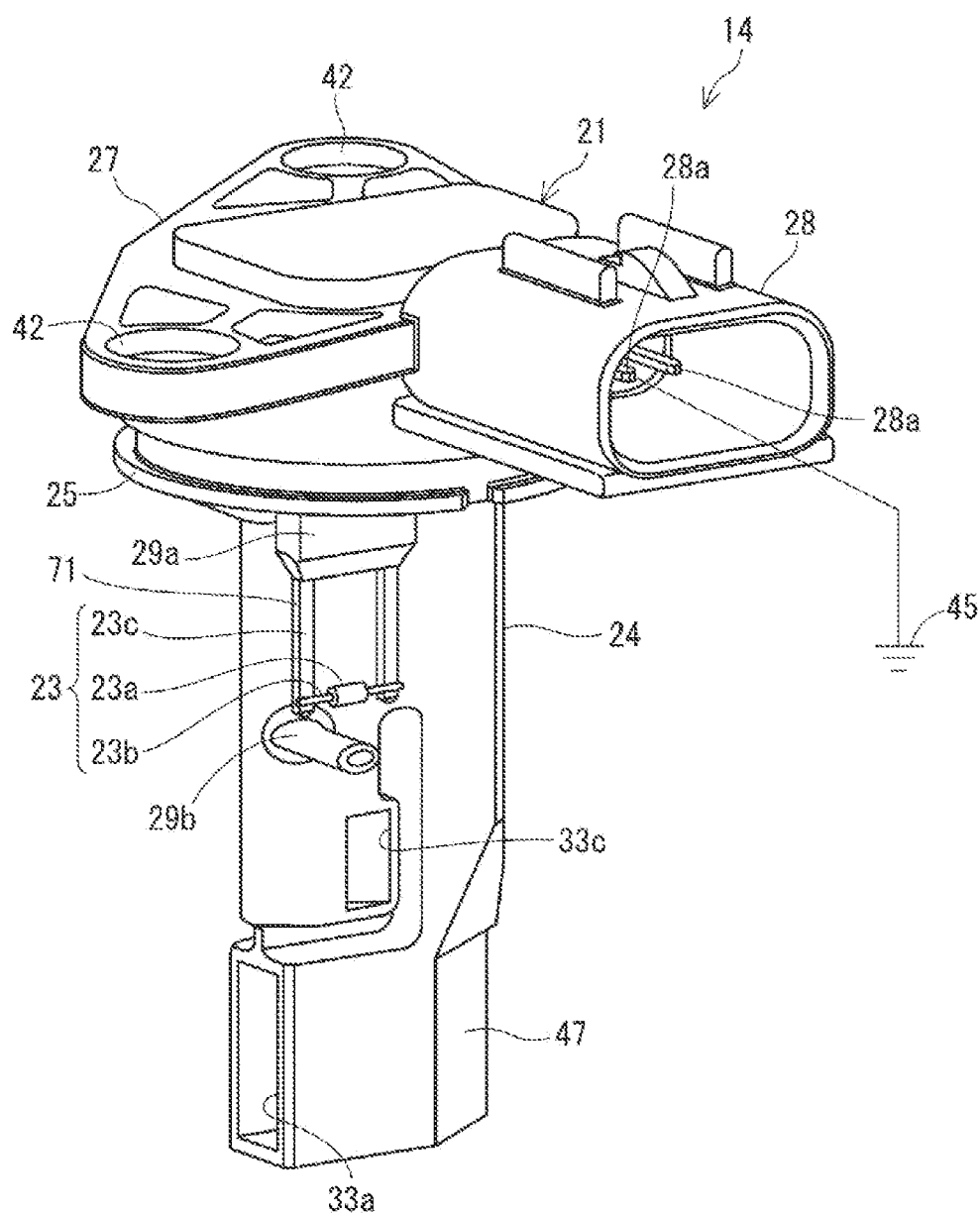
FIG. 3 is a perspective view of the air flowmeter in FIG. 1.
Figure 4:
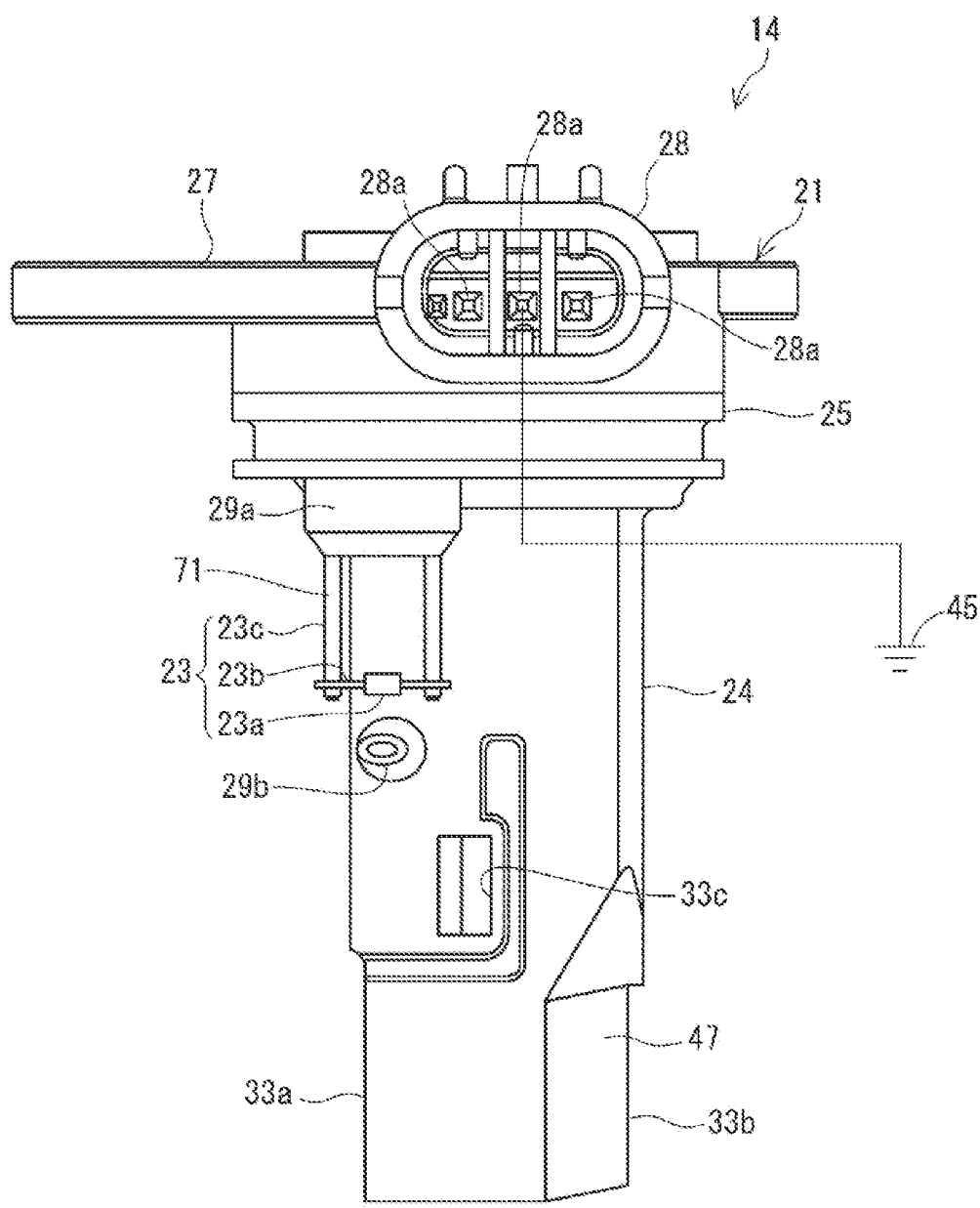
FIG. 4 is a schematic view of the air flowmeter in FIG. 1 in a direction of an arrow IV.
Figure 5:
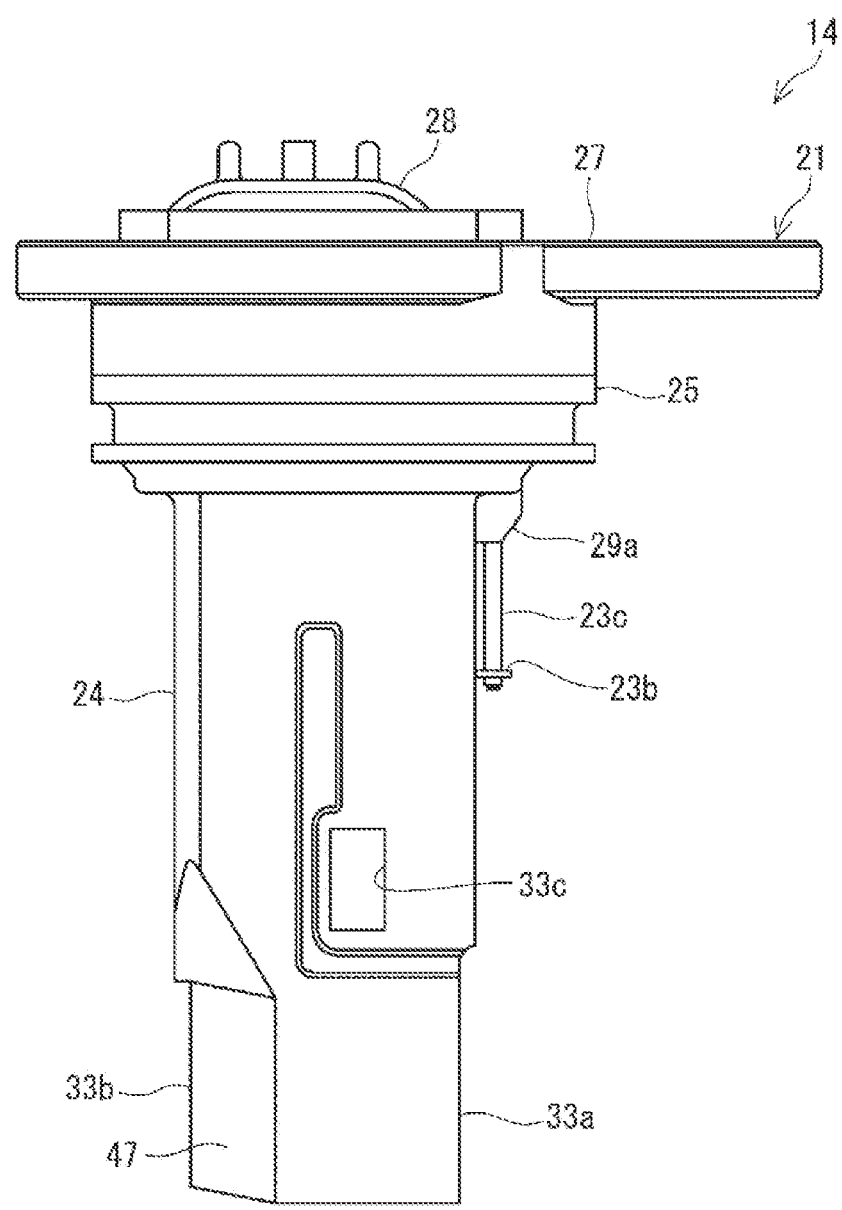
FIG. 5 is a schematic view of the air flowmeter in FIG. 1 in a direction of an arrow V.

The air flowmeter 14 shown in FIGS. 1 and 2 is detachably attached to an intake pipe 12a defining the intake passage 12. The air flowmeter 14 is inserted into an airflow insertion hole 12b passing through a cylindrical wall of the intake pipe 12a and at least a part of the air flowmeter 14 is located in the intake passage 12. The intake pipe 12a includes a pipe flange 12c having a circular annular shape and extends radially outward from the airflow insertion hole 12b and a pipe made of synthetic resin or the like. Hereinafter, a longitudinal direction of the intake passage 12 (i.e., a flow direction of the intake air in the intake passage 12) is referred to as a flow direction.

As shown in FIGS. 1 to 6, the air flowmeter 14 includes a housing 21, a flow rate detector 22, and an intake air temperature sensor 23. The housing 21 includes at least a resin. Specifically, the housing 21 contains a base polymer and fillers that have a higher strength than the base polymer. The base polymer is made of a resin and has an insulation property. The fillers are a reinforcing member to reinforce the housing 21. Since the housing 21 of the air flowmeter 14 is attached to the intake pipe 12a, the flow rate detector 22 is able to receive the intake air flowing through the intake passage 12.

Figure 6:
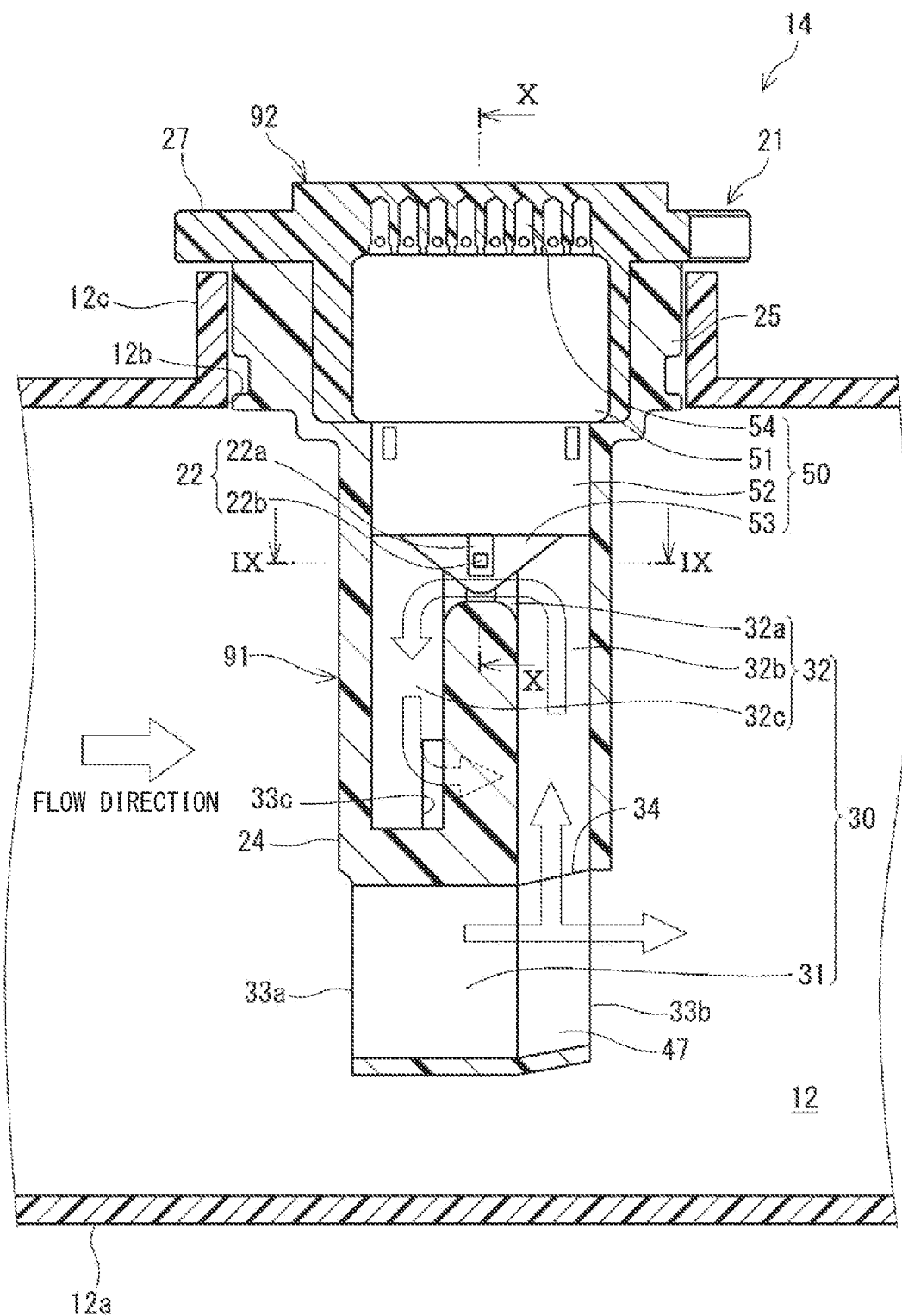
FIG. 6 is a cross-sectional view of the air flowmeter taken along a line VI-VI in FIG. 1.

The housing 21 includes a bypass housing 24, a ring holder 25, a flange 27, a connector 28, a root 29a, and a protecting protrusion 29b. An O-ring 26 is attached to the ring holder 25. The ring holder 25 is a portion fit into the airflow insertion hole 12b through the O-ring 26. In FIG. 6, an illustration of the O-ring 26 is omitted.

The bypass housing 24 protrudes from the ring holder 25 toward the intake passage 12. Hereinafter, an end of the bypass housing 24 facing the ring holder 25 is referred to as a housing base end and the other end of the bypass housing 24 facing away from the ring holder 25 is referred to as a housing tip end.

The flange 27 is disposed outside of the intake pipe 12a relative to the ring holder 25 (i.e., outside of the intake passage 12). The flange 27 covers the airflow insertion hole 12b from an outside of the intake pipe 12a. The flange 27 defines multiple screw holes 42 and the housing 21 is fixed to a boss 12d of the intake pipe 12a with the screw holes 42.

The connector 28 surrounds multiple connector terminals 28a and corresponds to a terminal protector configured to protect the connector terminals 28a. One of the multiple connector terminals 28a is a ground terminal and connected to an external ground 45.

The root 29a protrudes from the ring holder 25 toward a center of the intake passage 12. The root 29a is distanced sideward from the bypass housing 24 to avoid a heat of the bypass housing 24 that is temperature-increased by receiving heat from an internal combustion engine.

The intake air temperature sensor 23 includes a thermosensitive element 23a that detects a temperature of the intake air, a pair of lead wire 23b extending from the thermosensitive element 23a, and a pair of intake air temperature terminal 23c connected to the pair of lead wire 23b. The pair of intake air temperature terminal 23c extends from the root 29a. The thermosensitive element 23a bridges over the pair of intake air temperature terminal 23c with the pair of lead wire 23b. The pair of lead wire 23b and the pair of intake air temperature terminal 23c are both electrically conductive. The pair of intake air temperature terminal 23c are electrically connected to the connector terminals 28a in the connector 28. The intake air temperature sensor 23 transmits detection signals in accordance with a temperature of the intake air sensed by the thermosensitive element 23a.

The protecting protrusion 29b protrudes sideward from the bypass housing 24 and is located between the housing tip end and the intake air temperature sensor 23. A dimension of the protecting protrusion 29b from the bypass housing 24 in a protruding direction of the protecting protrusion 29b is greater than a distance between the bypass housing 24 and the intake air temperature sensor 23. The protecting protrusion 29b restricts the intake air temperature sensor 23 from getting in contact with the intake pipe 12a when the air flowmeter 14 is attached to the intake pipe 12a. Thus, the intake air temperature sensor 23 is restricted from being damaged.

As shown in FIG. 6, the bypass housing 24 defines a bypass passage 30 through which a part of the intake air flowing through the intake passage 12 flows. The bypass passage 30 includes a flow passage 31 and a measuring passage 32. Both of the flow passage 31 and the measuring passage 32 are inner space defined by the bypass housing 24.

The flow passage 31 passes through the tip end of the bypass housing 24 in the flow direction. The flow passage 31 defines an inlet opening 33a that is an upstream end of the flow passage 31 and an outlet opening 33b that is a downstream end of the flow passage 31. The measuring passage 32 is a passage branched off from a middle part of the flow passage 31 and defines measuring outlet openings 33c that are downstream ends of the measuring passage 32. The measuring outlet openings 33c are defined respectively one by one at both side surfaces of the bypass housing 24.

The flow passage 31 is tilted such that a rear portion 47 of the flow passage 31 is located closer to the housing base end in a direction to the outlet opening 33b. The rear portion 47 is configured to be narrowed toward the outlet opening 33b. The measuring passage 32 defines a measuring inlet opening 34 that is an upstream end of the measuring passage 32. The measuring inlet opening 34 is a boundary between the flow passage 31 and the measuring passage 32.

As shown in FIG. 1, when the outlet opening 33b is viewed from a position upstream of the outlet opening 33b in the flow direction, the measuring inlet opening 34 is hidden behind the housing base end side of the flow passage 31. Thus, the measuring inlet opening 34 cannot be seen from the upstream side of the outlet opening 33b. As a result, even if foreign matters such as sand and dusts flow into the flow passage 31 together with the intake air, the foreign matters are likely to flow straight through the flow passage 31 and out of the flow passage 31 through the outlet opening 33b. Thus, foreign matters are less likely to reach the flow rate detector 22.

Figure 7:
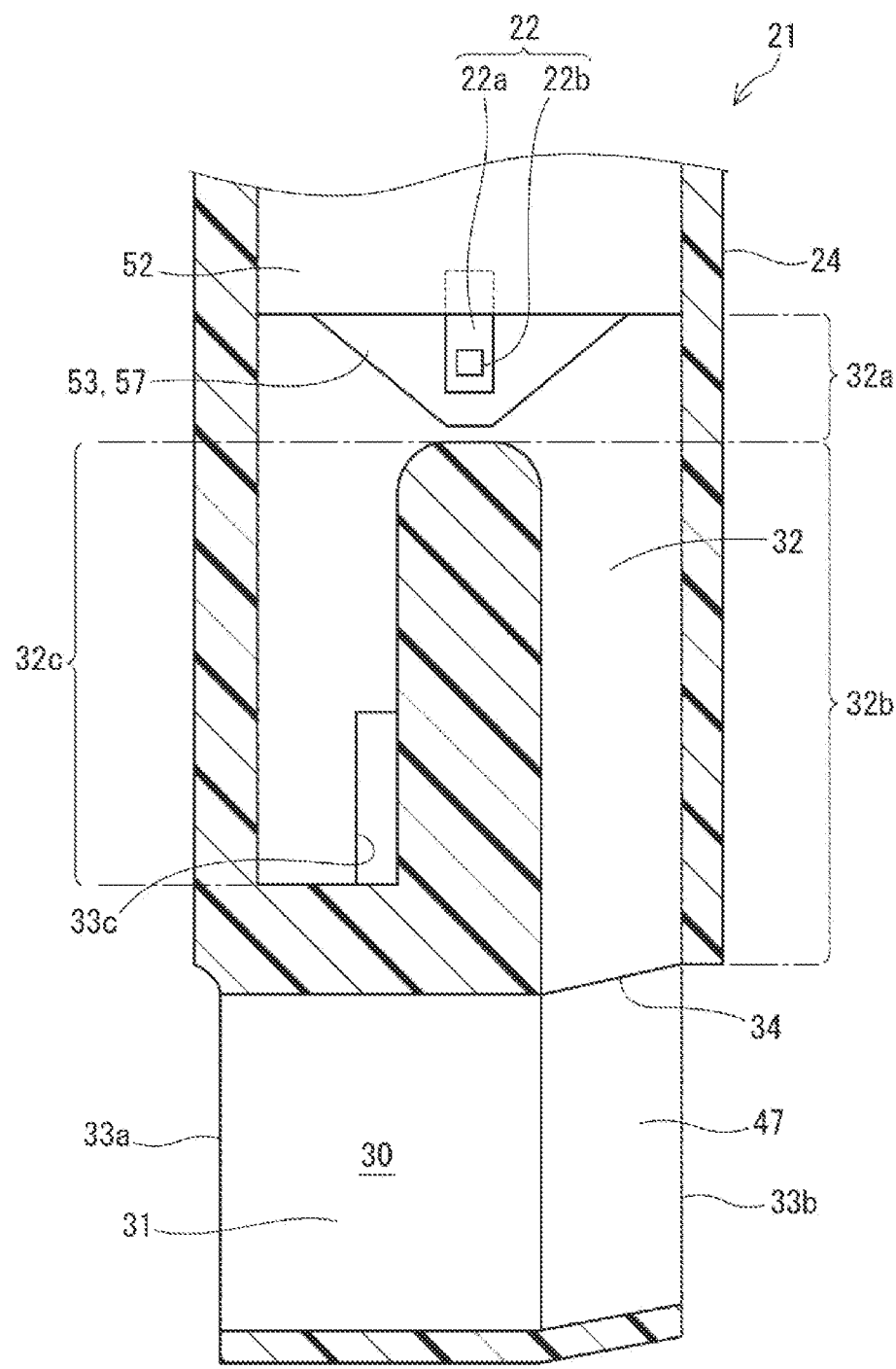
FIG. 7 is an enlarged view of a bypass passage in FIG. 6.

As shown in FIGS. 6 and 7, the measuring passage 32 has a folded shape that is folded back at an intermediate position of the measuring passage 32. The measuring passage 32 includes a detection passage 32a where the flow rate detector 22 is disposed, an introduction passage 32b through which the intake air is introduced into the detection passage 32a, and a discharge passage 32c through which the intake air from the detection passage 32a flows. The introduction passage 32b extends from the boundary 34 toward the housing base end. The discharge passage 32c extends from the measuring outlet openings 33c toward the housing base end.

The detection passage 32a is disposed closer to the housing base end than the introduction passage 32b and the discharge passage 32c. The detection passage 32a fluidly connects between a downstream end of the introduction passage 32b and an upstream end of the discharge passage 32c with bridged between the introduction passage 32b and the discharge passage 32c.

The intake air flows through the detection passage 32a in a direction opposite to the flow direction in the intake passage 12 and the flow passage 31. In the measuring passage 32, the intake air flowing from the flow passage 31 flows toward the housing base end and then makes a U-turn toward the housing tip end through the detection passage 32a. This U-turn shape makes it difficult for the foreign matters such as sand and dusts to reach the flow rate detector 22 even if the foreign matters flow into the air flowmeter 14.

The measuring outlet openings 33c fluidly connect the discharge passage 32c to the intake passage 12. Total opening area of the two measuring outlet openings 33c are substantially the same with an area of the discharge passage 32c.

The flow rate detector 22 is a physical quantity detector that transmits detection signals in accordance with physical quantities of a fluid flowing through the measuring passage 32. In the first embodiment, the flow rate detector 22 transmits detection signals in accordance with a flow rate of the intake air flowing through the detection passage 32a.

Figure 8:
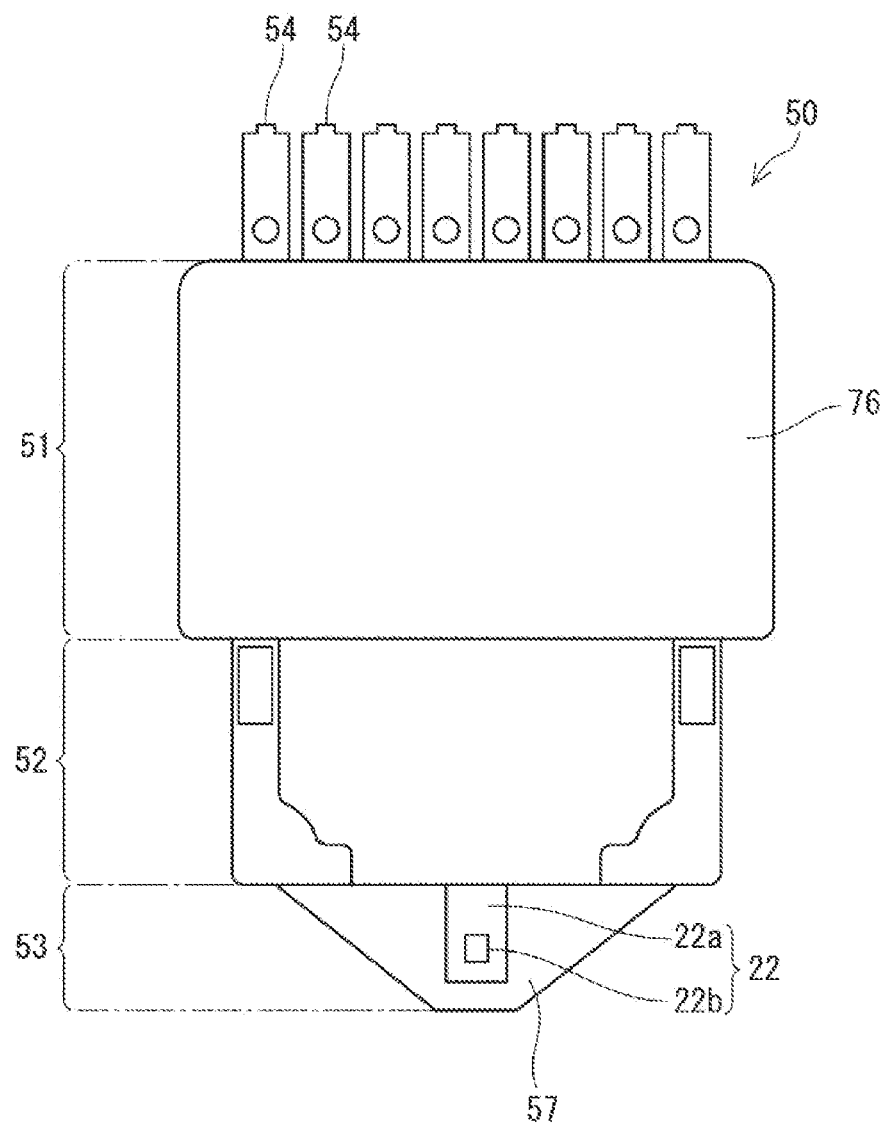
FIG. 8 is a schematic view of a sensor assembly including a flow rate detector in FIG. 6.

As shown in FIGS. 6 to 8, the flow rate detector 22 includes a detection board 22a as a circuit board and a detection element 22b mounted on the detection board 22a. The detection board 22a forms an outer frame of the flow rate detector 22 and the detection element 22b is disposed at a center of a board surface of the detection board 22a. The detection board 22a is electrically connected to the connector terminals 28a. The detection element 22b includes a temperature detector and a heat generator such as a heating resistor, and the flow rate detector 22 transmits detection signals in accordance with a change in a temperature along with a generation of heat in the detection element 22b.

Some large temperature change is needed in the detection element 22b of the temperature detector in accordance with the flow rate of the intake air detector to maintain a detection accuracy of the flow rate detector 22 properly. In addition, in order to increase the temperature change, it is preferable that a flow velocity of a fluid flowing to the detection element 22b be large to some extent. This is to restrict temperature change in the detection element 22b caused by natural convection from influencing on the temperature change of the detection element 22b caused by the flow velocity of the fluid. The temperature change due to the natural convection is changed depending on an angle at which the detection element 22b is installed and causes an error in the detection signals of the temperature change of the fluid. By increasing the flow velocity of the fluid flowing to the detection element 22b, the influence of natural convection caused by the angle at which the detection element 22b and the air flowmeter 14 are installed can be reduced and detection of the fluid can be performed appropriately.

The air flowmeter 14 has a sensor sub-assembly configured by including the chip-type flow rate detector 22. The sensor sub-assembly is referred to as a sensor SA50.

The sensor SA50 includes a circuit housing 51, a relay portion 52, a sensing portion 53, and lead terminals 54. The relay portion 52 is disposed between the circuit housing 51 and the sensing portion 53. The lead terminals 54 have electric conductivity and extend from the circuit housing 51 away from the sensing portion 53.

Figure 9:
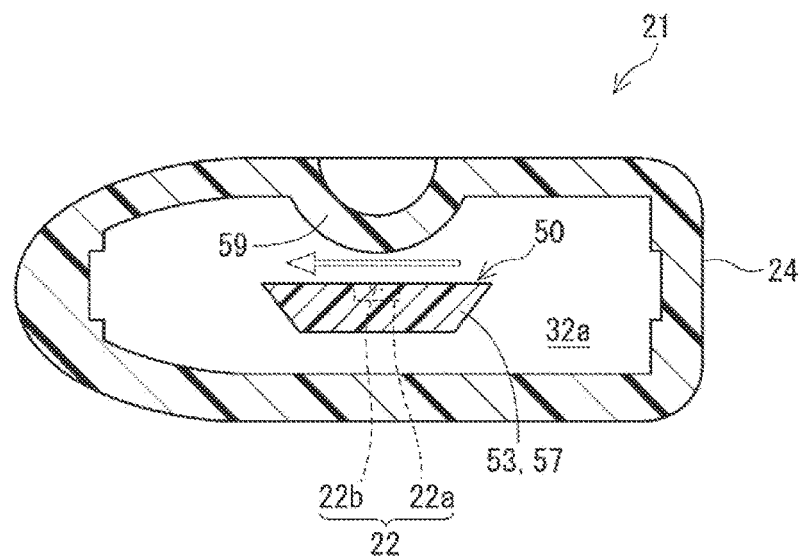
FIG. 9 is a cross-sectional view taken along a line IX-IX in FIG. 6.

As shown in FIGS. 6, 7, and 9, the sensor SA50 is located in the housing 21 such that the sensing portion 53 is located in the detection passage 32a. The sensing portion 53 is located in a middle part of the detection passage 32a. The sensing portion 53 separates the middle part of the detection passage 32a in a width direction of the detection passage 32a. The detection passage 32a includes a detection throttle portion 59 at a position of an inner circumferential surface of the detection passage 32a that faces the flow rate detector 22. The detection throttle portion 59 is formed by reducing a passage area of the position.

In the detection passage 32a, a distance between a sensing supporter 57 and the detection throttle portion 59 gradually decreases toward the flow rate detector 22. In this configuration, when the intake air flowing into the detection passage 32a from the introduction passage 32b flows through a gap between the sensing supporter 57 and the detection throttle portion 59, a flow velocity of the intake air is likely to increase as approaching to the detection element 22b of the flow rate detector 22. In this case, the detection element 22b receives the intake air at an appropriate flow velocity, thereby improving detection accuracy of the flow rate detector 22.

Figure 10:
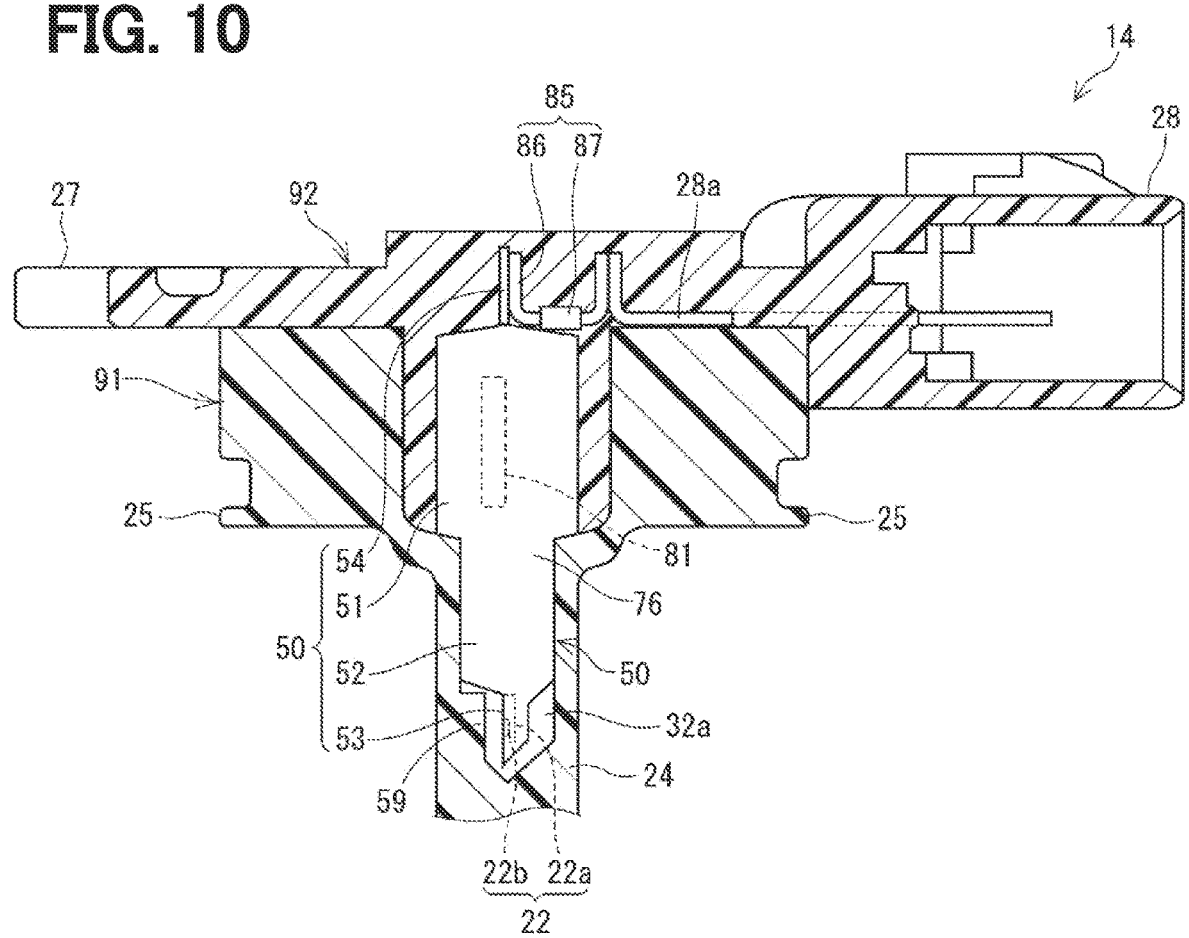
FIG. 10 is a cross-sectional view taken along a line X-X in FIG. 6.

As shown in FIGS. 8 and 10, the sensor SA50 includes a molding 76 forming an outer frame of the sensor SA50. The molding 76 is made of a resin such as a mold resin. The molding 76 fixes and protects the flow rate detector 22, a circuit chip 81, and the like.

As shown in FIGS. 2 and 10, the lead terminals 54 of the sensor SA50 are electrically connected to the connector terminals 28a through a terminal unit 85. The lead terminals 54 and the connector terminals 28a are respectively arranged at predetermined intervals.

The terminal unit 85 includes multiple bridge terminals 86 and terminal fixing portions 87 that fix the bridge terminals 86. Each of the bridge terminals 86 has electric conductivity and is an elongated member extending in a U shape as a whole. The bridge terminals 86 are connected to both the connector terminals 28a and the lead terminals 54 by welding and the like. The terminal fixing portions 87 are made of material having electric insulating property and connect middle parts of the bridge terminals 86.

Signals from the thermosensitive element 23a is transmitted to the connector 28 through an intake air temperature terminal 23c, the bridge terminals 86, the lead terminals 54, the circuit chip 81 in the molding 76, the lead terminals 54, the bridge terminals 86, and the connector terminals 28a in this order.

In the sensor SA50, flow rate signals in accordance with a flow rate of the intake air flowing through the measuring passage 32 is transmitted to the circuit chip 81 from the flow rate detector 22 and treated by the circuit chip 81. Thereby, a flow rate of the intake air flowing through the intake passage 12 is calculated. The flow rate calculated by the circuit chip 81 is transmitted to an external ECU by transmitting signals through the lead terminals 54 and the connector terminals 28a. As described above, the air flowmeter 14 detects a flow rate of the intake air flowing through the intake passage 12 with the flow rate detector 22.

A decrease of the detection accuracy of the air flowmeter 14 will be described. The decrease is caused when foreign matters adhere to the flow rate detector 22. In the first embodiment, foreign matters are restricted from reaching the flow rate detector 22 because of a position of the measuring inlet opening 34 and a shape of the measuring passage 32 as described above. However, it is impossible to completely prevent foreign matters from reaching the flow rate detector 22. Additionally, when foreign matters are charged, the foreign matters may adhere to the flow rate detector 22 and cause a deviation in characteristic of the air flowmeter 14.

As for the deviation in the characteristic, to restrict foreign matters from being charged, an antistatic agent may be mixed into the resin of the housing. However, in the housing containing the antistatic agent, an amount of resin for the housing is reduced by an additive amount of the antistatic agent. Therefore, the moldability of the housing may decrease. Additionally, an amount of glass fiber is also reduced by the additive amount of the antistatic agents, thus a strength of the housing may decrease. A decrease in strength causes a decrease in durability. That is, the decrease of the moldability and the durability of the housing caused by adding the antistatic agent into the resin has been a subject.

Hereinafter, a configuration to restrict a deviation in characteristic of the air flowmeter 14 while avoiding decreasing the moldability and durability of the housing 21 will be described.

Figure 11:
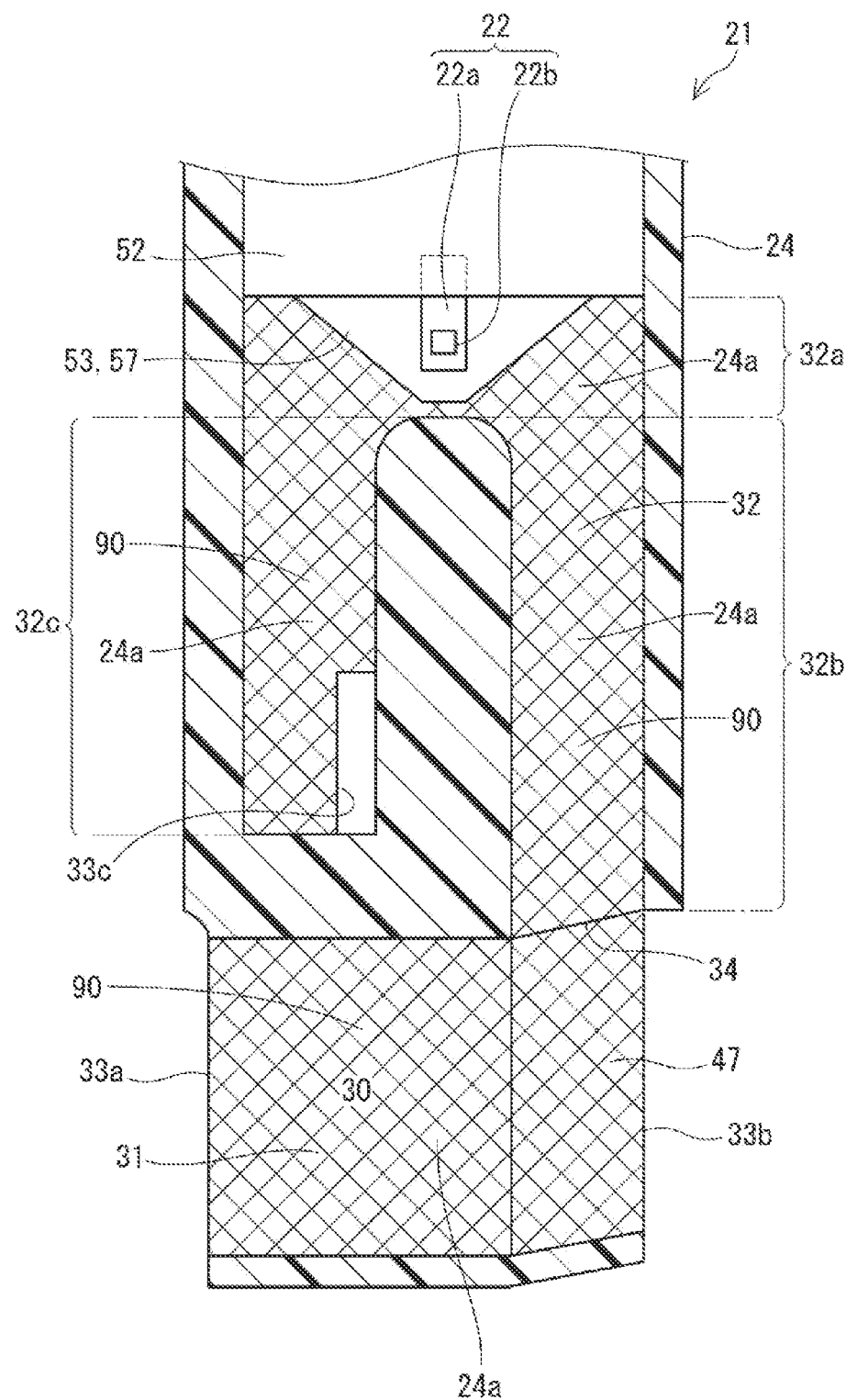
FIG. 11 is a schematic view corresponding to FIG. 7 and illustrating a non-insulation portion.

As shown in FIG. 11, the housing 21 has a non-insulation portion 90 containing graphite. Specifically, the non-insulation portion 90 is formed on the inner surface of the housing 21, specifically an inner wall 24a of the bypass housing 24 that defines the bypass passage 30. A hatched portion in FIG. 11 is the inner wall 24a on which the non-insulation portion 90 is formed. The non-insulation portion 90 contains carbonized materials that are aggregates of graphite to have an electric conductivity. The non-insulation portion 90 is a conductive portion that discharges electric charges to the ground 45. The non-insulation portion 90 is a portion irradiated with electromagnetic waves (i.e., an irradiated portion with electromagnetic waves).

A surface specific resistance of the non-insulation portion 90 is equal to or less than $10^{12}$ Ω/square. When the surface specific resistance are divided into ranges as shown in (1) to (4), the non-insulation portion 90 in the first embodiment belongs to the range (4). The non-insulation portion 90 may belong to the range (2) or (3).

(1) Insulation range: equal to or more than $10^{13}$ Ω/sq.
(2) Antistatic range: $10^{10}$ to $10^{12}$ Ω/sq.
(3) Non-charged range: $10^{8}$ to $10^{9}$ Ω/sq.
(4) Semi-conductive to conductive range: equal to or less than $10^{7}$ Ω/sq.

A method for forming the non-insulation portion 90 will be described together with a manufacturing procedure of the housing 21. As shown in FIGS. 6 and 10, the bypass housing 24, the ring holder 25, the root 29a, and the protecting protrusion 29b form a housing body 91. The flange 27 and the connector 28 form an outside main passage housing 92 that is outside of the main passage.

Figure 12:
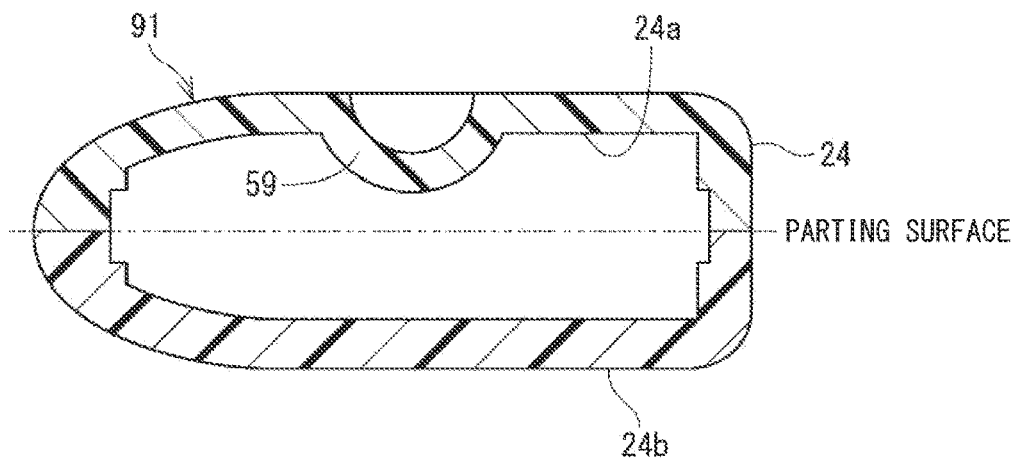
FIG. 12 is a cross-sectional view corresponding to FIG. 9 and illustrating a dual partitioning of a housing body.
Figure 13:
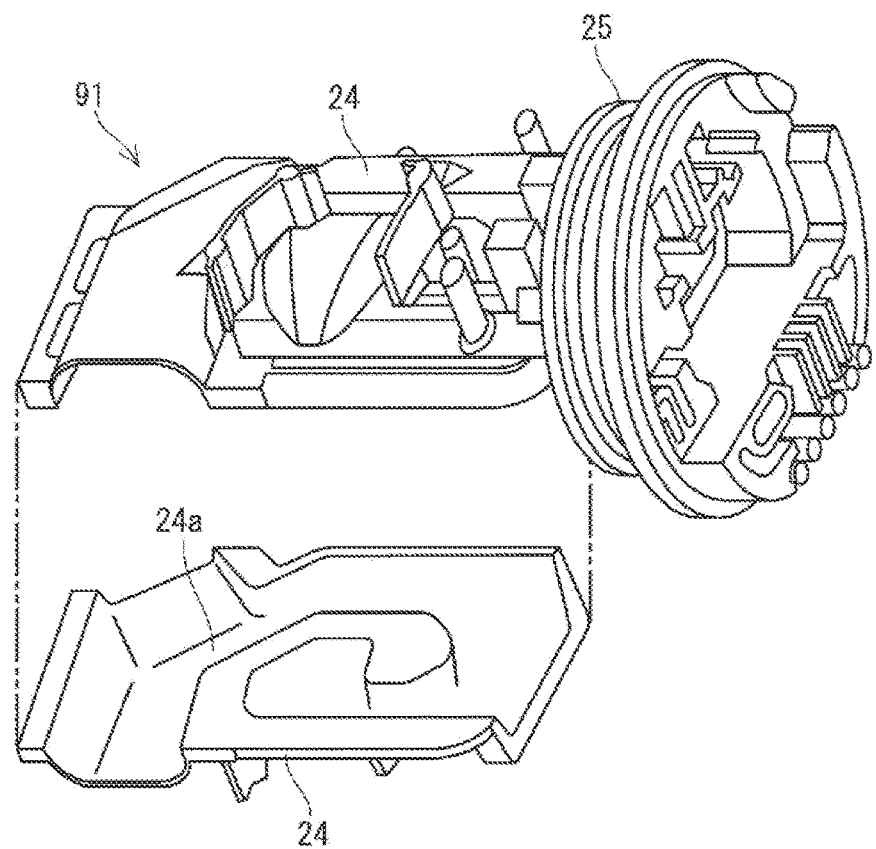
FIG. 13 is a perspective view of the housing body partitioned into two pieces to describe a preparing step of a method for manufacturing the air flowmeter in the first embodiment.
Figure 14:
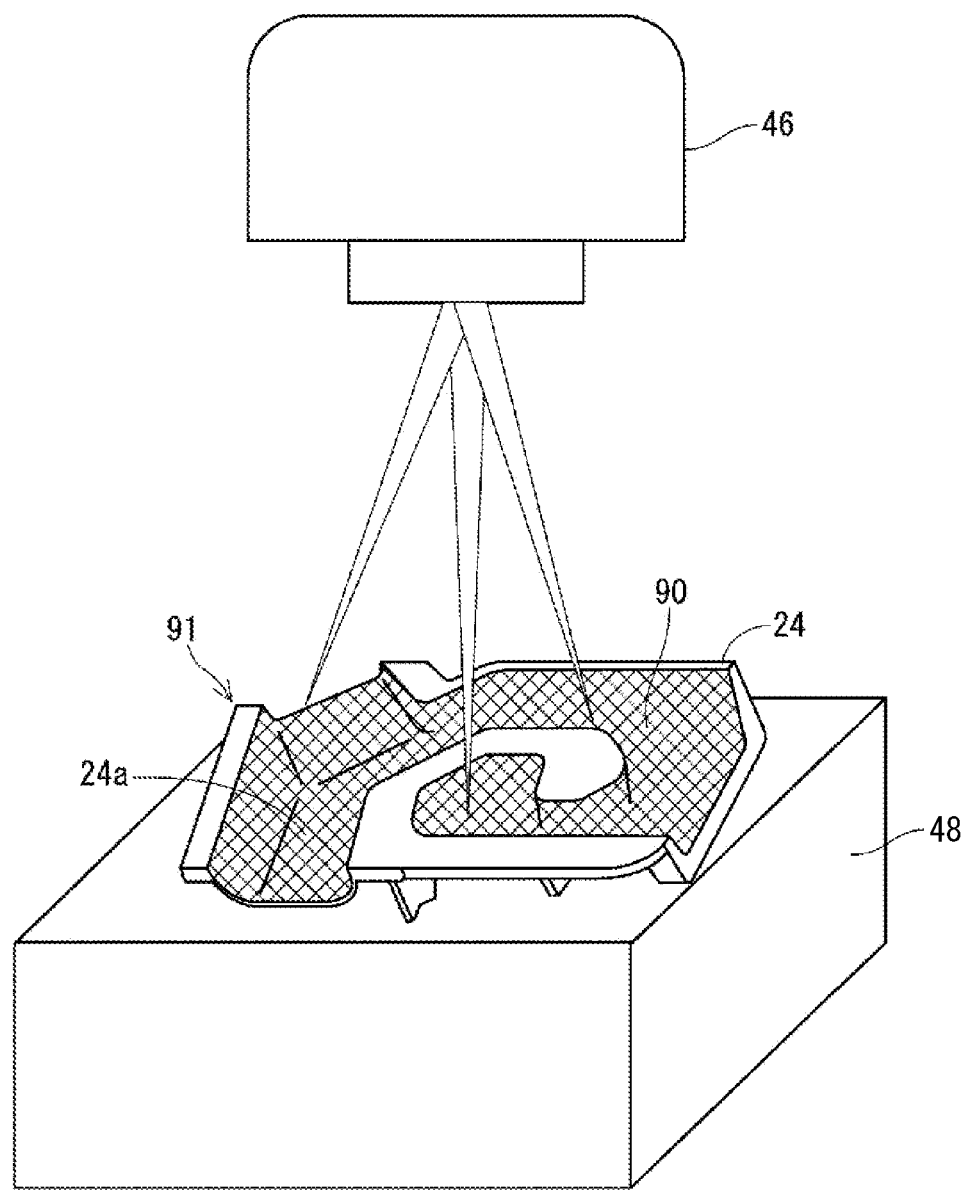
FIG. 14 is a perspective view illustrating a state in which an inner surface of the housing is irradiated with laser to describe a heating step of the method for manufacturing the air flowmeter in the first embodiment.
Figure 15:
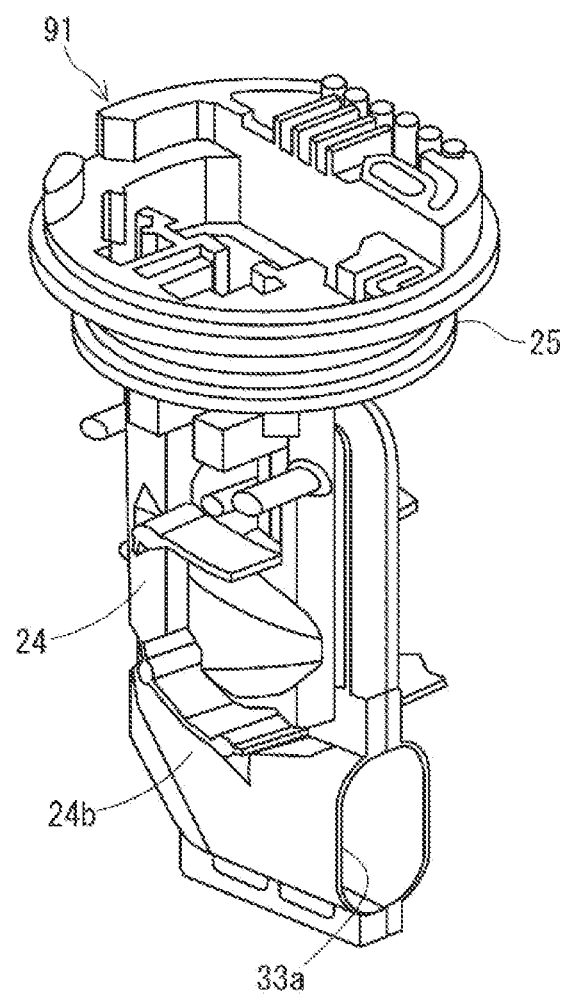
FIG. 15 is a perspective view of the housing body into which the two pieces of the housing body after being irradiated with the laser are assembled.

A method for manufacturing the air flowmeter 14 includes a preparing step and a heating step. In the preparing step, the housing body 91 and the flow rate detector 22 are prepared. First, the housing body 91 is molded as shown in FIG. 13 in a state in which the housing body 91 is divided into two parts at the center position in the width direction when viewed in the flow direction. That is, the housing body 91 is molded in a state that is divided along a dividing surface shown by a chain double-dashed line in FIG. 12. In the heating step, as shown in FIG. 14, the housing body 91 is fixed to a jig 48 of a laser processing machine 46, and the laser processing machine 46 heats the inner wall 24a of the housing body 91 such that the non-insulation portion 90 is provided on the inner wall 24a. That is, a surface layer of the inner wall 24a to define the bypass passage 30 is irradiated with laser to locally heat-treat the surface layer. At this time, heat of 2000° C. or higher is applied to the surface layer to cause cleavage of bonds of the polymer that is a material of the housing body 91. As a result, the constituent elements other than carbon are released as decomposition gas such as carbon dioxide, carbon monoxide, nitrogen and hydrogen. Thus, a portion of the surface layer irradiated with laser is carbonized. Then, the portion is partially converted into a graphite in which six-membered rings of carbon atoms (i.e., benzene rings) are connected each other in a plane. Therefore, the non-insulation portion 90 as a carbonized portion containing graphite is formed on the surface layer and conductivity is imparted to the non-insulation portion 90. The two-divided resin member having the non-insulation portion 90 formed as described above are integrated with each other by welding or the like as shown in FIG. 15. A laser is used as an electromagnetic wave, but the present disclosure is not limited to this. Other methods such as a plasma treatment, a high-pressure steam irradiation, an electron beam irradiation, and a heating using Joule heat may be used. The most suitable method can be selected depending on the processability of the resin member.

Figure 16:
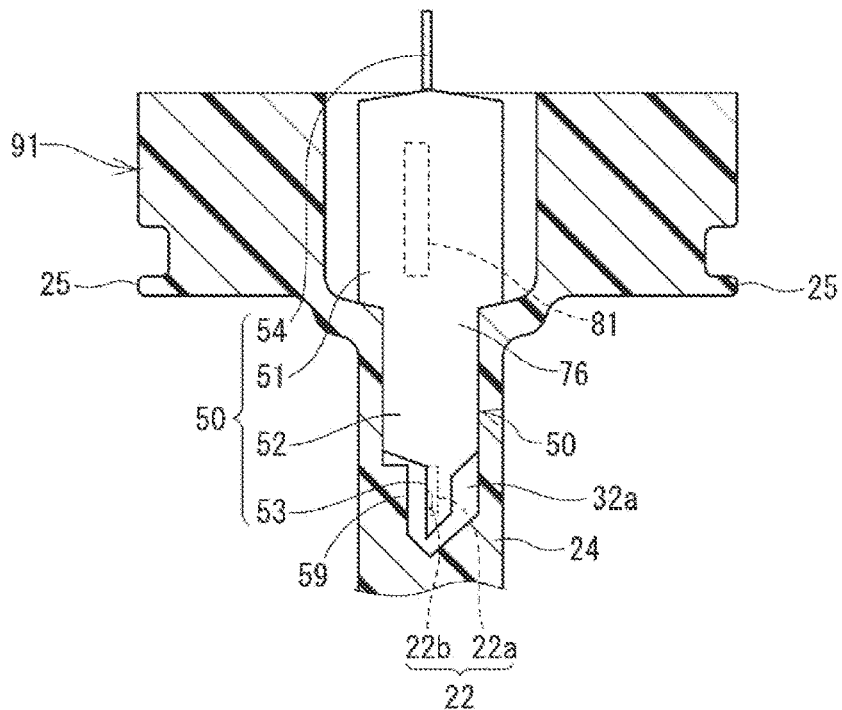
FIG. 16 is a schematic view of the housing body and a sensor SA in FIG. 10.
Figure 17:
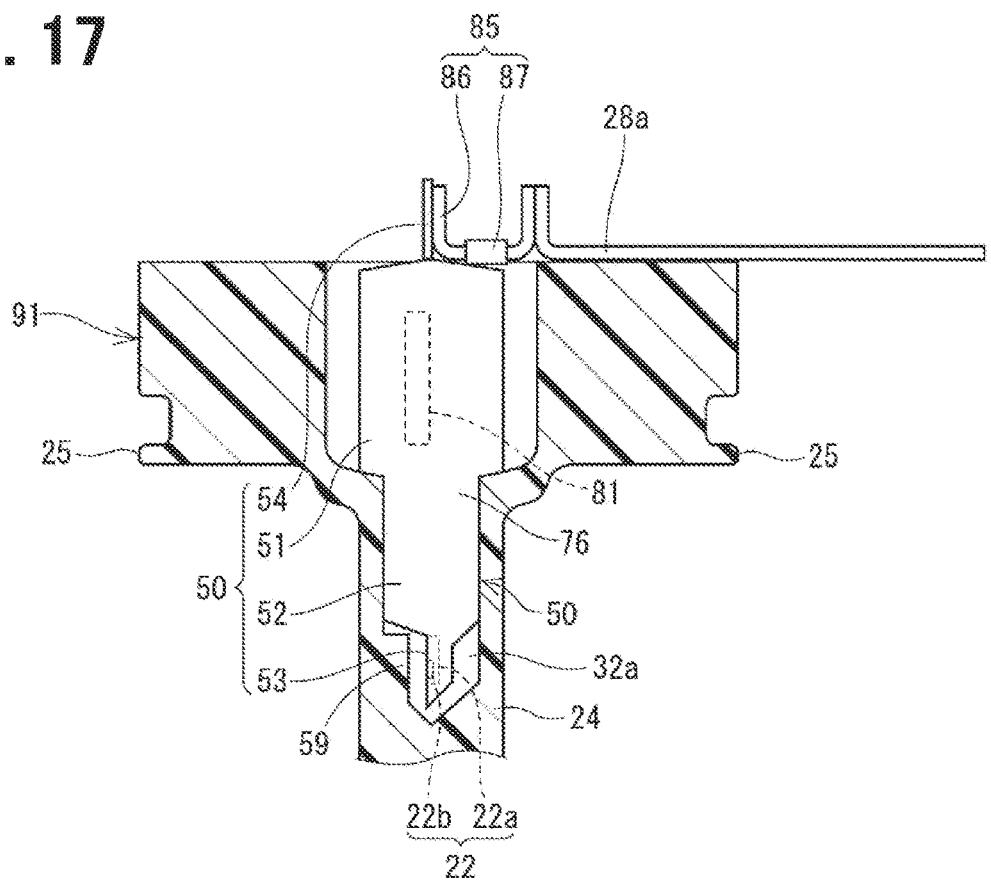
FIG. 17 is a schematic view of the housing body, the sensor SA, a connecter terminal, and a terminal unit in FIG. 10.

After the sensor SA50 is mounted on the housing body 91 as shown in FIG. 16, the lead terminals 54 of the sensor SA50 and the terminal unit 85 are electrically connected through the connector terminals 28a as shown in FIG. 17. Then, as shown in FIG. 10, the outside main passage housing 92 is secondarily molded to completely form the housing 21.

A thermoplastic resin such as PBT (polybutylene terephthalate) or PPS (Polyphenylene Sulfide Resin) may be used as the resin for the housing 21. The thermoplastic resin generally has a lower melting point than thermosetting resins and is superior in processability for imparting a graphite structure. However, the resin of the housing 21 is not limited to the thermoplastic resin and may be a thermosetting resin. In short, the resin may be any resin that has a benzene ring and has an electric conductivity by cutting the covalent bond of the benzene ring and releasing a restraint of free electrons.

(Advantages)

As described above, in the first embodiment, the air flowmeter 14 includes the housing 21 and the flow rate detector 22. The housing 21 is made of resin and has the bypass passage 30 branched off from the intake passage 12. The flow rate detector 22 is disposed in the bypass passage 30. The housing 21 has the non-insulation portion 90 containing graphite.

Since the housing 21 includes the non-insulation portion 90 containing graphite as described above, it is possible to remove the charge of foreign matters such as dusts that get in contact with the housing 21. As a result, the foreign matters are restricted from adhering to the flow rate detector 22. It is not necessary to add an antistatic agent to the resin of the housing 21. Therefore, it is possible to restrict a deviation in characteristic of the air flowmeter 14 while avoiding decreasing the moldability and durability of the housing 21.

In the first embodiment, the non-insulation portion 90 is the irradiated portion with electromagnetic waves. That is, the non-insulation portion 90 is formed by modifying the surface layer of the resin member with electromagnetic waves to make the surface layer conductive. An antistatic property is imparted to the housing 21 by converting a part of the molecular structure of the resin member into graphite by irradiating with electromagnetic waves. Since the part of the housing 21 is modified with the energy of the electromagnetic wave, only a desired portion can be processed and the workability improved.

No matter whether a target area has a plane surface or curved surface, no matter whether the target area is whole of the portions or a part of the portions or multiple areas of the portions, processing into graphite with the electromagnetic wave can be performed. In addition, the processing is completed in a few seconds to a few tens of seconds, thereby improving the processability. When the target is on surface layer, the processing can be performed for the target in any one of a component state, a finished product state (i.e., assembly completed state), and a post-processing state. Thus, the processing does not select steps, which improves the processability. Additionally, in the case that the target is a resin molded product, a moldability of the resin is not affected by the processing because the target can be processed after molding. Since the electric conductivity is secured when a depth of a layer processed with the laser is equal to or greater than 0.1 mm, the processing can be performed within a range of product dimensional tolerance. Therefore, the static elimination effect can be expected without changing physical properties such as product strength.

In the first embodiment, the electromagnetic wave is laser. The laser has a high energy density among electromagnetic waves, so that the resin member can be converted conductive in a short time.

In the first embodiment, the housing 21 includes the bypass housing 24 that is disposed in the intake passage 12 and defines the bypass passage 30. The non-insulation portion 90 is formed on the bypass housing 24. A part of the bypass housing 24 has an electric conductivity, so that other parts are polarized (i.e., an electric charge is transferred to the other parts). As a result, foreign matters are restricted from adhering to the flow rate detector 22.

In the first embodiment, the non-insulation portion 90 is formed on the inner wall of the bypass housing 24 that defines the bypass passage 30. Therefore, the electric charge of foreign matters flowing through the bypass passage 30 can be effectively removed. The polarization effect, which is obtained when charges in molecules of the resin are unevenly distributed, further restricts foreign matters from adhering to the flow rate detector 22.

In the first embodiment, the surface specific resistance of the non-insulation portion 90 is equal to or less than $10^{12}$ Ω/square. The non-insulation portion 90 belongs to any ranges of the antistatic range, the non-charged range, and the semi-conductive to conductive range, thereby removing an electric charge of the foreign matters.

In the first embodiment, the air flowmeter 14 includes the housing 21, the physical quantity detector 22, and the non-insulation portion 90. The housing 21 defines the measuring passage 32 through which the fluid flows and contains at least resin. The physical quantity detector 22 transmits detection signals in accordance with physical quantity of the fluid flowing through the measuring passage 32. The non-insulation portion 90 is formed on the inner wall 24a of the housing 21, contains carbonized materials to have an electric conductivity, and discharges electric charges to the ground 45.

The method for manufacturing the air flowmeter 14 includes the preparing step and the heating step. The preparing step includes preparing the housing 21 and the physical quantity detector 22. The housing 21 defines the measuring passage 32 through which the fluid flows and contains at least resin. The physical quantity detector 22 transmits detection signals in accordance with the physical quantity of the fluid flowing through the measuring passage 32. The heating step includes heating the inner wall 24a of the housing 21 to form the non-insulation portion 90 that contains carbonized material to have electric conductivity and that discharges the electric charge to the ground 45.

The non-insulation portion 90 can remove the electric charge of foreign matters such as dusts in contact with the housing 21. Thus, the deviation in characteristic of the air flowmeter 14 is suppressed. In addition, it is unnecessary to add an antistatic agent to the material of the housing 21, which reduces the amount ratio of the material in the housing 21. Therefore, the processability of the housing is restricted from decreasing due to a low ratio of the material. In addition, the amount ratio of the grass fiber is not decreased, which is also caused by adding the antistatic agent to the material, so that the strength of the housing 21 is restricted from decreasing due to a low ratio of the glass fiber.

A difference of the resin moldability and durability between a comparative example in which the antistatic agent is added to the resin of the housing and the first embodiment in which the non-insulation portion 90 containing graphite is provided after molding the housing 21 will be described.

Figure 34:
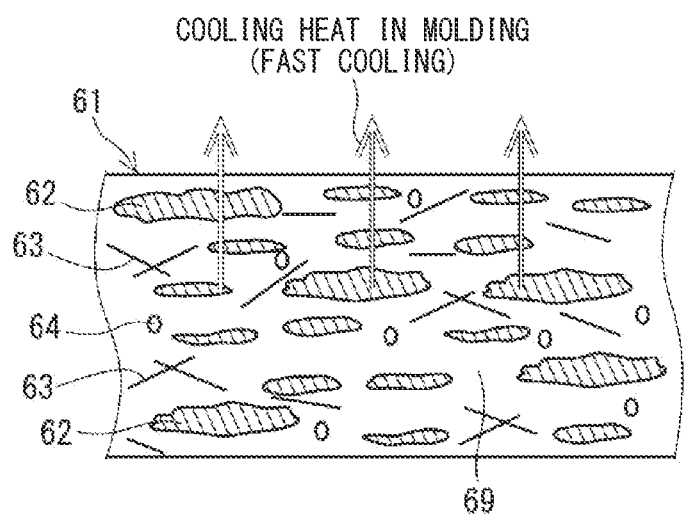
FIG. 34 is a cross-sectional view illustrating a resin moldability and a durability in a comparative example in which an antistatic agent is added to a resin of a housing.

In the comparative example shown in FIG. 34, electric conductivity is secured by an antistatic agent 62 such as metal and carbon, which also improves a thermal conductivity. As a result, the resin is cooled faster in molding and a fluidity of the resin is decreased. Thus, resin moldability of a housing 61 is likely to decrease. For example, if a temperature of the resin in molding is not set to be a maximum temperature for a resin degradation, a part of the housing 61 may be missed. In addition, a resin 69 may not be sufficiently crystallized due to a rapid cooling, which causes unstable size, strength, and a durability of the product. Further, since the antistatic agent 62 is added, it is needed to reduce an additive amount of glass fibers 63 and glass particles 64 to the resin 69 to secure the fluidity of the resin 69. As a result, a strength and a dimensional stability of the housing 61 are also decreased. In FIG. 34, hatching of the housing 61 is partially omitted for descriptive purposes.

Figure 18:
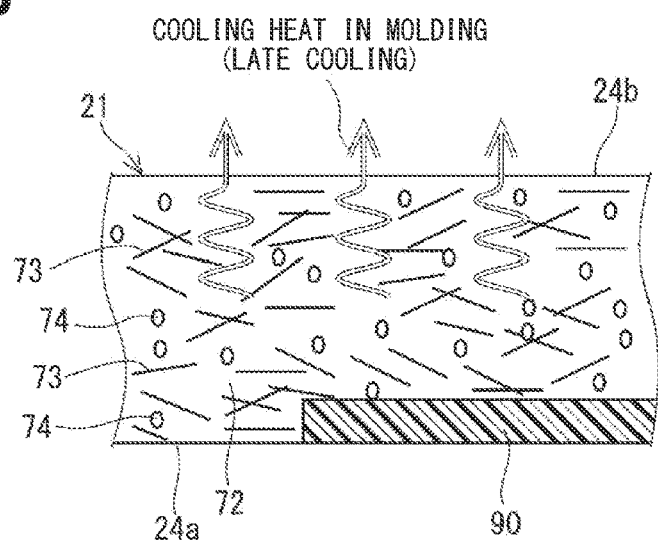
FIG. 18 is a cross-sectional view illustrating a resin moldability and a durability in the first embodiment in which the non-insulation portion containing a graphite is formed after the housing is molded.

In contrast, in the first embodiment in FIG. 18, it is unnecessary to add the antistatic agents to the material of the housing 21, thereby slowing a cooling rate in molding and keeping the fluidity of the material compared to that in the comparative example. Thus, a resin moldability of the housing 21 is restricted from decreasing. Graphitization by laser processing does not affect the resin moldability of the housing 21 because it is a process after molding the resin. Since the antistatic agent is not added and the fluidity is not decreased, it is not necessary to reduce an additive amount of the glass fibers 73 and the glass particles 74. As a result, a strength and a dimensional stability of the housing 21 are restricted from decreasing. In FIG. 18, hatching of the housing 21 is partially omitted for descriptive purposes.

Second Embodiment

Figure 19:
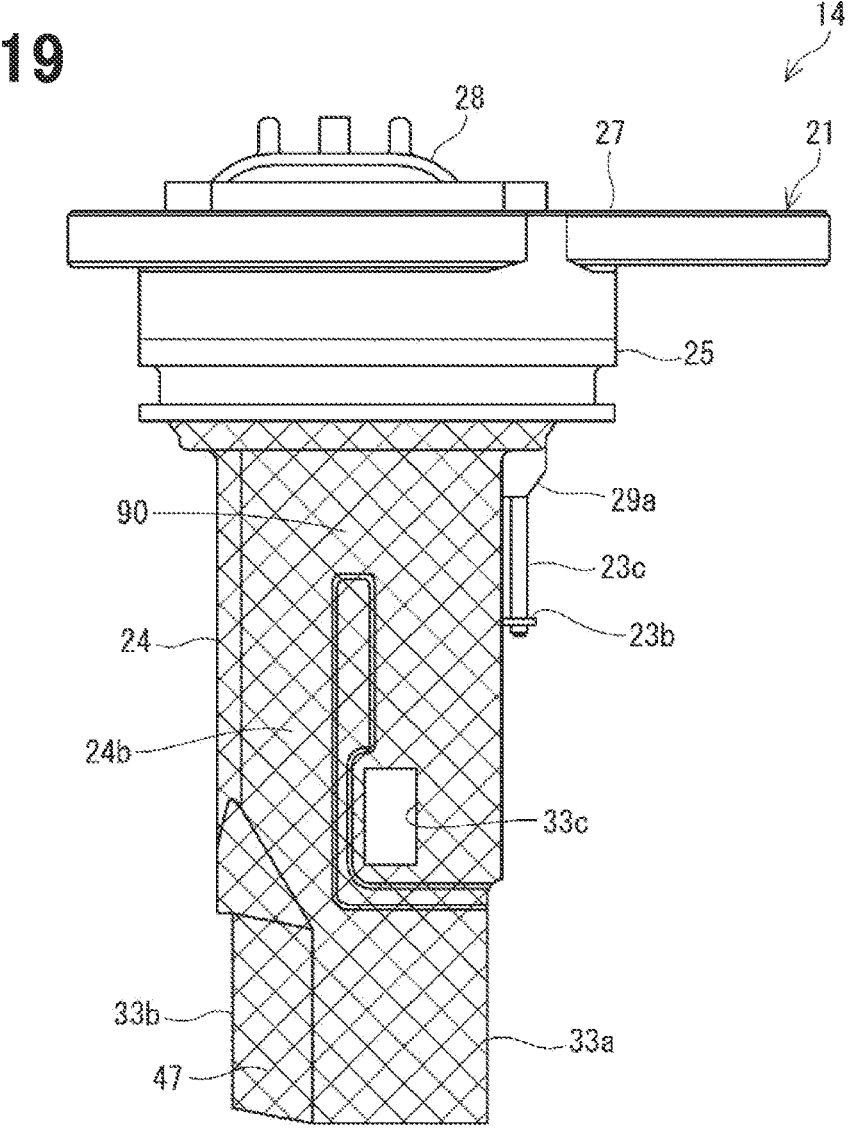
FIG. 19 is a front view of an air flowmeter in a second embodiment.
Figure 20:
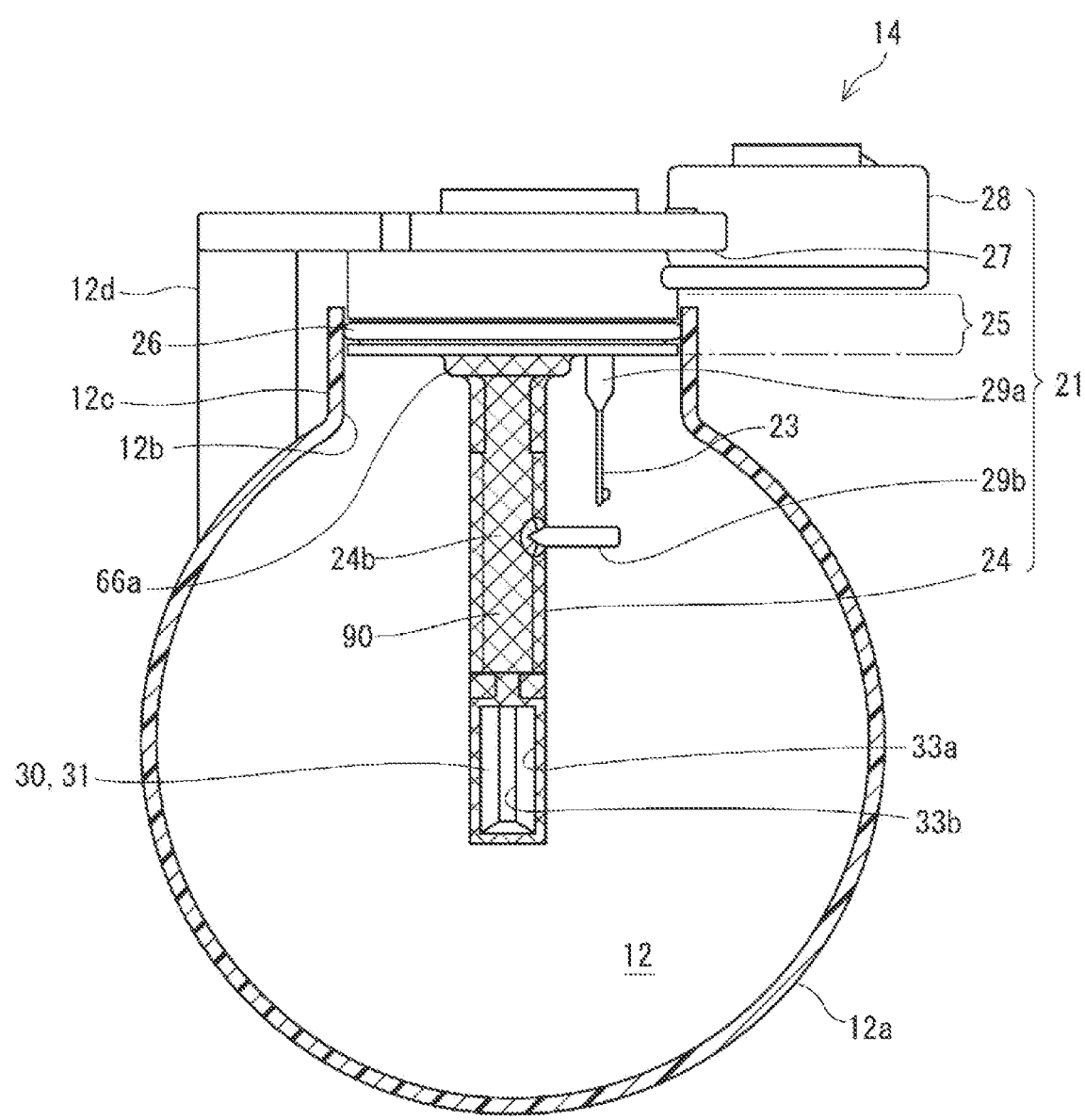
FIG. 20 is a side view of the air flowmeter in the second embodiment.

In the second embodiment, as shown in FIGS. 19 and 20, the non-insulation portion 90 is formed on an outer surface of the housing 21, specifically, on an outer wall 24b of the bypass housing 24. A hatched portion in FIGS. 19 and 20 is a part of the outer wall 24b on which the non-insulation portion 90 is formed.

Figure 21:
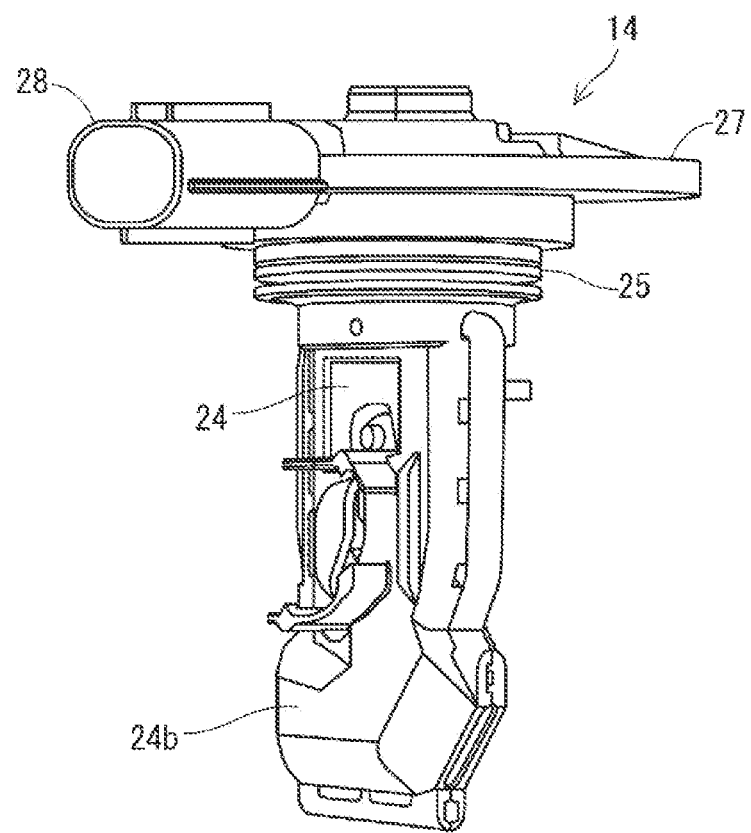
FIG. 21 is a perspective view of the assembled air flowmeter in the second embodiment to describe a preparing step of the method for manufacturing the air flowmeter.
Figure 22:
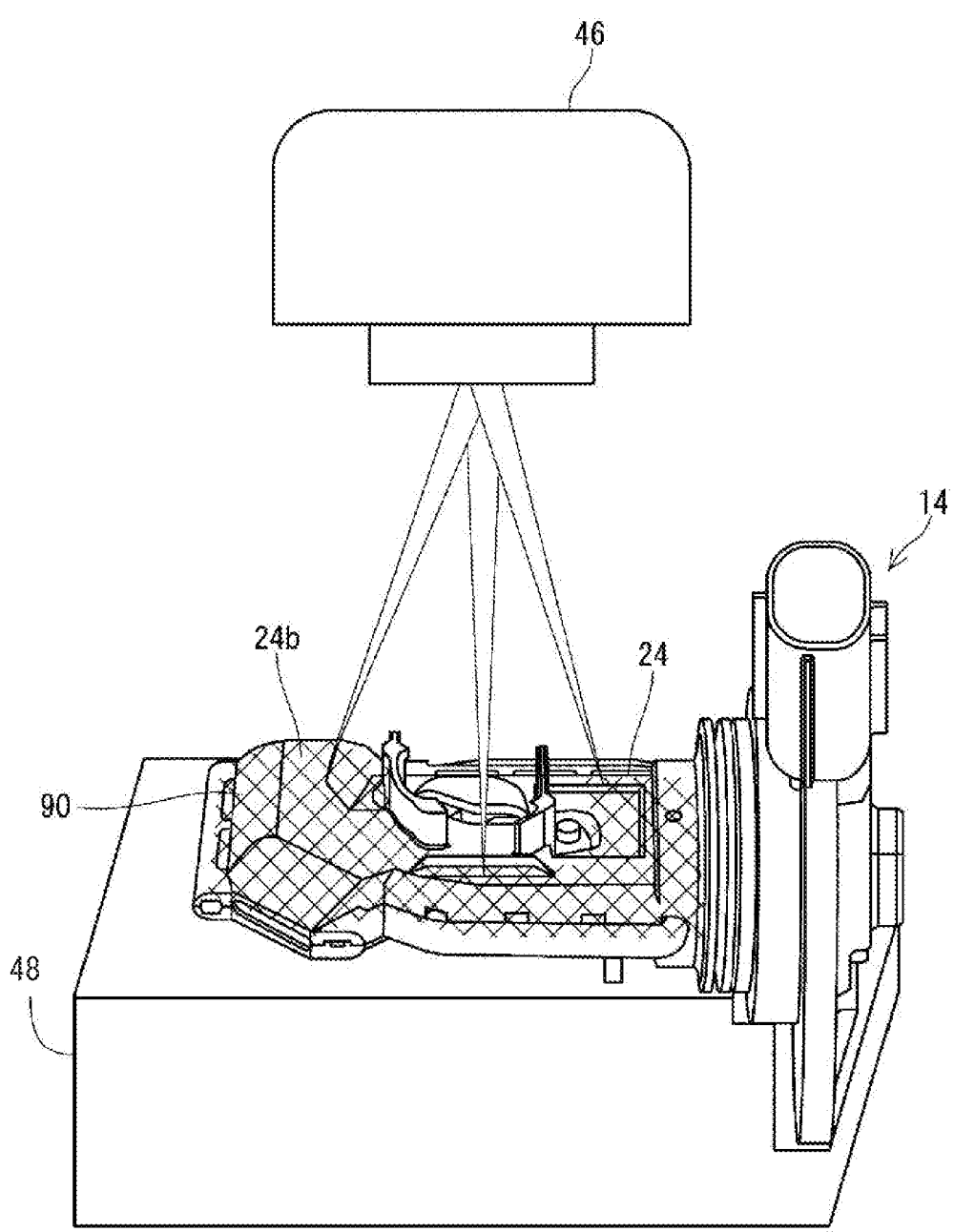
FIG. 22 is a perspective view illustrating a state in which an outer surface of the housing of the air flowmeter is irradiated with laser to described a heating step of the method for manufacturing the air flowmeter in the second embodiment.

In the preparing step of the method for manufacturing the air flowmeter 14, the assembled air flowmeter 14 as shown in FIG. 21 is prepared. The air flowmeter 14 prepared here may be unused or used one. In the heating step, as shown in FIG. 22, the air flowmeter 14 is fixed to the jig 48, and the outer wall 24b of the bypass housing 24 is heated using the laser processing machine 46 so that the non-insulation portion 90 is formed on the outer wall 24b.

As described above, the non-insulation portion 90 may be formed on the outer wall 24b of the bypass housing 24. Also in this case, the foreign matters are restricted from adhering to the flow rate detector 22 due to the polarization effect. The non-insulation portion 90 can be formed even after assembling components into the air flowmeter 14.

Third Embodiment

Figure 23:
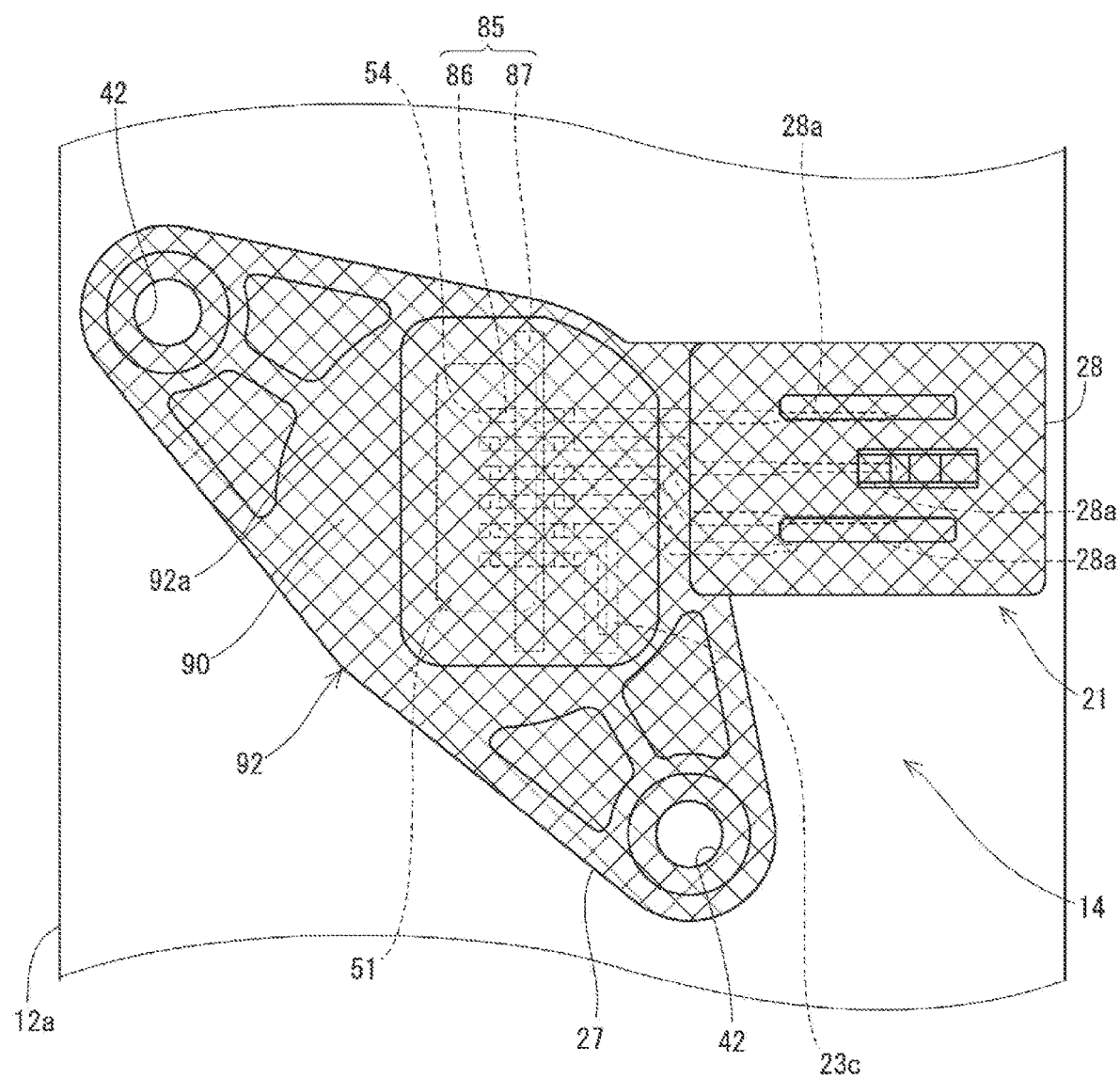
FIG. 23 is a top view of an air flowmeter in a third embodiment.

In the third embodiment, as shown in FIG. 23, the non-insulation portion 90 is formed on the outer surface of the housing 21, specifically, on an outer wall 92a of the outside main passage housing 92. The hatched portion in FIG. 23 is a portion of the outer wall 92a on which the non-insulation portion 90 is formed. The non-insulation portion 90 may be formed on the outer wall 92a of the outside main passage housing 92 as such. Also in this case, the foreign matters are restricted from adhering to the flow rate detector 22 due to the polarization effect. The non-insulation portion 90 can be formed even after assembling components into the air flowmeter 14. Even if change in size occurs at a portion of the outside main passage housing 92 due to the processing for conductivity (i.e., heating with laser irradiation), the portion that is dimensionally changed is located outside of the bypass passage 30 (see FIG. 6). Therefore, flow rate measurement is not affected. In addition, the foreign matters are restricted from adhering to the connector 28, thereby restricting a short circuit.

Fourth Embodiment

Figure 24:
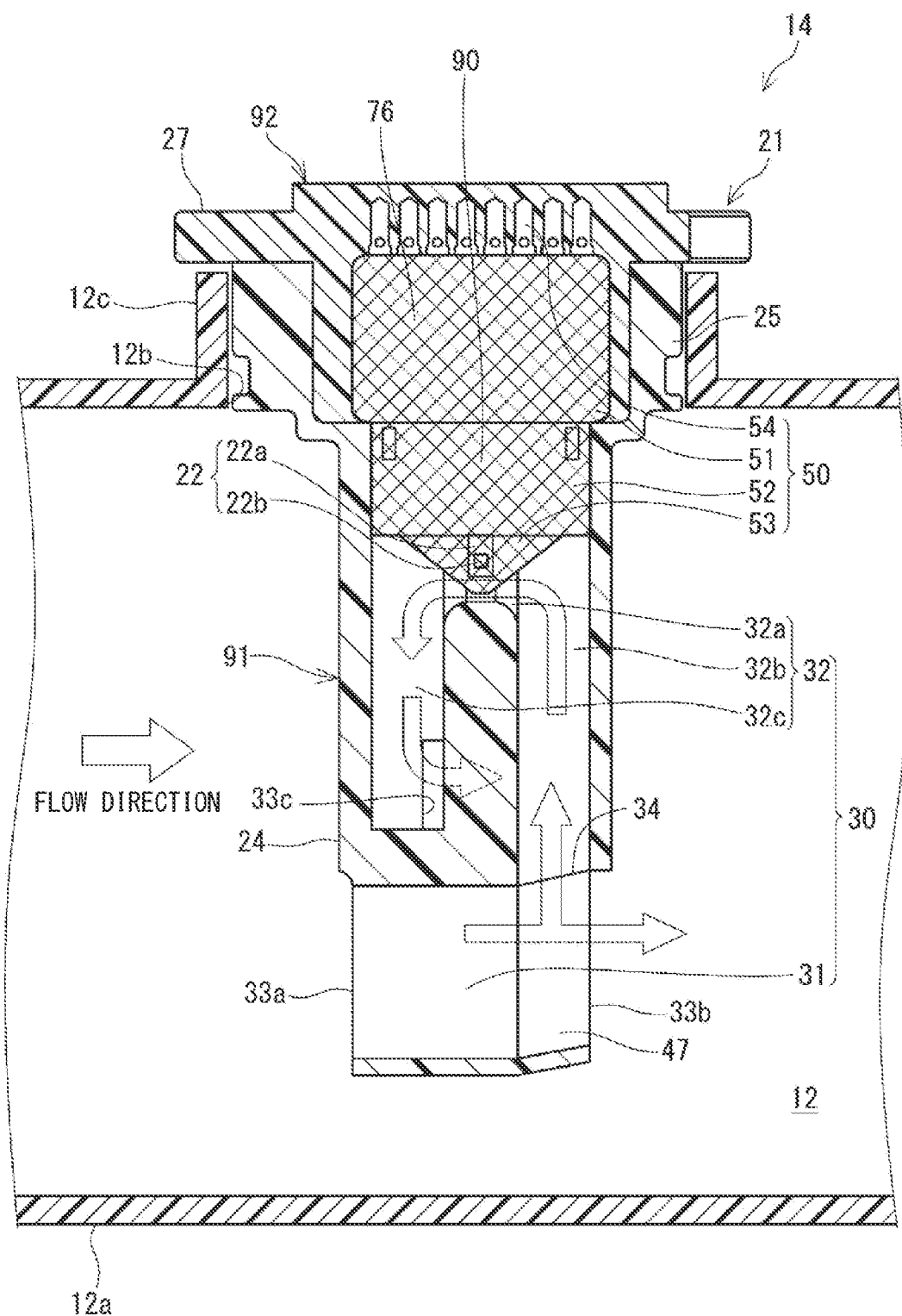
FIG. 24 is a cross-sectional view of an air flowmeter in a fourth embodiment.

In a fourth embodiment, as shown in FIG. 24, the non-insulation portion 90 is formed on the molding 76 as a sensor holder holding the flow rate detector 22. The hatched portion in FIG. 24 is a portion of an outer wall on which the non-insulation portion 90 is formed. As described above, the non-insulation portion 90 may be formed on the molding 76. Also in this case, the foreign matters are restricted from adhering to the flow rate detector 22 due to the polarization effect. Since especially a region near the flow rate detector 22 is made electrically conductive, polarization effect of the flow rate detector 22 is further increased and the foreign matters are further restricted from adhering to the flow rate detector 22.

Fifth Embodiment

Figure 25:
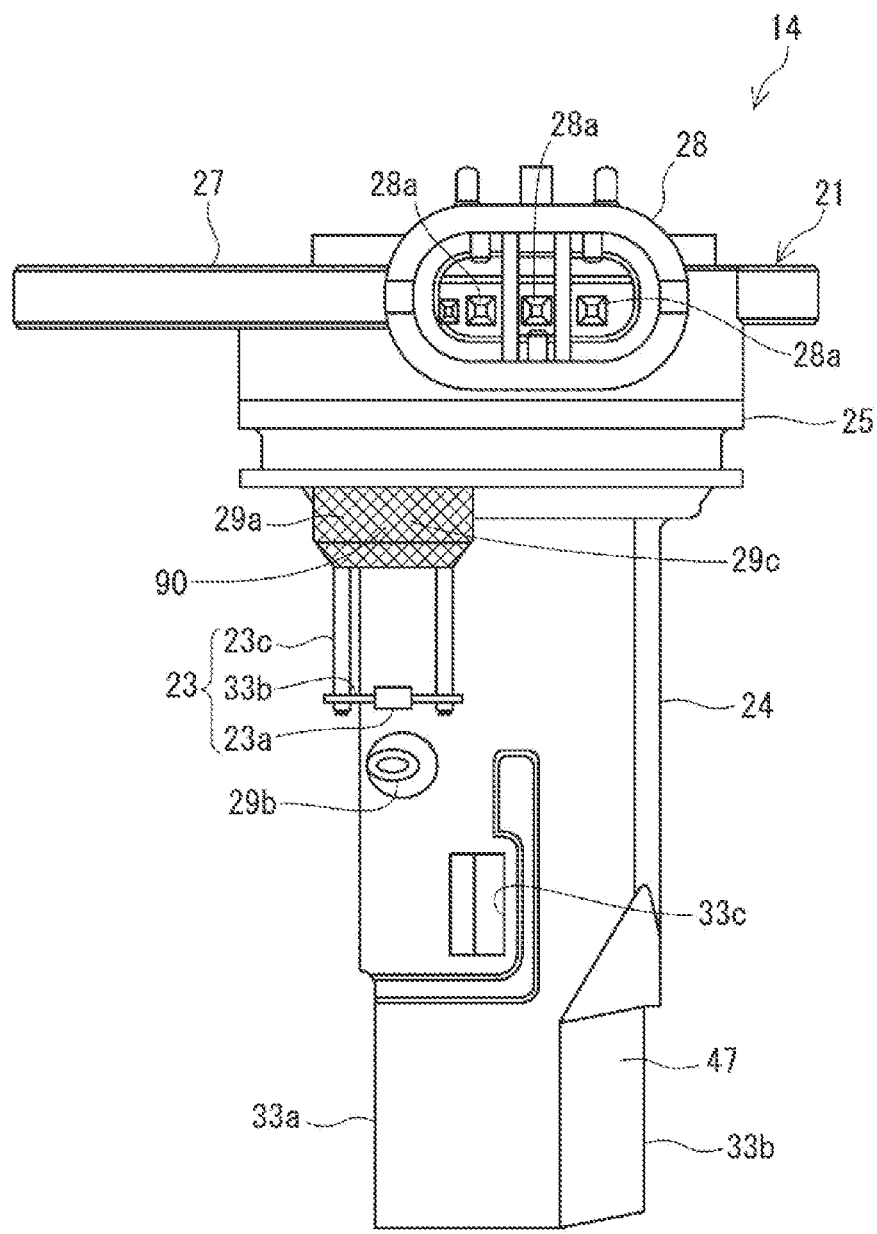
FIG. 25 is a front view of an air flowmeter in a fifth embodiment.
Figure 26:
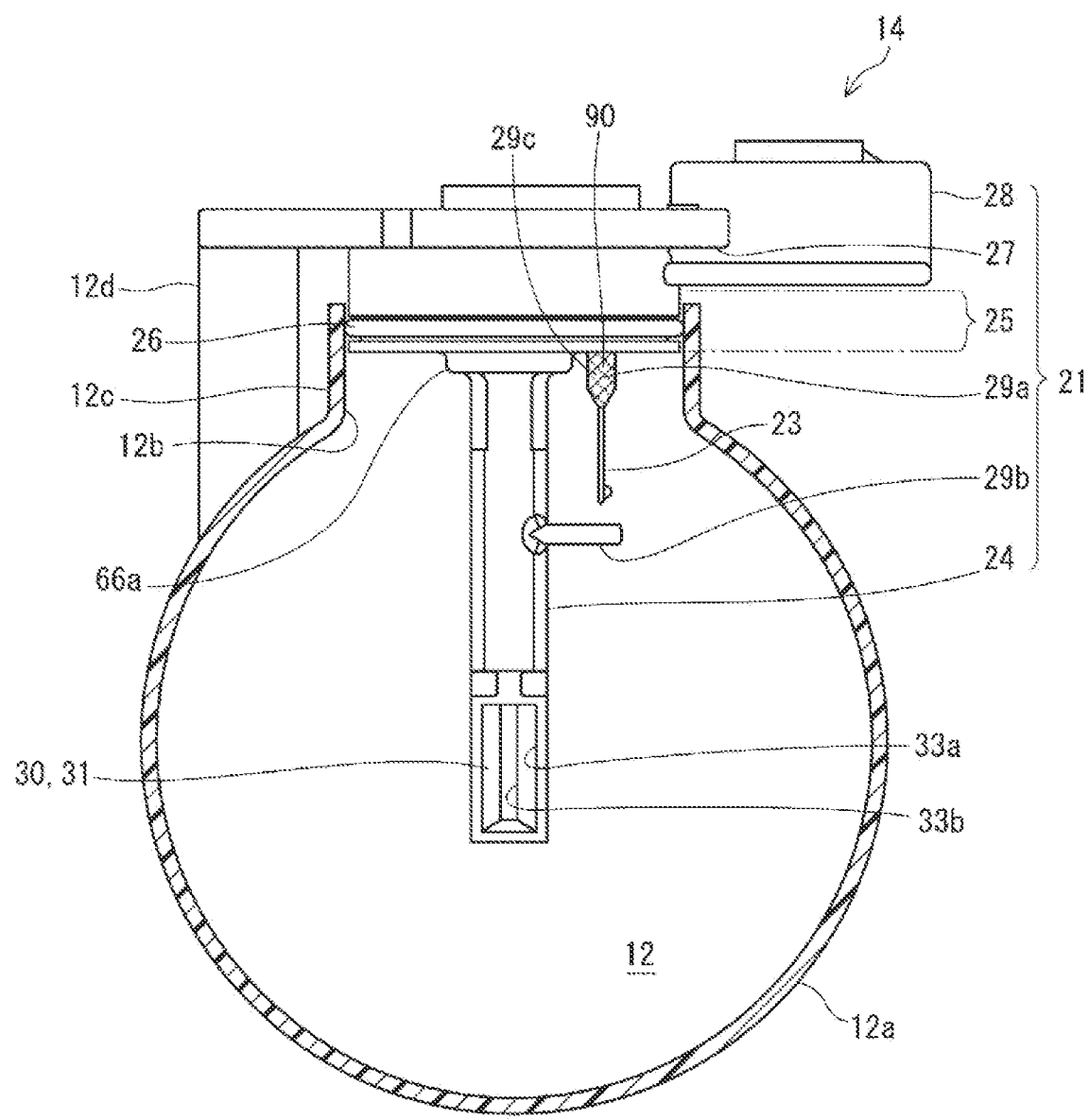
FIG. 26 is a side view of the air flowmeter in the fifth embodiment.

In a fifth embodiment, as shown in FIGS. 25 and 26, the non-insulation portion 90 is formed on the outer surface of the housing 21, specifically, on the root 29a. The hatched portion in FIGS. 25 and 26 is a part of the outer wall 29c having the non-insulation portion 90. The non-insulation portion 90 may be formed on the outer wall 29c of the root 29a as described above. Also in this case, the foreign matters are restricted from adhering to the flow rate detector 22 due to the polarization effect.

The non-insulation portion 90 includes a carbonized portion, which is generated through laser irradiation, at a contact boundary between the root 29a and the intake air temperature terminal 23c having the GND potential. As a result, the non-insulation portion 90 is connected to the contact interface at a constant potential, i.e., the GND potential. Thus, by forming a path for electric charge, the electric charge of foreign matters can be removed effectively. In addition, the electric potential can be easily taken from the terminal of the intake air temperature sensor 23. The non-insulation portion 90 may be connected to a constant potential such as a power supply potential other than GND potential. Also in this case, the same advantages can be obtained.

Sixth Embodiment

Figure 27:
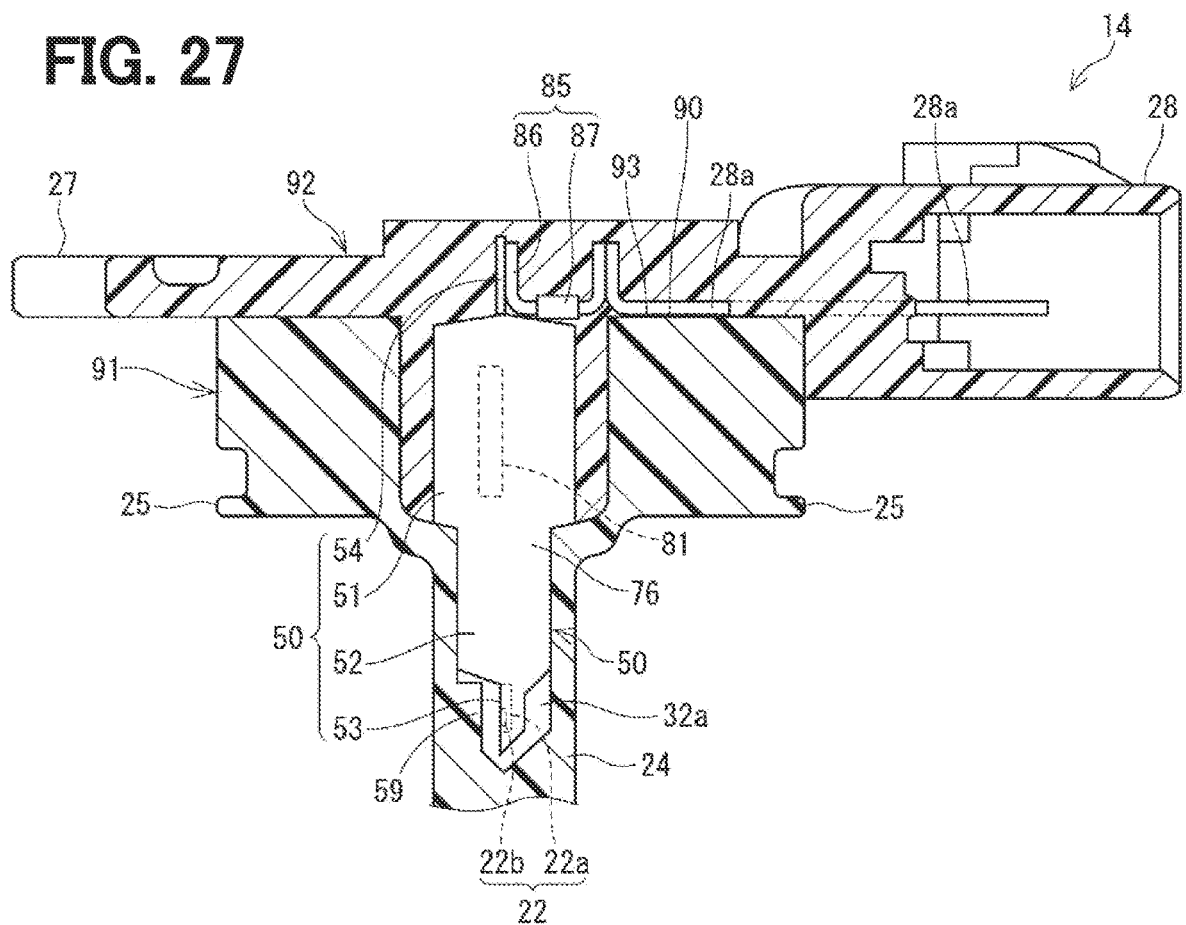
FIG. 27 is a cross-sectional view of an air flowmeter in a sixth embodiment.
Figure 28:
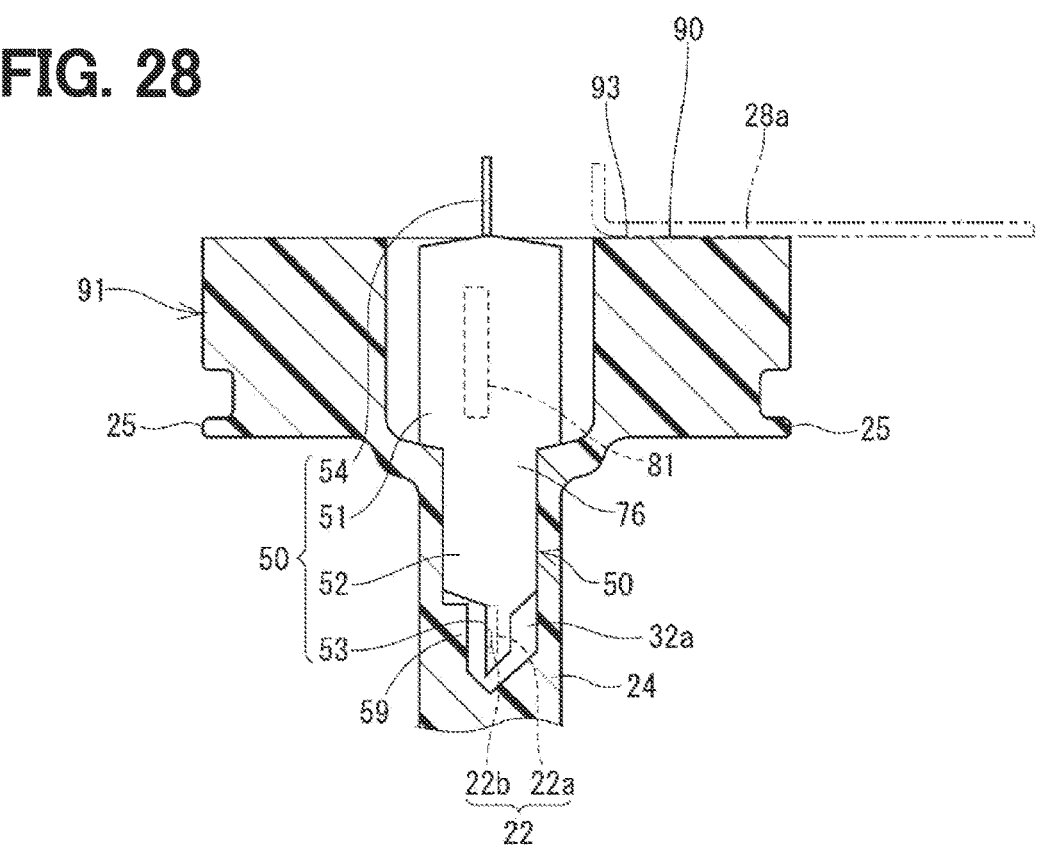
FIG. 28 is a cross-sectional view of a housing body in the sixth embodiment.

In a sixth embodiment, as shown in FIG. 27, the outer wall of the housing body 91 has a contact portion 93 that is contact with the connector terminals 28a having the GND potential. The non-insulation portion 90 is formed on the contact portion 93. The non-insulation portion 90 is formed by being irradiated with laser before the connector terminals 28a are attached as shown in FIG. 28. As a result, the non-insulation portion 90 is connected to a constant potential, i.e., the GND potential. Thus, by forming a path for the electric charge, the electric charge of foreign matters can be effectively removed. The electric potential can be easily taken from the connector terminals 28a.

Seventh Embodiment

Figure 29:
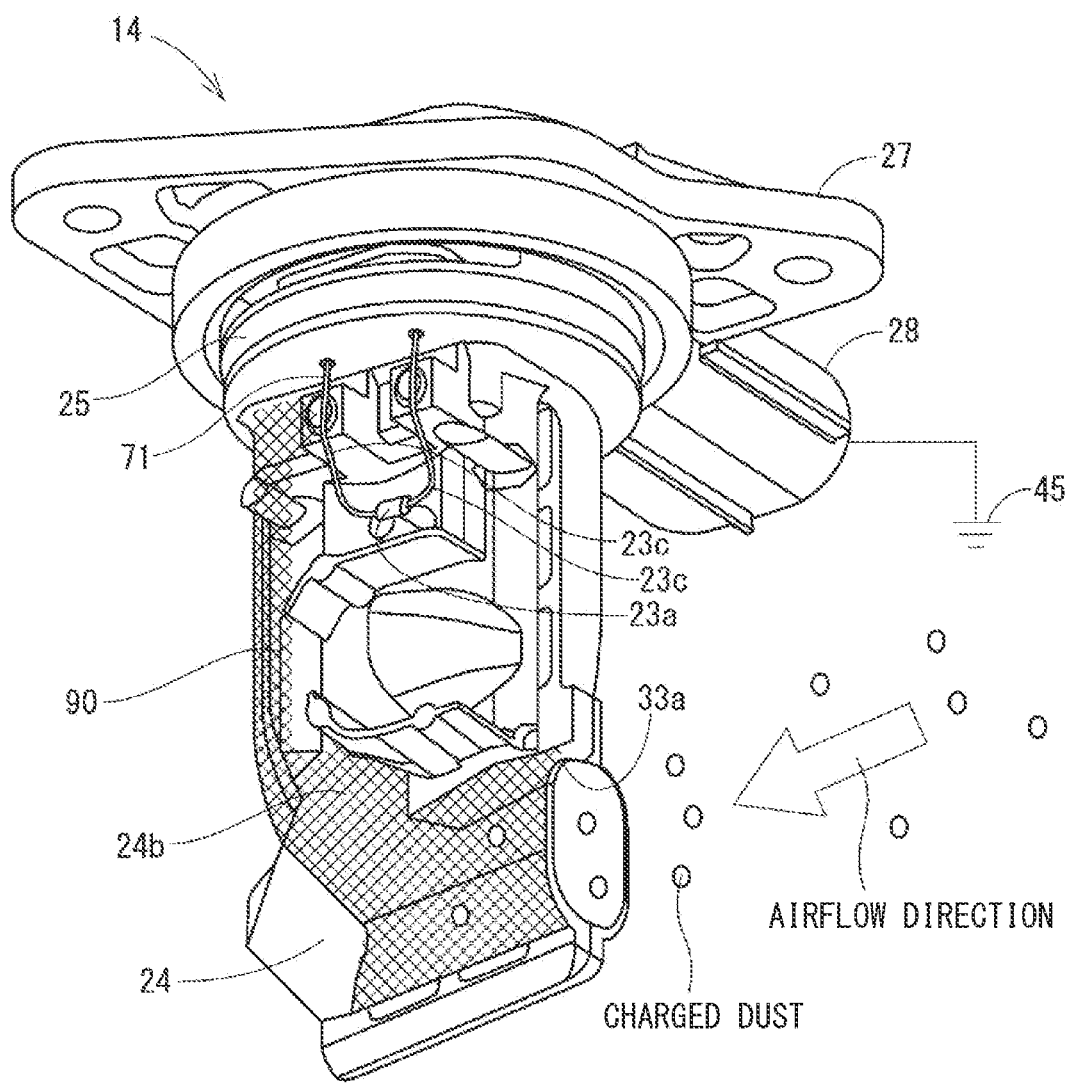
FIG. 29 is a perspective view of an air flowmeter in a seventh embodiment.

In a seventh embodiment, as shown in FIG. 29, the non-insulation portion 90 is formed on the outer surface of the housing 21, specifically, on the outer wall 24b of the bypass housing 24. The hatched portion in FIG. 10 is a portion of the outer wall 24b on which the non-insulation portion 90 is formed. The non-insulation portion 90 extends toward one terminal, which is connected to the ground 45, of the pair of intake air temperature terminal 23c protruding from the outer surface of the housing 21. The one terminal is referred to as a ground connecting portion 71.

Specifically, as shown in FIGS. 6 and 29, the non-insulation portion 90 is formed on a part of the outer wall 24b of the bypass housing 24 that is outside of the measuring passage 32. That is, the non-insulation portion 90 is located at a portion of the outer wall 24b corresponding to an inner wall defining the measuring passage 32. The non-insulation portion 90 is located at a portion of the outer wall 24b of the bypass housing 24 that corresponds to the flow passage 31, the introduction passage 32b, and the inlet opening of the detection passage 32a. The non-insulation portion 90 extends from a position of the outer wall 24b corresponding to the flow passage 31 to a position of the outer wall 24b near the ground connecting portion 71.

The ground connecting portion 71 is located on one side portion of the outer wall 24b of the bypass housing 24. The non-insulation portion 90 is located only on the one side portion of the bypass housing 24. Hereinafter, forming the non-insulation portion 90 will be referred to as graphitization.

Figure 30:
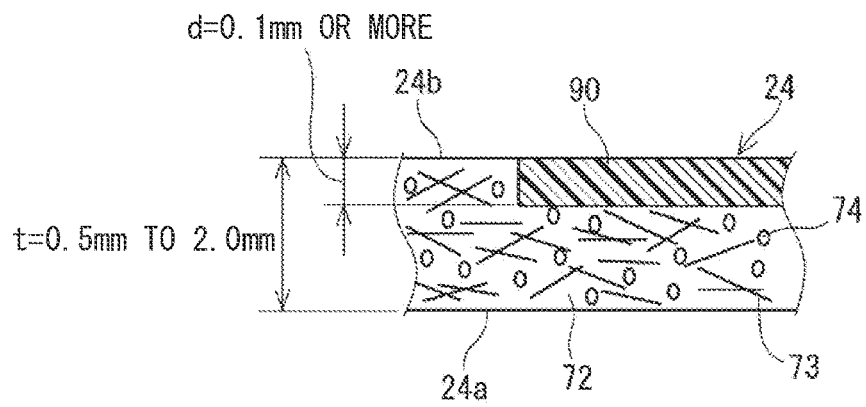
FIG. 30 is a cross-sectional view of a housing in the seventh embodiment taken along a direction parallel to an extending direction of a non-insulation portion.
Figure 31:
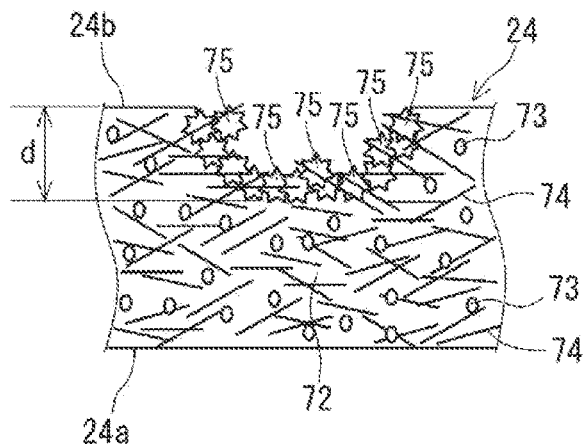
FIG. 31 is a cross-sectional view of the housing in the seventh embodiment taken along a direction perpendicular to the extending direction of the non-insulation portion.

As shown in FIGS. 30 and 31, the optimum configuration for graphitization is a configuration in which at least glass fibers 73 are added to a polymer 72 of PBT resin, the polymer 72 is carbonized by being treated at high temperature (e.g., irradiated with a laser) to generate graphite 75, and the graphite 75 is mechanically fixed by the glass fibers 73 and glass particles 74. The glass fibers 73 and the glass particles 74 are not burned and remain as they are even after being treated at high temperature. The electric conductivity of the non-insulation portion 90 can be improved by setting a thickness d of the graphitization layer to a value equal to or higher than 0.1 mm relative to a plate thickness t, of 0.5 to 2.0 mm, of a passage forming portion of the bypass housing 24.

As shown in FIG. 29, in case that charged dusts causing electrification flows in the airflow direction, it is safe and effective to remove the charge of the dusts at the flow passage 31 that is an inlet portion located in a position farthest from the flow rate detector 22. Therefore, it is the most appropriate to graphitize the portion of the outer wall 24b of the bypass housing 24 that corresponds to the flow passage 31. When the outer surface corresponding to the flow passage 31 and the outer surface located near the ground connecting portion 71 are connected to the non-insulation portion 90, static electricity can be released to the ground 45. Even if the non-insulation portion 90 and the ground connecting portion 71 are not connected to each other, the same effect can be obtained if a distance therebetween is kept in a distance that allows the electricity to be released with an insulating breakdown (e.g., 0.5 to 2.0 mm).

A difference of an antistatic mechanism between a comparative example in which antistatic agent is added to a resin member of the housing and a seventh embodiment in which the non-insulation portion 90 containing graphite is located on the outer surface of the housing 21 will be described.

Figure 35:
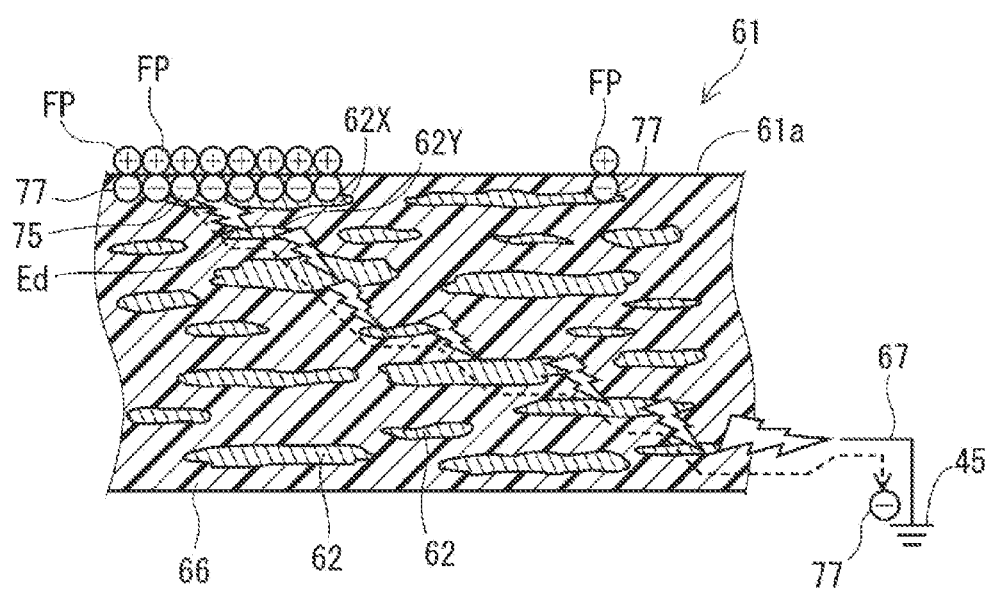
FIG. 35 is a cross-sectional view illustrating an antistatic mechanism in the comparative example in which the antistatic agent is added to the resin of the housing.

At first, the comparative example will be described. In the comparative example, as shown in FIG. 35, multiple negative charges 77 are gathered at a conductive portion 62X that is closer to an outer surface 61a of the housing 61. Thus, multiple positive foreign matters Fp are adhered to the outer surface 61a of the housing 61 by being electrically attracted to the negative charges 77. In this case, the larger the number of the negative charges 77 gathered at the conductive portion 62X is, the higher the potential of the conductive portion 62X in the negative direction is. That is, the housing 61 is negatively charged with static electricity and the conductive portion 62X is included in a skin layer of the housing 61. When a voltage due to this potential becomes high to some extent in the housing 61, a discharge Ed occurs between the conductive portion 62X and a conductive portion 62Y near the conductive portion 62X.

When the discharge Ed occurs between the conductive portion 62X and the conductive portion 62Y, an insulating breakdown occurs at a position of an insulation portion 66 between the conductive portion 62X and the conductive portion 62Y. The negative charges 77 of the conductive portion 62X are transferred to the conductive portion 62Y. Such discharges and insulating breakdowns occur at multiple portions in a path between the conductive portion 62X and a ground terminal 67. As a result, the negative charges 77 remained in the conductive portion 62X can be discharged to the ground 45 through the multiple conductive portions 62X and the ground terminal 67. As described above, when the negative charges 77 that electrically attract the multiple positive foreign matters Fp are discharged from the conductive portion 62X, the positive foreign matters Fp are likely to depart from the outer surface 61a of the housing 61. Thus, the housing 61 is restricted from being negatively charged and from generating negative charges 77 again due to the positive foreign matters Fp in contact with the outer surface 61a.

Figure 32:
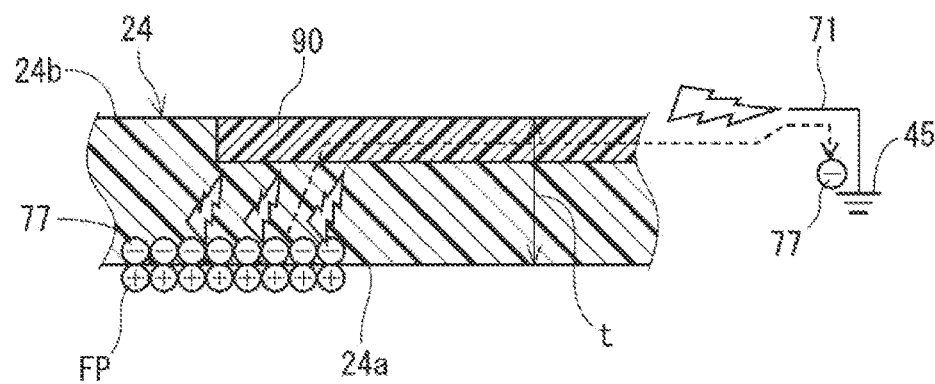
FIG. 32 is a cross-sectional view illustrating an antistatic mechanism in the seventh embodiment in which the non-insulation portion containing a graphite is formed on the outer surface of the housing.

Next, the seventh embodiment will be described. In the seventh embodiment, as shown in FIG. 32, a base material resin is polarized by multiple positive foreign matters Fp, and the negative charges 77 are gathered on the inner wall 24a of the bypass housing 24. The large amount of the positive foreign matters Fp are electrically attracted to the inner wall 24a. In this case, the larger the number of the negative charges 77 are located on the inner wall 24a, the more negatively the inner wall 24a is charged. When a potential of the inner wall 24a becomes high to some extent, a discharge Ed due to an insulating breakdown occurs between the inner wall 24a and the graphite in the outer wall 24b that is a conductive layer (i.e., the non-insulation portion 90). This phenomenon is likely to occur at the graphite layer that is generated in a resin product having a plate thickness of 0.5 to 2.0 mm and that has a state static electricity of negative charge equal to or less than −1 kV, which attracts dusts having positive charges.

When the discharge Ed occurs, due to an insulating breakdown, between the inner wall 24a and the non-insulation portion 90 of the outer wall 24b that is a conductive layer, the negative charges 77 of the inner wall 24a transfer to the non-insulation portion 90 of the outer wall 24b. Such discharges and insulating breakdowns occur at multiple portions, thus the negative charges 77 remained in the inner wall 24a can be released to the ground 45 through the non-insulation portion 90 and the connector terminals 28a (i.e., the ground terminal). As described above, when the negative charges 77 that electrically attract the multiple foreign matters Fp are released from the inner wall 24a, the multiple foreign matters Fp are likely to depart from a surface of the inner wall 24a. Thus, the inner wall 24a is restricted from being negatively charged and from generating negative charges 77 again due to the positive foreign matters Fp in contact with the inner wall 24a. The non-insulation portion 90 of the outer wall 24b is graphite of the conductive layer, thus the foreign matters Fp are less likely to be electrically attracted to the outer wall 24b.

(Advantages)

As described above, in the seventh embodiment, the outer wall 24b of the housing 21 includes the non-insulation portion 90 that contains the carbonized material to have conductivity and that discharges the electric charge to the ground 45. In the heating step, the outer wall 24b of the housing 21 is heated such that the non-insulation portion 90 is formed on the outer wall 24b of the housing 21 and the electric charge can be released from the non-insulation portion 90 to the ground 45. Therefore, similarly to the first embodiment, it is possible to suppress the characteristic deviation and the deterioration of the moldability of the housing 21.

In the seventh embodiment, the non-insulation portion 90 is formed on the outer wall 24b of the bypass housing 24 that is outside of the measuring passage 32. Thus, the foreign matters flowing through the measuring passage 32 is likely to be discharged. In addition, it is unnecessary to form the non-insulation portion 90 on the inner wall of the housing 21, thus the non-insulation portion 90 can be formed after components of the air flowmeter 14 are assembled into the air flowmeter 14.

In the seventh embodiment, the non-insulation portion 90 extends toward the ground connecting portion 71 that is connected to the ground 45, so that electric charges can be released to the ground 45 through the ground connecting portion 71. In the heating step, the outer surface of the housing 21 is heated such that the non-insulation portion 90 extends toward the ground connecting portion 71 that is connected to the ground 45 to release electric charges from the non-insulation portion 90 to the ground 45 through the ground connecting portion 71. The ground connecting portion 71 is used to release the electric charges, thus a ground line exclusive for the non-insulation portion 90 is not needed.

In the seventh embodiment, the pair of intake air temperature terminal 23c protruding from the outer surface of the housing 21 is disposed. One of the intake air temperature terminals 23c is the ground connecting portion 71. In the preparing step, the pair of intake air temperature terminal 23c protruding from the outer surface of the housing 21 are prepared. In the heating, the outer surface of the housing 21 is heated such that the non-insulation portion 90 extends toward the ground connecting portion 71 that is the one of the intake air temperature terminals 23c. The intake air temperature terminal 23c is used to discharge the electric charge.

In the seventh embodiment, the ground connecting portion 71 is located on one side portion of the outer wall 24b of the bypass housing 24. The non-insulation portion 90 is located on the one side portion of the bypass housing 24. As a result, it is not necessary to turn over the bypass housing 24 when forming the non-insulation portion 90, so that the number of steps for forming the non-insulation portion 90 can be reduced.

The non-insulation portion 90 as described in the first to seventh embodiments includes a carbonized portion 115 which will be described in eighth to seventeenth embodiments. A resin member 110 in the eighth to seventeenth embodiment corresponds to the housing 21 in the first to seventh embodiments.

Eighth Embodiment

Figure 36:
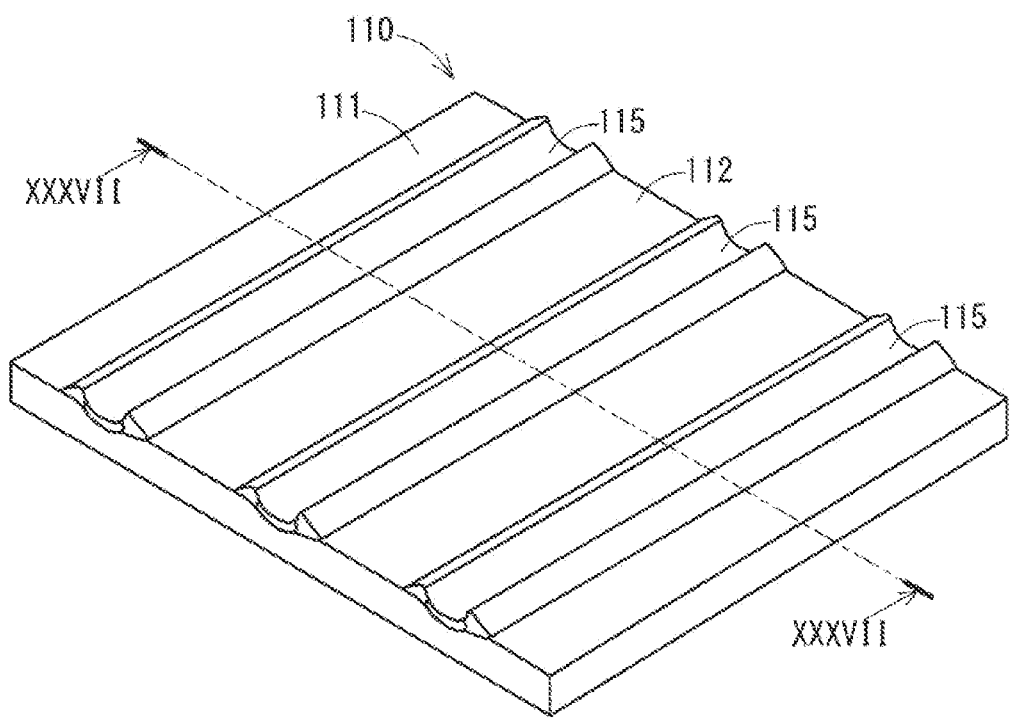
FIG. 36 is a perspective view of a resin in an eighth embodiment.
Figure 37:
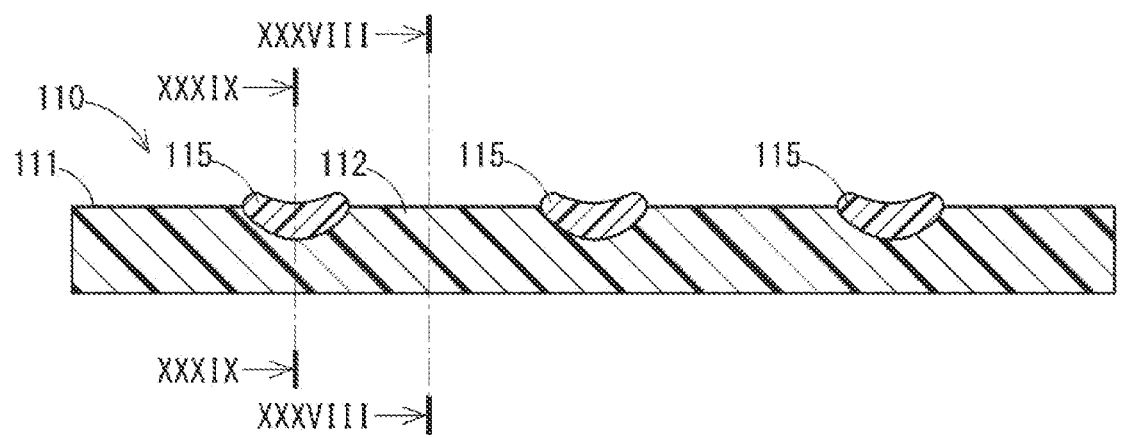
FIG. 37 is a cross-sectional view taken along a line XXXVII-XXVII in FIG. 36.
Figure 38:
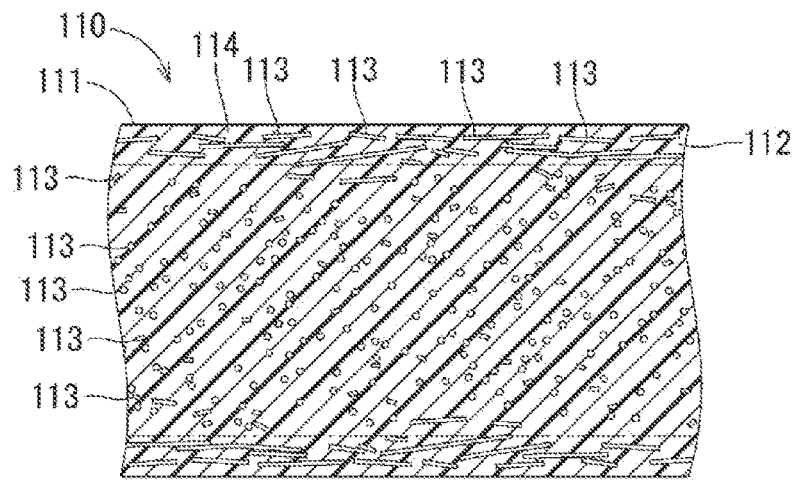
FIG. 38 is a cross-sectional view taken along a line XXXVIII-XXXVIII in FIG. 37.

A resin member in the eighth embodiment is described in FIGS. 36 and 37. The resin member 110 is made of resin that has a base polymer having insulation property as a main component and fillers. As shown in FIG. 38, an oriented layer 112 is located near a surface 111 of the resin member 110. The oriented layer 112 includes many fillers 113 that are oriented in a direction parallel to the surface 111 (hereinafter, referred to as a surface direction) and a base polymer 114 filled among the fillers 113.

Figure 39:
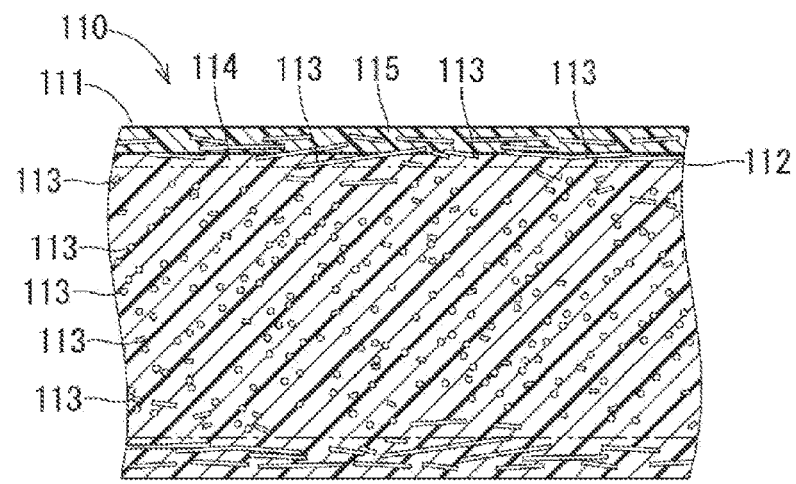
FIG. 39 is a cross-sectional view taken along a line XXXIX-XXXIX in FIG. 37.
Figure 43:
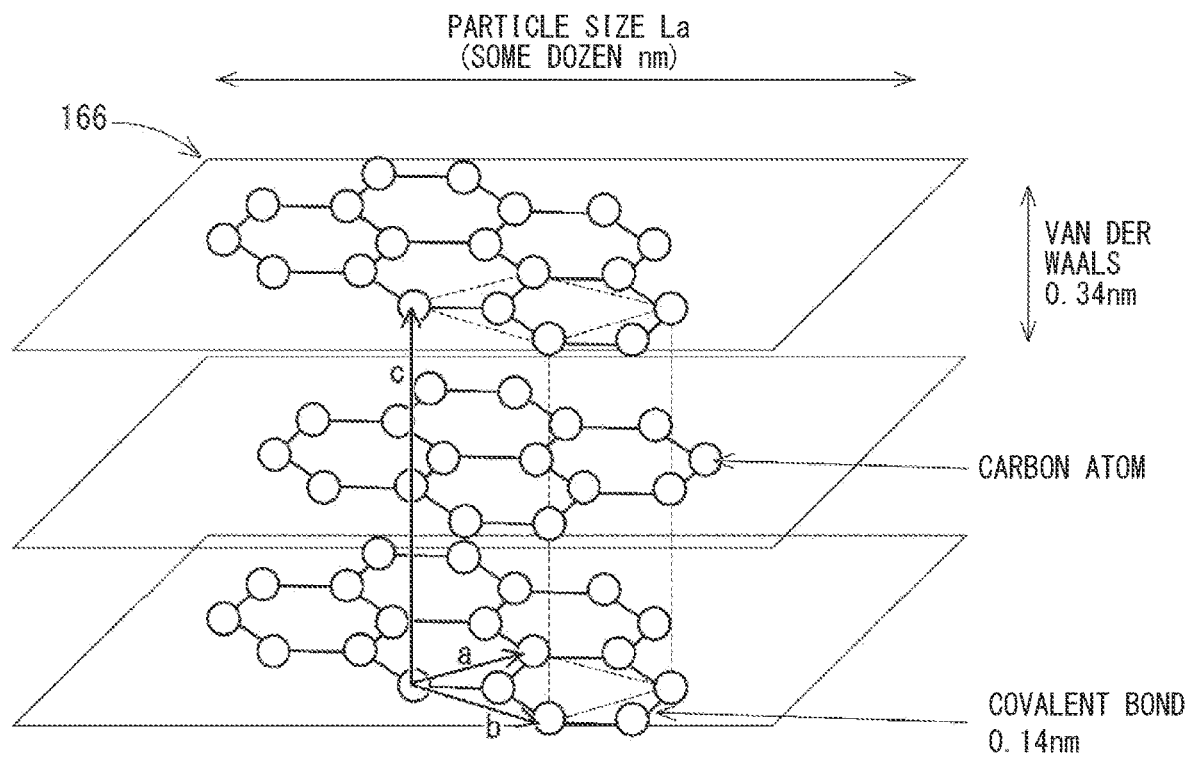
FIG. 43 is a schematic view of a-b surface of a graphite configuring a carbonized portion of FIG. 39.

As shown in FIG. 39, the oriented layer 112 includes the carbonized portion 115 containing graphite that is a carbonized material of the base polymer 114 to have electric conductivity and thermal conductivity. The graphite has carbon atoms that are bonded with each other as shown in FIG. 43. In the graphite, one electron of the four outer shell electrons of each of the carbon atoms is free to transfer. Thus, the carbonized portion 115 is electrically conductive.

A thickness of a portion of the resin member 110 in which the carbonized portion 115 is formed is equal to or larger than 300 μm. As shown in FIG. 36, in the eighth embodiment, the resin member 110 includes multiple carbonized portions 115 extending straight, which forms a conductive pattern. The conductive pattern is used as a static electricity removing circuit in an electronic device such as an air flowmeter and a rotation angle sensor. When the carbonized portion 115 is used as the static electricity removing circuit, a volume resistivity of the generated carbonized material is at least equal to or less than $1.0 \times 10^{-3}$ Ωm, preferably equal to or less than $1.0 \times 10^{-4}$ Ωm, more preferably equal to or less than $1.0 \times 10^{-5}$ Ωm. The carbonized portion 115 may configure other pattern such as a lattice. A shape of the carbonized portion 115 is not limited to a pattern and may be a film. The carbonized portion 115 may be used as a wiring circuit, an electromagnetic shield, an antistatic portion, or a heat-dissipating member other than the static electricity removing circuit.

Figure 40:
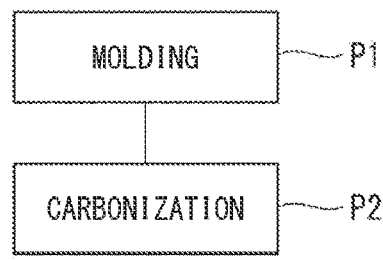
FIG. 40 is a step view illustrating a manufacturing method in the eighth embodiment.

Next, a method for manufacturing the resin member 110 will be described. The method for manufacturing the resin member 110 includes a molding step P1 and a carbonization step P2 as shown in FIG. 40.

<Molding Step (First Molding Step)>

Figure 41:
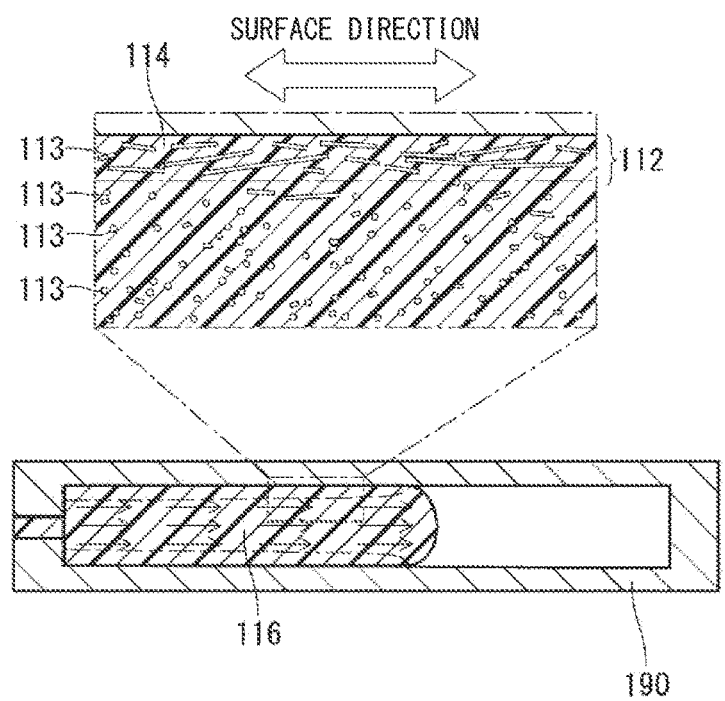
FIG. 41 is a cross-sectional view illustrating a state in which melting resin is injected into a mold in a molding step of the manufacturing method in the eighth embodiment and illustrating an oriented state of molecular chains around a boundary between the mold and the melting resin.

In the molding step P1, as shown in FIG. 41, a resin material including the fillers 113 and the base polymer 114 having insulation property are melted at a predetermined plasticizing temperature. Then, the melting resin 116 is injected at high speed into a mold 190 having a predetermined shape. The melting resin 116 is cooled and solidified while being applied pressure. In this process, a shear stress is applied to a boundary between a surface of the mold 190 and a surface of the melting resin 116 or between a resin material stuck on the surface of the mold 190 by being deprived of heat by the mold 190 when injected and the melting resin 116 that still has fluidity around a center of the thickness. As a result, the fillers 113 are preferentially oriented in the surface direction rather than a surface normal direction and the base polymer 114 extends straight between the fillers 113 to form the oriented layer 112 in a vicinity of a surface of a molding 117.

The fillers 113 relax a heating rate at which the carbonized portion 115 (see FIG. 39) is formed and restricts, with an anchor effect, the carbonized material from scattering even if the resin material is carbonized at a high temperature. Thus, detail conductive patterns can be accurately formed even under a temperature condition at which the carbonized material would severely scatter and it would be difficult to form detail conductive patterns if a natural resin member without fillers were used.

Not to restrict conduction between the carbonized materials on the conductive pattern, it is preferable that the fillers 113 are oriented in the surface direction.

Comparing a condition in which the resin member contains about 40 wt % of glass fibers as the fillers 113 to a condition in which the resin member does not contain the fillers 113, conductivity of the conductive pattern generated by laser irradiation is significantly better in the former condition. Comparing a condition in which the resin member contains about 40 wt % of the glass fibers as the fillers 113 to a condition in which the resin member contains about 15 wt % of the glass fibers, conductivity of the conductive pattern generated by laser irradiation is better in the former condition. Comparing a condition in which a portion in which the fillers 113 are oriented is carbonized by laser irradiation to a condition in which a portion in which the fillers 113 are not oriented is carbonized by laser irradiation, the conductivity of the conductive pattern is significantly better in the former condition.

A method for producing the molding 117 may be an injection molding, transfer molding, an extrusion molding, and a compression molding. The injection molding is preferable because applied shear stress is large and the oriented layer 112 in which the fillers 113 are more oriented can be obtained.

Figure 42:
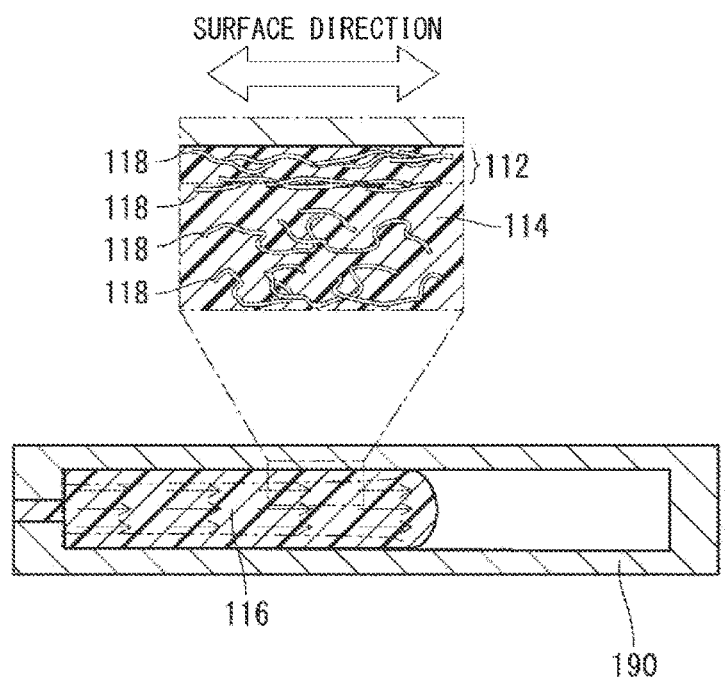
FIG. 42 is a cross-sectional view of the mold corresponding to FIG. 41 illustrating an oriented state of molecular chains around the boundary between the mold and the melting resin.

As shown in FIGS. 41 and 42, in the oriented layer 112, the fillers 113 and molecular chains 118 are oriented in the surface direction and the base polymer 114 extends straight and fills around the fillers 113. As a result, the carbonized material generated when being carbonized is oriented in the surface direction and likely to be an extending layer, thereby improving the electric conductivity and thermal conductivity in the surface direction. Shear stress is also applied to the base polymer 114 in the surface direction, thus the molecular chains 118 are oriented. As a result, an a-b surface (see FIG. 43) of the graphite forming the carbonized material is likely to be oriented in the surface direction. Therefore, the electrical conductivity and thermal conductivity in the surface direction are improved. The effects described above are particularly effective when selecting, as the base polymer 114, a thermoplastic resin that is mainly composed of a chain polymer.

In a method for producing the molding 117, it is preferable that shear stress be applied to a surface of a portion to be carbonized in molding and the fillers 113 and the molecular chains 118 be oriented. It is preferable to avoid forming a weld line or a final filling portion at the portion to be carbonized and to avoid a position, a shape, and a condition of a gate that may cause jetting. A mold surface may perform a motion that increases shear stress such as sliding and rotating to improve an orientation degree of the fillers 113 and the molecular chains in the molding step. The method for producing the molding 117 is not limited to an injection molding while the oriented layer 112 is formed in a vicinity of the surface of the molding 117.

It is preferable that the base polymer 114 be a material having a high carbon content and a carbon cyclic structure similar to the a-b surface of the graphite at a point that the base polymer 114 is carbonized in the following carbonization step P2 to form a graphite like structure. For example, the base polymer 114 may be a condensation aromatic polymer composed at least of one polymer selected from polyacrylonitrile, polyacryl/styrene, polyarylate, polyimide, polyamide-imide, polyimide, polyether ether ketone, polyether ketone, polyetherimide, polyether nitrile, polyethersulfone, polyoxybenzylmethyleneglycolanhydride, polyoxybenzoyl polyester, polysulfone, polycarbonate, polystyrene, polyphenylenesulfide, poly(p-xylene), polyethylene terephthalate, polybutylene terephthalate, polyethylene naphthalate, polyphenylene ether, liquid crystal polymer, bisphenol A copolymer, bisphenol F copolymer. The aromatic polymer is preferable at a point that the aromatic polymer contains, in a main chain, six membered ring of carbon (i.e., benzene ring) that is a basic structure of the graphite. However, it is not particularly limited to this. It is more preferable that the base polymer 114 has a self-extinguish property to prevent excessive combustion when being carbonized and to be locally carbonized.

It is preferable that the fillers 113 be superior in both strength and heat resistance and have a shape having a high aspect ratio to slow the heating rate and to restrict the carbonized material from scattering. The heating rate can be slowed down by decreasing a temperature of a spot processed with laser beam to reduce decomposition gas that is generated by rapidly increasing a temperature through a heat treatment in the following carbonization step P2. The carbonized material is restricted from scattering due to the decomposition gas by the fillers 113 serving as an anchor. That is, it is preferable that the fillers 113 have fiber shapes that are less likely to be combusted than the base polymer 114, for example, inorganic fibrous substance. Specifically, the fillers 113 are preferably glass fibers due to the low cost in addition to the above. When the glass fibers are used, the glass is melt and solidified through the heat treatment. Thus, it is expected that a fixability of the carbonized material be improved. The fillers 113 may contain a flame-retardant material to impart self-extinguishing property for preventing excessive combustion in the carbonization and for locally performing the carbonization.

The additive amount of the glass fibers is preferably an amount in which the electrical conductivity and thermal conductivity are maximized. If the additive amount of the glass fibers is too small, the glass fiber cannot sufficiently fix the carbonized material with the anchoring effect. As a result, the carbonized material is more likely to be scattered by the decomposition gas that is rapidly generated through heating and carbonization. This may decrease electric conductivity and thermal conductivity. If the additive amount of the glass fibers is too large, an amount of the polymer is relatively decreased and a density of the carbonized material is decreased, which decreases electric conductivity and heat conductivity. Based on this, if the base polymer 114 is a polymer naturally having density of around 1.3 to 1.4 g/cm$^2$ such as polyphenylenesulfide, polybutylene terephthalate, polyether ether ketone, polyoxybenzylmethyleneglycolanhydrite, and the like, as a weight ratio of the glass fibers to the entire member, a weight ratio of the fillers 113 to the resin member 110 as a whole falls within 30 wt % to 66 wt %, preferably 30 wt % to 40 wt %, more preferably 40 wt %.

A material configuring the fillers 113 may be aramid fiber, asbestos fiber, gypsum fiber, carbon fiber, silica fiber, silica-alumina fiber, alumina fiber, zirconia fiber, silicon nitride fiber, silicon fiber, potassium titanate fiber, and inorganic fibrous substances such as metallic fibrous substances of stainless steel, aluminum, titanium, copper, and brass, other than the glass fiber.

Examples of a granular filler include silica, quartz powder, glass beads, milled glass fiber, glass balloon, glass powder, calcium silicate, aluminum silicate, kaolin, talc, clay, diatomaceous earth, silicates such as wollastonite, and metal oxide such as iron oxide, titanium oxide, zinc oxide, antimony trioxide, and alumina, metal carbonates such as calcium carbonate and magnesium carbonate, metal sulfates such as calcium sulfate and barium sulfate, other ferrites, silicon carbide, silicon nitride, boron nitride, various metal powders and the like. Examples of a plate-shaped filler include mica, glass flakes, various metal foils and the like. However, the fillers 113 are not limited to this while the fillers 113 can fix the carbonized material and form the oriented layer.

By adding the fillers 113 superior in electric conductivity or thermal conductivity, the electric conductivity and the thermal conductivity of the molding 117 can be increased by carbonizing the base polymer 114 even if the molding 117 before the carbonization already has the electric conductivity or thermal conductivity.

<Carbonization Step>

Figure 44:
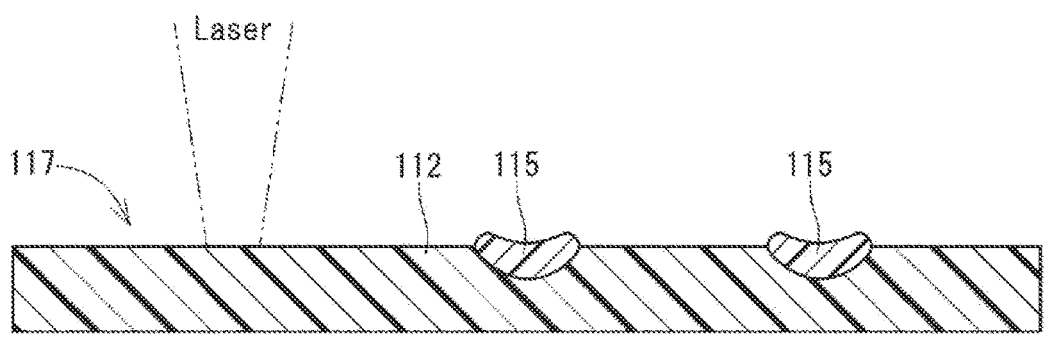
FIG. 44 is a cross-sectional view illustrating a state in which an oriented layer of a molding is irradiated with a laser beam in a carbonization step of the manufacturing method in the eighth embodiment.

As shown in FIG. 44, in the carbonization step P2, the oriented layer 112 located in a vicinity of the surface of the molding 117 is heated at at least 1000° C. by, for example, irradiating the vicinity of the surface with laser beam to cleavage bonds of the material polymer. As a result, constituent elements other than carbon are released as decomposition gas such as carbon dioxide, carbon oxide, nitrogen, and hydrogen. More preferably, the molding 117 is heated at equal to or more than 2000° C. to convert a part of the molding 117 to the graphite that six membered rings of carbon are connected and extend in a plane surface. As a result, the carbonized portion 115 including the graphite is locally generated in a surface of the oriented layer 112. The carbonized portion 115 gives electric conductivity or thermal conductivity. It is preferable that carbonization treatment is performed in inert gas to restrict carbon components from decreasing. Examples of the inert gas include argon, helium, and the like.

As the temperature applied through the heat treatment increases, the resin material can be converted to high quality graphite that is superior in electric conductivity or thermal conductivity. Thus, the temperature applied through the heat treatment is preferably equal to or higher than 2000° C. so as to obtain carbonized material having good electric conductivity and thermal conductivity. Examples of the local heat treatment include laser beam irradiation, plasma treatment, high-pressure steam treatment, electron beam irradiation, and a heating using Joule heat. The heat treatment is preferably performed with the laser beam irradiation because the high temperature more than 2000° C. can be locally applied in a short time, which is economical.

A graphite film is generally produced by gradually heating in a furnace over a long time as disclosed in JP 2008-24571 A. Compared to this, the heating rate is higher when the laser beam irradiation is used. When the resin is irradiated with the laser beam to rapidly increase the temperature of the resin, carbonized material having electric conductivity and decomposition gas are generated. An impact generated when the decomposition gas is emitted is strong. Thus, the carbonized material may depart from the base material together with the decomposition gas. That is, the carbonized material scatters significantly when the decomposition gas is rapidly emitted. This causes the electric conductivity and thermal conductivity of the carbonized portion 115 to decrease. In particular, when a member having a thickness of at least 300 μm that is different from a thin member such as a film is carbonized, it is difficult to release the decomposition gas generated inside the member and the carbonized material is likely to scatter while destroying structures in a process in which the decomposition gas is released. This is a big cause to decrease the electric conductivity and the thermal conductivity.

In this embodiment, to restrict such phenomena, the fillers 113 are added to the resin material to some extent to slow the heating rate and anchor the carbonized material in the carbonization step. The main cause that the temperature increases with the laser irradiation is heat generated by absorbing laser light and a combustion heat generated when the base polymer 114 is carbonized. The latter influences more on the temperature increase. When the fillers 113 are added to the resin material to some extent, the amount of the base polymer 114 in the resin material is relatively decreased, thereby reducing the combustion heat and slowing the heating rate. The fillers 113 fixed to the base polymer 114 enter into or pass through the carbonized material to serve as like a wedge, which generates an anchor effect that the carbonized material and the base polymer 114 are restricted from being separated. The fillers 113 are fixed to a portion of the resin that is adjacent to the carbonized portion 115 and not to be carbonized or a portion of the resin that is located on a downstream side in the laser scanning direction and has not irradiated with laser yet. Thereby, the carbonized material anchored by the fillers 113 is restricted from falling off. This prevents the carbonized material from scattering and falling off, and improves the fixability.

In addition, by forming a layer in which the fillers 113 are oriented in the surface direction before the carbonization, a structure in which polymer filling among the fillers 113 is carbonized is also has a layer shape extending in the surface direction. This improves the electric conductivity and the thermal conductivity. In this embodiment, in the molding step P1, the polymer configuring the base polymer 114 is applied with shear stress when the polymer is melting and the polymer is oriented in the surface direction. Thus, it is likely to reduce an angle between the surface direction and the a-b surface of the graphite forming the carbonized material. This improves the electric conductivity and the thermal conductivity in the surface direction.

As for a method for irradiating with the laser beam, the oriented layer 112 before carbonization may be scanned once with a laser beam having a high energy density (i.e., laser intensity) to form a pattern as fine as possible in a short time. In contrast, to restrict the decomposition gas from rapidly generating and the carbonized material from scattering, a scanning may be performed in a two step such that the oriented layer 112 is irradiated with a laser beam having a relatively low energy density under a depressurized environment to form a structure containing carbon as a main component at a relatively gentle heating rate and then irradiated with a laser beam having a high energy density to increase the temperature and promote carbonization. The irradiation may be performed appropriately in multiple steps. After a conductive pattern is formed with a laser beam or during the formation of the conductive pattern, heating with Joule heat may be performed by applying voltage to promote the carbonization.

As for an orbit of the laser beam, a linear pattern is depicted by simply scanning with the laser beam. In this time, a part of the polymer evaporates and is removed in a vicinity of a focus of the laser beam to form recesses. As for other scanning method, an elaborate carbonized film can be formed in a wide area by scanning an arbitrary surface without gaps with the laser beam. Also in this case, the laser beam evaporates and removes a part of the polymer to form recesses along the orbit of the laser. Thus, a surface of the polymer becomes uneven. During the laser beam irradiation, the laser beam may move relative to the molding 117, the molding 117 may move while fixing the laser, or the both may move.

Examples of the laser beam include $CO_2$ laser, YAG laser, $YVO_4$ laser or semiconductor laser (e.g., GaAs, GaAlAs, and GaInAs) that can locally apply a high temperature. When forming a fine pattern, a laser having a short wavelength such as YAG laser is preferable. When carbonizing in a wide area or deep area, a laser beam having a long wavelength such as $CO_2$ laser is preferable.

As for a condition of the laser beam, the laser beam having too high density is not preferable because a temperature at a spot becomes too high, a heating rate becomes too high, and the carbonized material scatters by rapidly generated decomposition gas. In contrast, the laser beam having too low energy density is not preferable because the temperature is not increased to be a temperature required for generating the graphite. However, the laser irradiation is not adjusted to prevent the fillers 113 from burning. Since the temperature of the laser spot becomes extremely high, the fillers 113 at the laser spot is melt or cut. However, the temperature of a part slightly offset from the laser spot (e.g., a bottom or a side surface of the recess) is relatively low, thus the fillers 113 are remained in the part. When irradiating with the general semiconductor laser from a focal length near the just focus, it is preferable that an output is 100 W and a scanning speed is around 50 mm/s. It is not preferably that the atmospheric pressure during the laser processing be too low because the density of the carbonized material becomes low. It is not preferably that the atmospheric pressure during the laser processing be too high because the decomposition gas is less likely to leave and the structure of the carbonized material is destroyed. Thus, the atmospheric pressure is preferably equal to or less than 3 MPa.

The stronger the laser strength is or the higher the atmospheric pressure during the laser processing is, the lower the volume resistivity of the carbonized portion 115 is. This is because a bonding structure of the base polymer 114 is prompted to be converted into a bonding structure of the graphite-based carbon by increasing the temperature of the processed portion.

Volume resistivity is an index of conductivity per unit volume. Therefore, in the carbonized portion 115 composed of the carbonized material and the fillers 113, the larger the ratio of the carbonized material having conductivity contained per unit volume of the carbonized portion 115, the lower the volume resistivity is. When the amount of the fillers 113 is too small, the carbonized material is scattered by the decomposition gas in the carbonization step P2. Therefore, the volume resistivity of the carbonized portion 115 can be lowered by decreasing the fillers 113 within a range that the fillers 113 can anchor the carbonized material with the anchor effect and by increasing the ratio of the formed carbonized material.

(Advantages)

As described above, in the eighth embodiment, the fillers 113 oriented in the surface direction and the oriented layer 112 including the base polymer 114 filling among the fillers 113 are formed in the vicinity of the surface 111 of the resin member 110. The oriented layer 112 includes the carbonized portion 115 containing graphite that is a carbonized material of the base polymer 114 to have both electrical conductivity and thermal conductivity.

Since the fillers 113 are oriented in the oriented layer 112, the carbonized material generated when carbonizing the base polymer 114 filling among the fillers 113 is likely to form a layered structure oriented in the surface direction. The a-b surface of the graphite in the carbonized material is likely to be oriented in the surface direction. Thus, electric conductivity of the carbonized material in the surface direction is improved.

Since the oriented layer 112 includes the fillers 113, the temperature of the heating spot is restricted from being too high and the heating rate is slowed down when the oriented layer 112 is locally heated for the carbonization. This restricts the decomposition gas from rapidly generating and the carbonized material from scattering. The fillers 113 serve as an anchor of the carbonized material or the base polymers 114 and restricts the carbonized material from scattering due to the generation of the decomposition gas. Thus, the fixability of the carbonized material and the conductivity are improved.

In the eighth embodiment, the thickness of a portion of the resin member 110 at which the carbonized portion 115 is formed is equal to or greater than 300 μm. Even if such relatively thick member is carbonized, the carbonized material is restricted from scattering by adding the fillers 113 to the resin member to some extent, slowing the heating rate, and anchoring the carbonized material during the carbonization.

In the eighth embodiment, the weight ratio of the fillers 113 to the resin member 110 is 40 wt %. According to this, the heating rate during the carbonization is slowed down and the carbonized material is effectively anchored to improve the conductivity of the carbonized portion 115.

In the eighth embodiment, the fillers 113 are glass fibers. Therefore, the heating rate during the carbonization is slowed down and the carbonized material is effectively anchored to improve the conductivity of the carbonized portion 115. In addition, it costs low. The carbonized material is fixed more tightly because the glass is melt and solidified through the heat treatment.

In the eighth embodiment, the method for manufacturing the resin member 110 includes the molding step P1 and the carbonization step P2. The molding step P1 includes melting the resin material, applying share stress to the molten resin material in a vicinity of the surface 111 of the resin member 110, and solidifying the resin material to form, in the vicinity of the surface 111, the oriented layer 112 that includes the fillers 113 oriented in the surface direction and the base polymer 114 filling among the fillers 113. The carbonization step P2 includes locally heating the oriented layer 112, carbonizing the base polymer 114 in the oriented layer 112 to form the carbonized portion 115 containing the graphite to have both electric conductivity and thermal conductivity.

Since the fillers 113 are oriented in the surface direction in the oriented layer 112 in the molding step P1, the carbonized material generated in the base polymer 114 filling among the fillers 113 is likely to form a layered structure oriented in the surface direction. Additionally, the a-b surface of the graphite in the carbonized material is likely to be oriented in the surface direction. Thus, electric conductivity of the carbonized material in the surface direction is improved.

Since the oriented layer 112 includes the fillers 113, the temperature of a heating portion is restricted from being too high and the heating rate is slowed down when the oriented layer 112 is locally heated for the carbonization in the carbonization step P2. Thus, the decomposition gas is restricted from rapidly generating and the carbonized material is restricted from scattering. The fillers 113 also serve as an anchor of the carbonized material or the base polymer 114, thereby restricting the carbonized material from scattering due to the decomposition gas. Therefore, the fixability of the carbonized material and the conductivity is improved.

In the eighth embodiment, the oriented layer 112 is locally heated with the laser beam in the carbonization step P2. Thus, the high temperature more than 2000° C. can be locally applied to the oriented layer 112 in a short time. Thus, the conductive pattern can be formed in a short time at a low cost. When the laser beam is used and when a layout of the conductive pattern is changed, it is necessary to modify a software of the scanning program and it is not necessary to change a hardware. Therefore, the layout of the conductive pattern can be changed in a short time at low cost. For example, when using a press part, there is a disadvantage that it takes man-hours to attach and detach the mold.

In the eighth embodiment, the resin material is molded by injection molding in the molding step P1. Thereby, a relatively large shear stress can be applied to the melting resin near the surface 111 of the resin member 110. Thus, the oriented layer 112 in which the fillers 113 are more strongly oriented can be formed.

Ninth Embodiment

Figure 45:
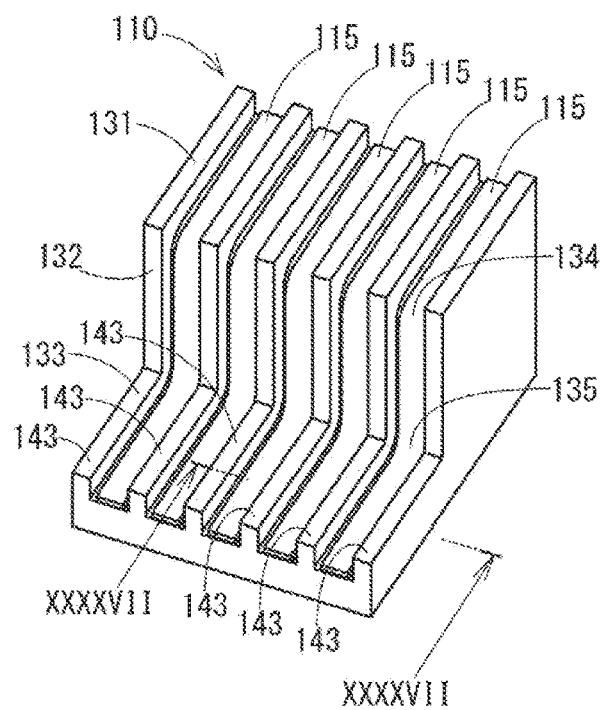
FIG. 45 is a perspective view of a resin member in a ninth embodiment.
Figure 46:
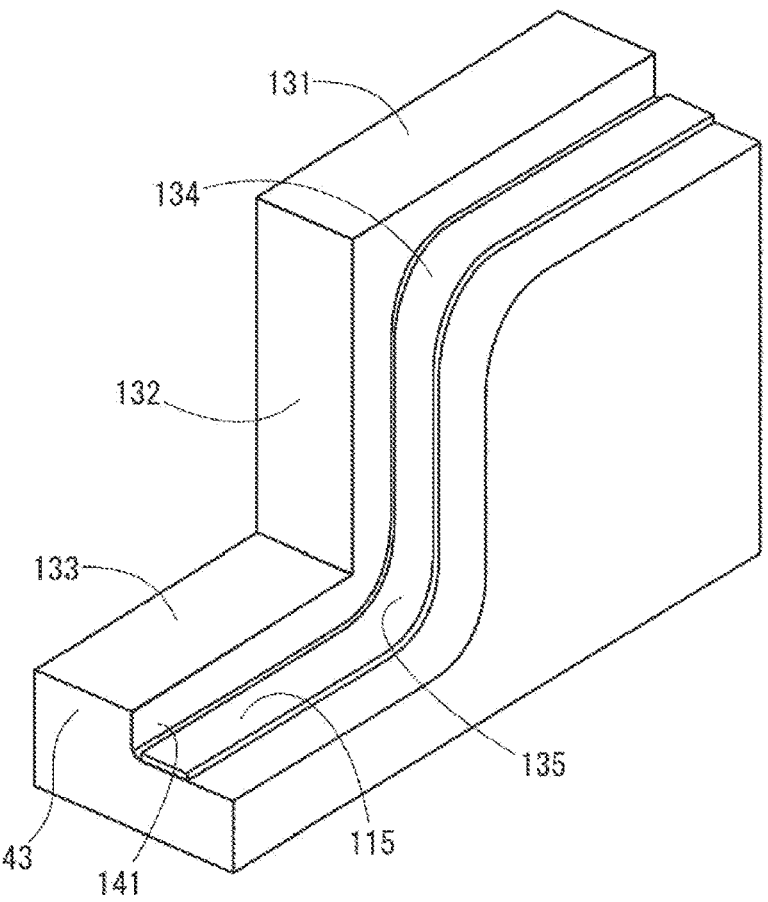
FIG. 46 is an enlarged perspective view of a part of a carbonized portion in FIG. 45.

In the ninth embodiment, as shown in FIGS. 45 and 46, the resin member 110 is not a simple flat plate. The resin member 110 includes a first surface 131, a second surface 132, and a third surface 133 that cross with each other to form a step portion. The carbonized portion 115 is dimensionally formed from the first surface 131 to the second surface 132 and from the second surface 132 to the third surface 133. A shape of a molding before the carbonization is preferably a shape such that share stress is applied on a surface in molding and molten resin can flow to orient the fillers and the molecular chains. Thus, a corner 134 between the first surface 131 and the second surface 132 and a corner 135 between the second surface 132 and the third surface 133 have relatively large R shape (i.e., round shape). A curvature radius of each of the corner 134 and the corner 135 is preferably as large as possible, and specifically, at least equal to or larger than 5 mm.

Figure 47:
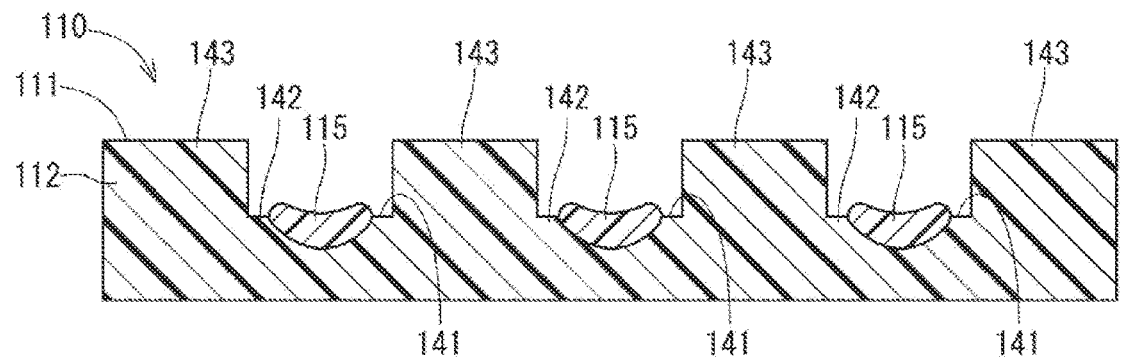
FIG. 47 is a cross sectional-view taken along a line XXXXVII-XXXXVII in FIG. 45.

As shown in FIG. 47, a surface layer of the resin member 110 (i.e., the oriented layer 112) includes recesses 141. The carbonized portions 115 are formed by carbonizing bottom wall portions 142 of the recesses 141. Between the adjacent ones of the carbonized portions 115, ribs 143 are formed to improve creepage insulation property. By carbonizing inner wall portions of the recesses 141, the ribs 143 are disposed between the adjacent ones of the carbonized portions 115 and the creepage insulation property can be improved.

Figure 48:
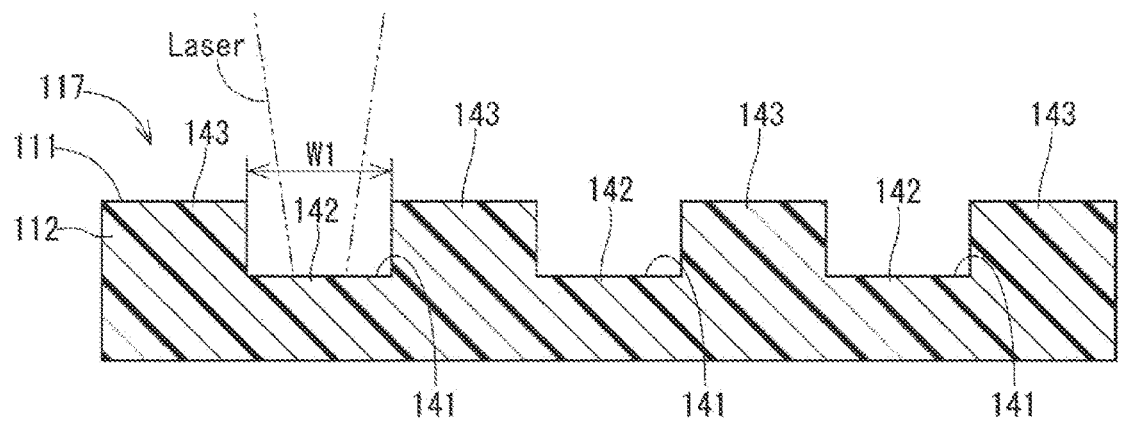
FIG. 48 is a cross-sectional view illustrating a state in which an oriented layer of a molding is irradiated with laser in a carbonization step of a manufacturing method in a ninth embodiment.

In the molding step P1 of the manufacturing method in the ninth embodiment, the recesses 141 are formed in the oriented layer 112 of the molding 117 as shown in FIG. 48. In the carbonization step P2, bottom wall portions 142 of the recesses 141 are carbonized by being irradiated with the laser beam. A width W1 of each of the recesses 141 is larger than a converging diameter of the laser beam in the recesses 141. As a result, the bottom wall portions 142 of the recesses 141 can be locally carbonized.

Tenth Embodiment

Figure 49:
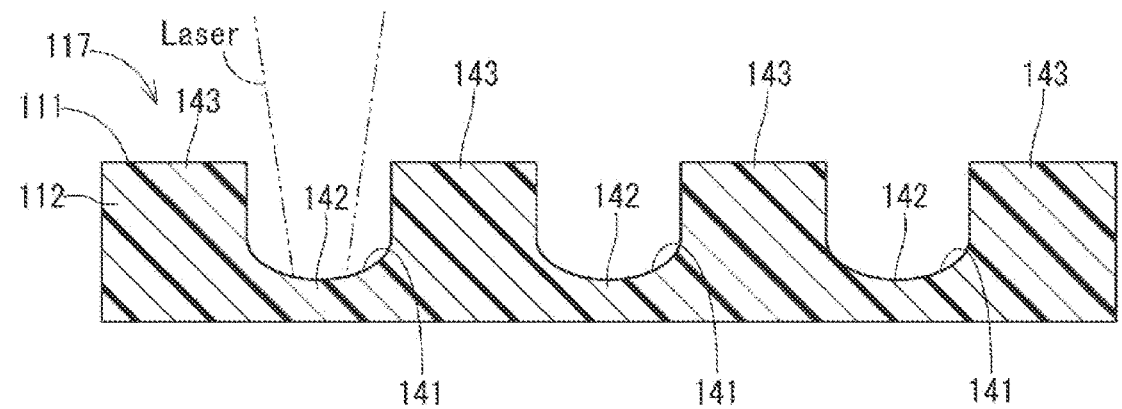
FIG. 49 is a cross-sectional view illustrating recesses of a molding in a tenth embodiment.

In a tenth embodiment, as shown in FIG. 49, a bottom surface of each of the recesses 141 of the molding 117 has an R shape. This can improve an orientation degree of the fillers and the molecular chains in the bottom wall portions 142 of the recesses 141.

Eleventh Embodiment

Figure 50:
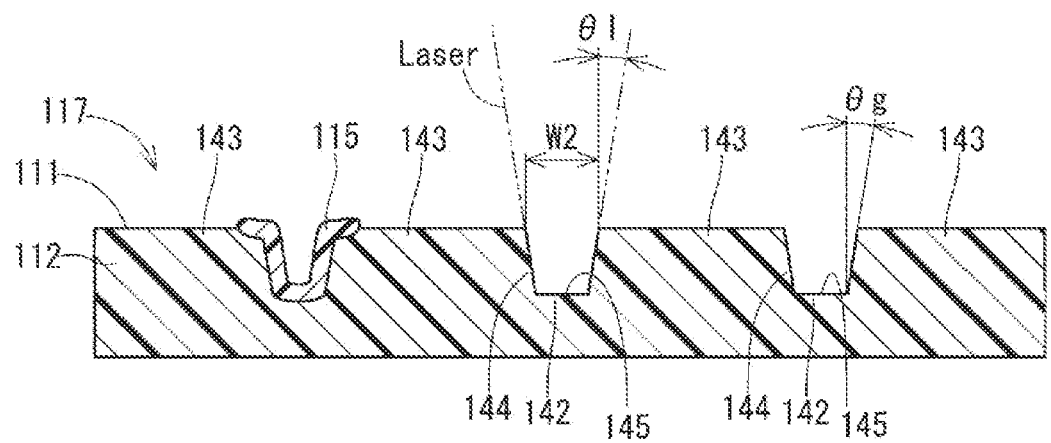
FIG. 50 is a cross-sectional view illustrating recesses of a molding in an eleventh embodiment.

In an eleventh embodiment, as shown in FIG. 50, the carbonized portion 115 is formed by carbonizing the bottom wall portions 142 and side wall portions 144 of the recesses 145 of the molding 117. A width W2 of each of the recesses 145 is at least less than a focusing diameter of the laser beam on the surface of the molding 117 (i.e., an opening of the recess 145). When the carbonized portion 115 forms the wiring-shaped conductive pattern, it is preferable that a cross-sectional area of the carbonized portion 115 be increased in a thickness direction of the resin member 110 in order to improve the conductivity and to narrow distances between the conductive patterns. In the eleventh embodiment, the recesses 145 are formed in advance in the molding 117 before the molding 117 is carbonized and the side wall portions 144 are carbonized to increase the cross-sectional area of the carbonized portion 115 in a depth direction.

Figure 51:
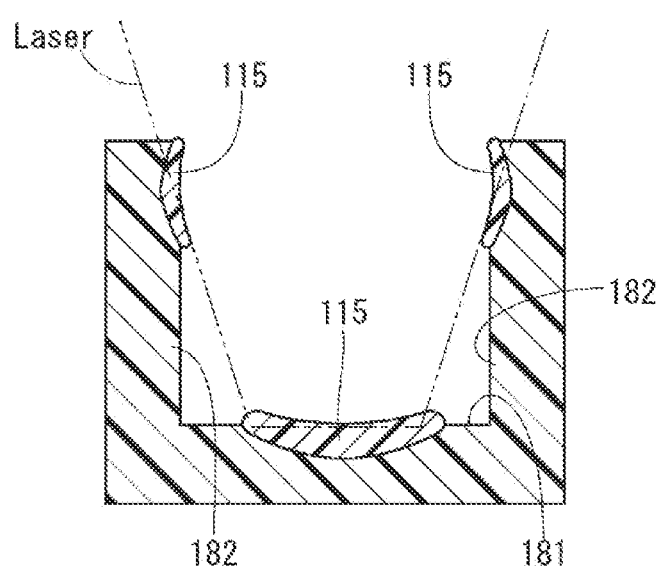
FIG. 51 is a cross-sectional view illustrating a recess of a molding in a comparative example.

To reliably irradiate the corners of the recesses 145 with the laser beam and carbonize the recesses 145, a slope eg of the side wall portion 144 of each of the recesses 145 is equal to or larger than the laser focusing angle θl. In the eleventh embodiment, the slope eg of each of the side wall portions 144 of the recesses 145 is approximately the same as the laser focusing angle θl from the viewpoint of narrowing the distance between the conductive patterns. As a result, the wall surfaces of the recesses 145 are entirely carbonized and the conductivity is improved. In contrast, in a comparative example in FIG. 51 in which side wall surfaces 182 of recesses 181 are not sloped, the laser beam cannot reach corners of the recesses 181. Thus, the carbonized material may be separated and the conductivity may be decreased.

Twelfth Embodiment

Figure 52:
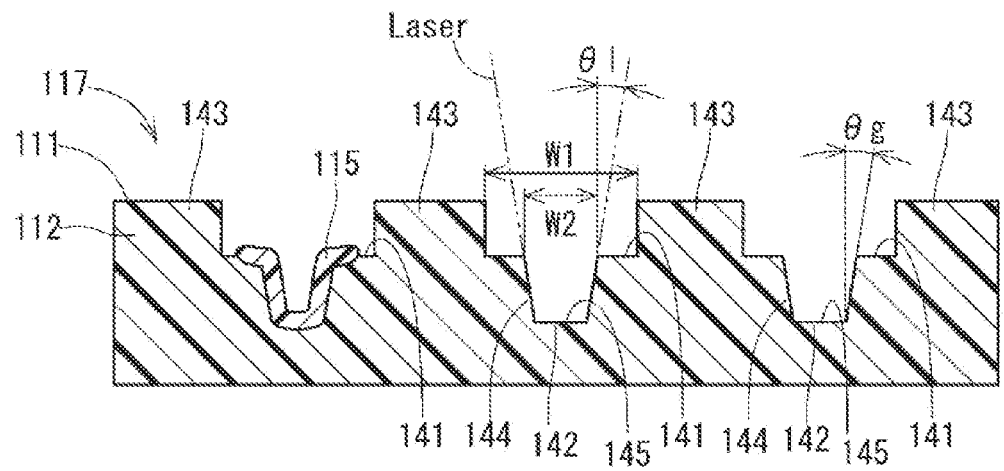
FIG. 52 is a cross-sectional view illustrating recesses of a molding in a twelfth embodiment.

In a twelfth embodiment, as shown in FIG. 52, the recesses 145 are formed in recesses 141. As a result, the creepage insulation property between the adjacent ones of the carbonized portions 115 can be improved similarly in the ninth embodiment, and the conductivity can be improved while narrowing the distances of the conductive patterns similarly in the eleventh embodiment.

Thirteenth Embodiment

Figure 53:
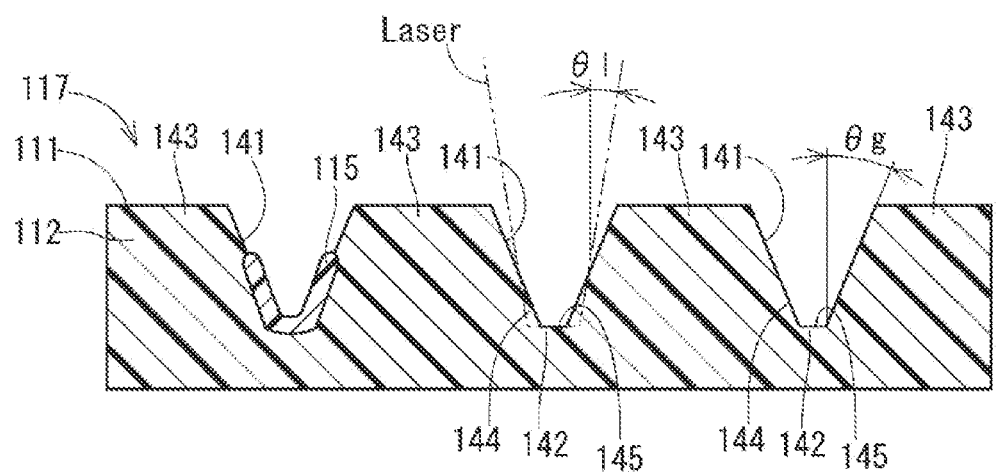
FIG. 53 is a cross-sectional view illustrating recesses of a molding in a thirteenth embodiment.

In a thirteenth embodiment, as shown in FIG. 53, recesses 145 are formed inside the recesses 141 as with in the twelfth embodiment. The difference from the twelfth embodiment is that the recesses 145 and the side wall portions 144 of the recesses 141 are continuously formed. The slope θg of the side wall portions 144 is set to a value larger than the focusing angle θl of the laser beam. A width of each of the recesses 141 is set to a value smaller than the focusing diameter of the laser beam at that height. As a result, concave portions including the recesses 141 and the recesses 145 include, in inner wall portions, carbonized portions to improve the cross-sectional area in the depth direction and not-carbonized portions to improve the creepage insulation property. As described above, the recesses 141 and the recesses 145 may be integrally formed.

Fourteenth Embodiment

Figure 54:
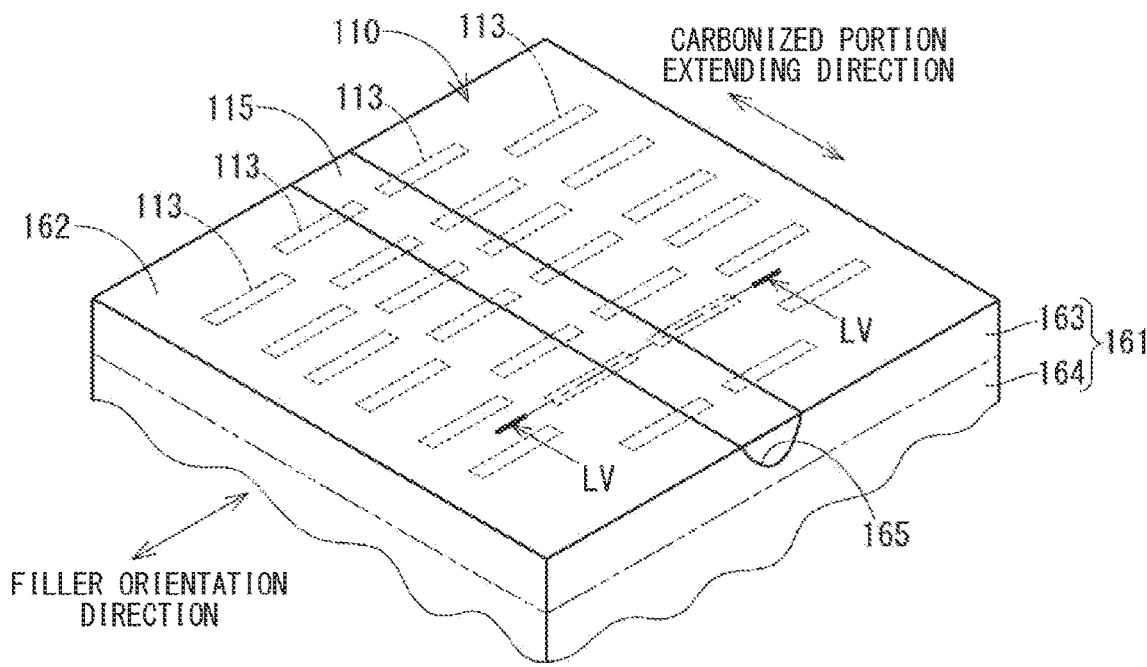
FIG. 54 is a perspective view of a resin member in a fourteenth embodiment.

In a fourteenth embodiment, as shown in FIG. 54, the resin member 110 is a resin body containing a resin material and is used, for example, as a housing or cover of an electronic device such as an air flowmeter and a rotation angle sensor. The resin member 110 includes a base portion 161 and a carbonized portion 115.

Figure 55:
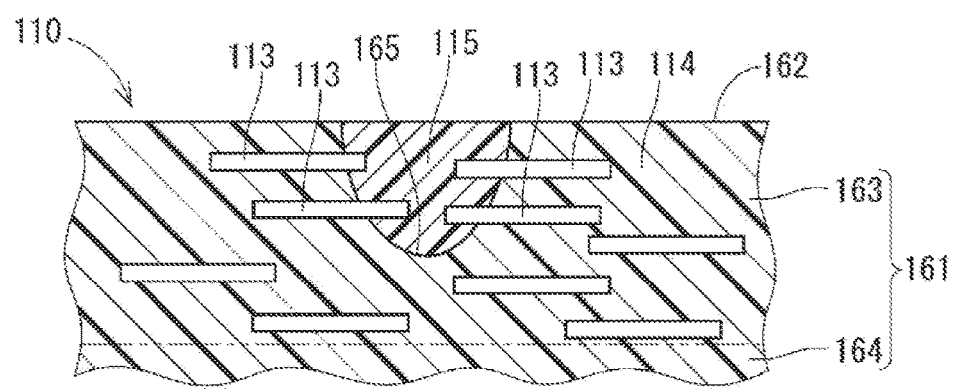
FIG. 55 is a cross-sectional view taken along a line LV-LV in FIG. 54.
Figure 56:
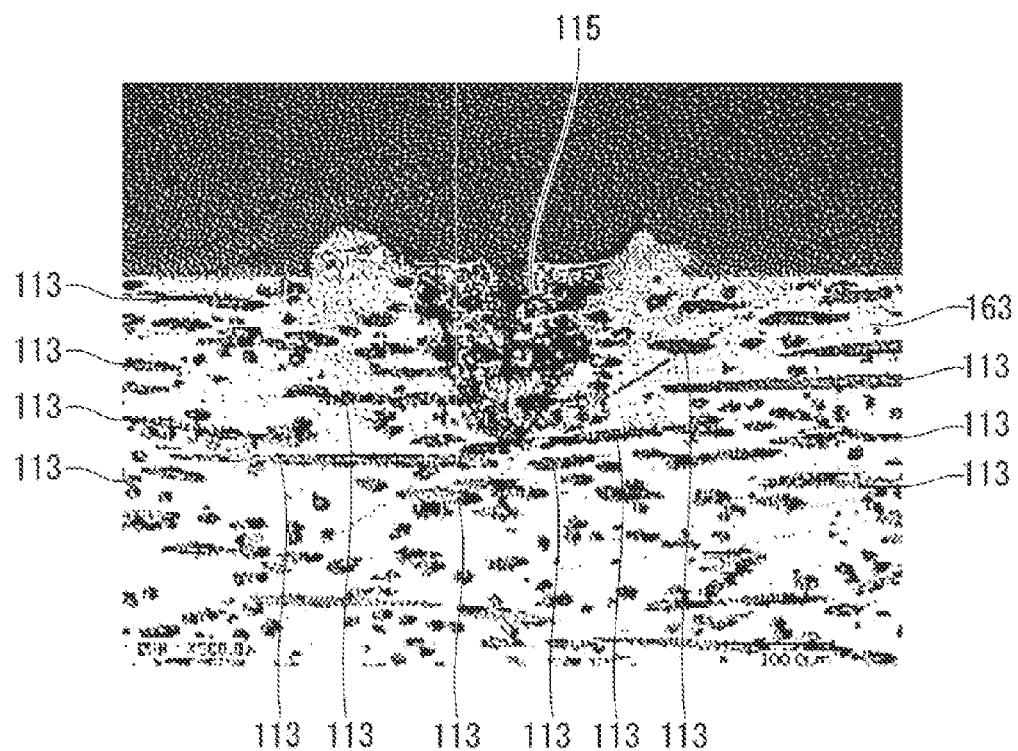
FIG. 56 is a photograph of a cross section in FIG. 55.

As shown in FIGS. 54, 55, and 56, the base portion 161 has the base polymer 114 and fillers 113. The base portion is formed of a resin material and having an insulation property. The fillers 113 has a strength higher than that of the base polymer 114. The base polymer 114 constitutes a resin portion of the base portion 161. The fillers 113 serve as a reinforcing member that strengthens the base portion 161. The base portion 161 is reinforced by the fillers 113 mixed with the base polymer 114.

The carbonized portion 115 is a conductive portion that is formed on an outer surface 162 of the base portion 161 and include carbonized material 166 (see FIG. 43) to have a conductivity. The multiple carbonized portions 115 extend linearly. The carbonized portions 115 are pattern portions arranged in a pattern and form a wiring pattern. This wiring pattern is a current-carrying portion used as a static electricity removing circuit in an electronic device such as an air flowmeter and a rotation angle sensor.

The carbonized material is a carbon having conductivity (i.e., a conductive carbon). The carbonized material is a conductive material, for example, carbon material such as graphite, carbon powder, carbon fiber, nanocarbon, graphene, or carbon micromaterial. Nanocarbons are, for example, carbon nanotubes, carbon nanofibers, and fullerenes.

As shown in FIGS. 55 and 56, the resin member 110 includes a skin layer 163 extending along the outer surface 162 of the base portion 161, and a core layer 164 provided inside the skin layer 163. The skin layer 163 is a surface layer portion that forms the outer surface 162 of the base portion 161. The skin layer 163 is also a solidified layer that is formed by the molten resin coming in contact with the inner surface of the mold and being solidified during the resin molding of the base portion 161. The core layer 164 is a fluidized layer that is formed by the molten resin flowing inside of the solidified layer during the resin molding of the base portion 161. The outer surface 162 of the base portion 161 is an outer surface of the skin layer 163 and also an outer surface of the resin member 110. The outer surface 162 has a groove-shaped concave surface 165 that is recessed toward the core layer 164. The carbonized portion 115 extends from the skin layer 163 toward the core layer 164 on the groove-shaped concave surface 165. The carbonized portion 115 is formed by carbonizing at least a part of the skin layer 163. As a material of the base polymer 114 which is a resin forming the skin layer 163 and the core layer 164, a material containing at least a six-membered ring of carbon (i.e., a benzene ring) is used.

At least the core layer 164 among the skin layer 163 and the core layer 164 forms the base portion 161. In the fourteenth embodiment, the carbonized portion 115 is located on the skin layer 163 that is apart from the core layer 164. That is, the groove-shaped concave surface 165 does not reach the core layer 164 and the carbonized portion 115 is located adjacent to only the skin layer 163.

Both the skin layer 163 and the core layer 164 form the base portion 161.

As shown in FIGS. 54, 55, and 56, in the skin layer 163, more fillers 113 are oriented in a predetermined direction along the outer surface 162 of the base portion 161 than that in the core layer 164. Hereinafter, the fillers 113 oriented in the predetermined direction is referred to as "oriented fillers 113". The carbonized portion 115 extends in a direction intersecting with the oriented fillers 113. Particularly, in the fourteenth embodiment, the carbonized portion 115 extends in the direction orthogonal to the orientation fillers 113.

Figure 57:
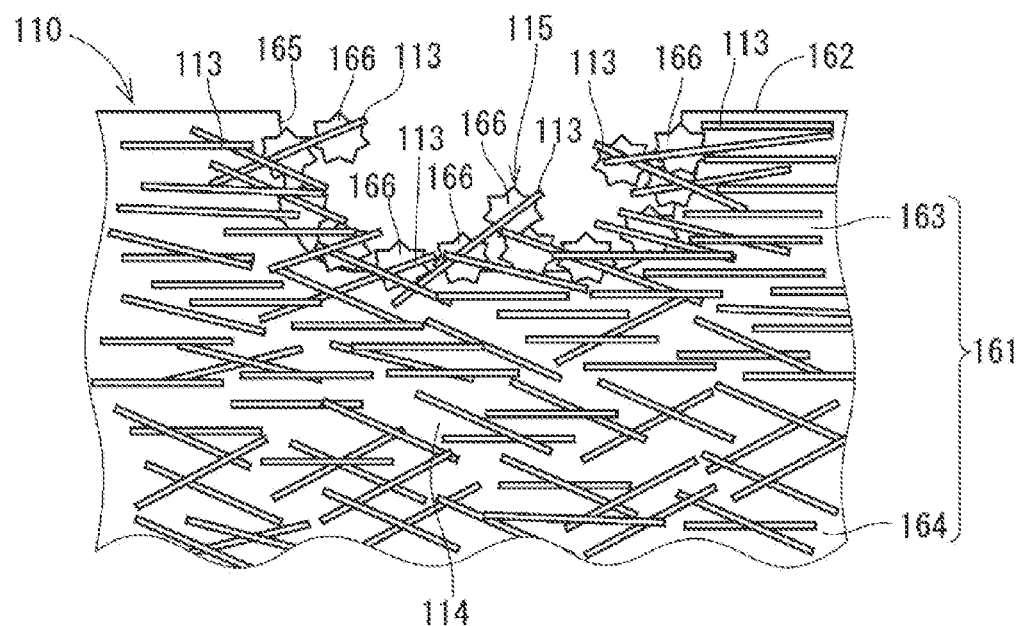
FIG. 57 is a cross-sectional view corresponding to FIG. 55 and schematically illustrating a state in which fillers are stuck in a carbonized material.

As shown in FIG. 57, a large number of carbonized material 166 is gathered to form the carbonized portion 115. At least a part of the fillers 113 enters into the carbonized portion 115 and restricts the carbonized portion 115 from falling off from the base portion 161. That is, the fillers 113 are a restriction member that restricts the carbonized material 166 from falling off from the carbonized portion 115. As material of the fillers 113, a fibrous material, a granular material, or a plate-shaped material can be used as described in the eighth embodiment. In the fourteenth embodiment, a fiber material such as flame-retardant fiber, glass fiber, and carbon fiber is used as the material of the fillers 113, thereby forming a fiber portion. In FIG. 57, illustration of hatching is omitted for descriptive purposes.

A part of the fillers 113 included in the base portion 161 protrudes from the groove-shaped concave surface 165. The part of the fillers 113 has one end retained by the base portion 161 and the other end caught by the carbonized portion 115, which strengthens a connection between the carbonized portion 115 and the base portion 161. By using fiber material as the material of the fillers 113, a length of the part of the fillers 113 caught in the carbonized portion 115 can be increased. In particular, the orientation fillers 113 intersect with an extending direction of the carbonized portions 115. Thus, the oriented fillers 113 are likely to protrude from the groove-shaped concave surface 165 and easily caught by the carbonized portion 115. In addition, a part of the oriented fillers 113 penetrates the carbonized material 166 of the carbonized portion 115, which effectively restricts the carbonized material 166 from falling off.

Figure 58:
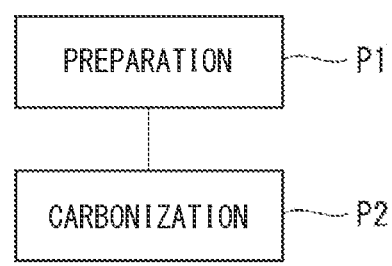
FIG. 58 is a step diagram illustrating a method for manufacturing the resin member in the fourteenth embodiment.
Figure 59:
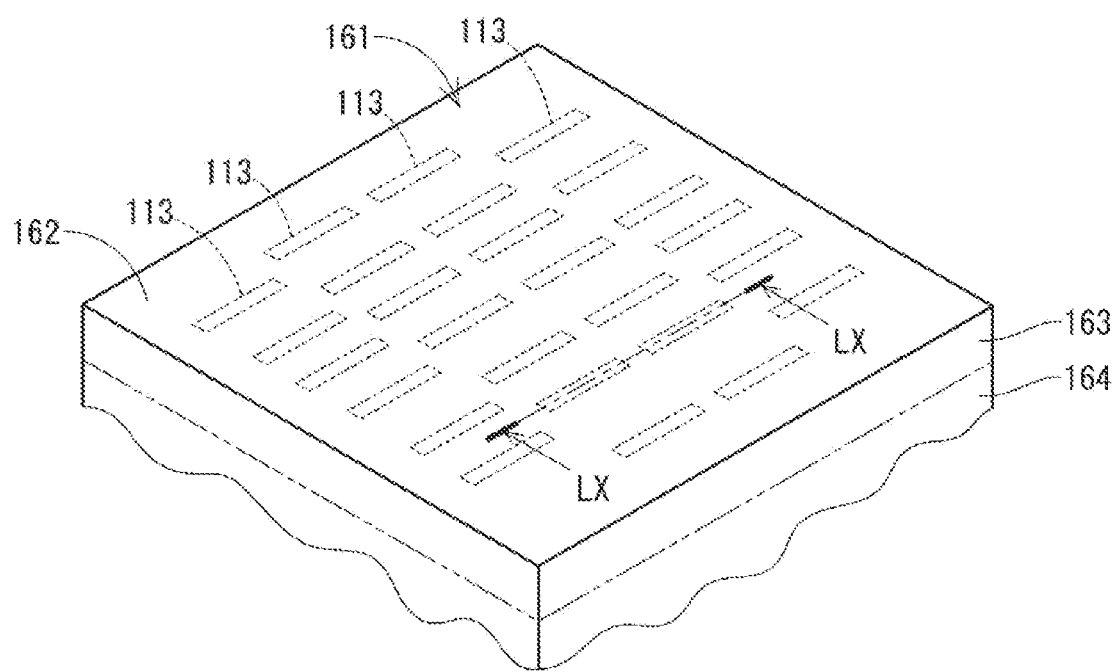
FIG. 59 is a perspective view of a base prepared in a preparing step in FIG. 58.
Figure 60:
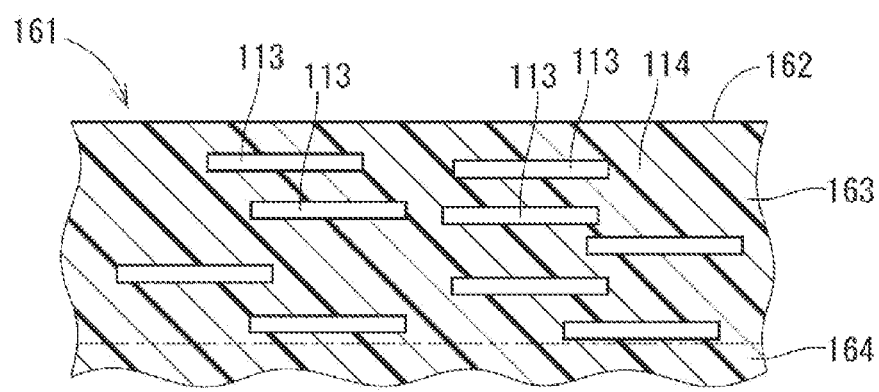
FIG. 60 is a cross-sectional view taken along a line LX-LX in FIG. 59.

The method for manufacturing the resin member 110 includes the preparing step P1 and the carbonization step P2 as shown in FIG. 58. In the preparing step P1, as shown in FIGS. 59 and 60, the base portion 161 reinforced with the fillers 113 mixed with the base polymer 114 is prepared. The preparing step P1 includes preparing the base portion 161 that is molded similarly to the molding step P1 in the eighth embodiment, but alternatively may include preparing the base portion 161 that has been already molded regardless of whether it is unused or used.

Figure 61:
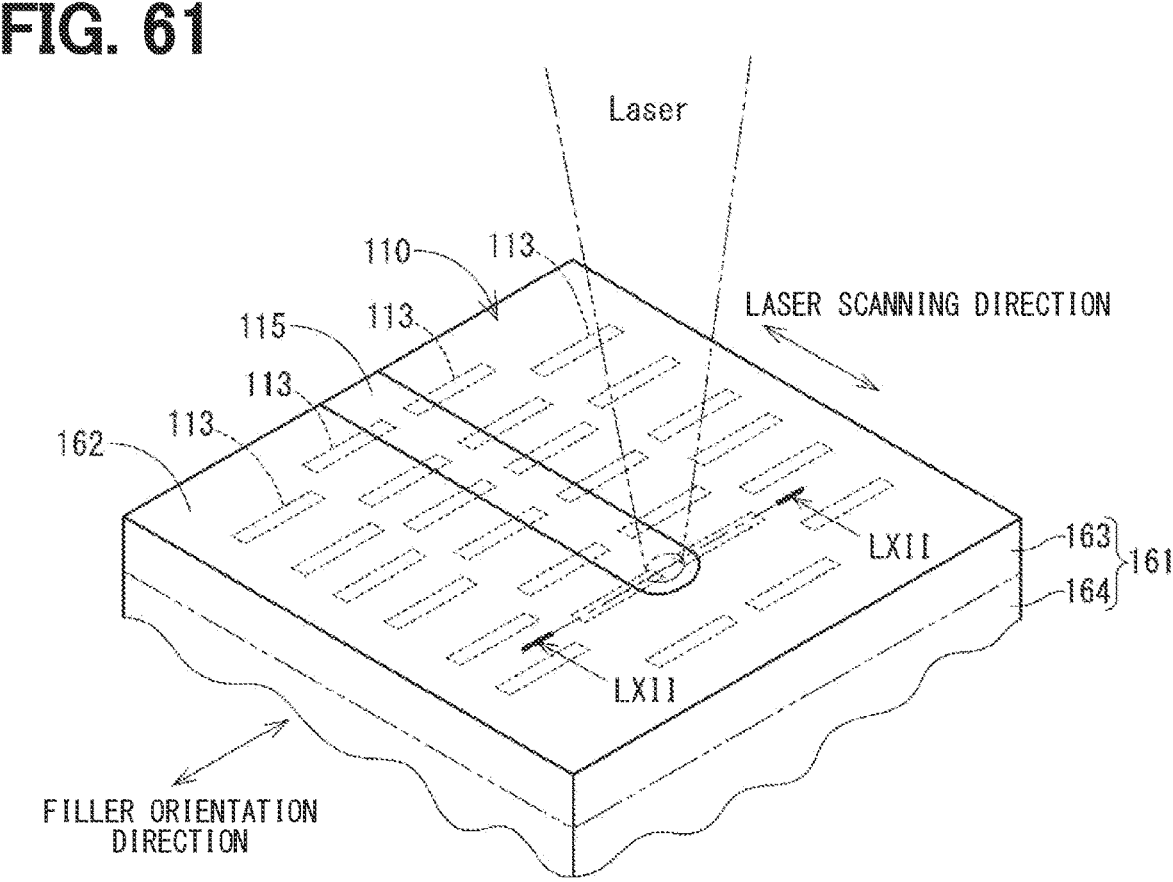
FIG. 61 is a perspective view illustrating a state in which a base is irradiated with laser beam in a carbonization step in FIG. 58.
Figure 62:
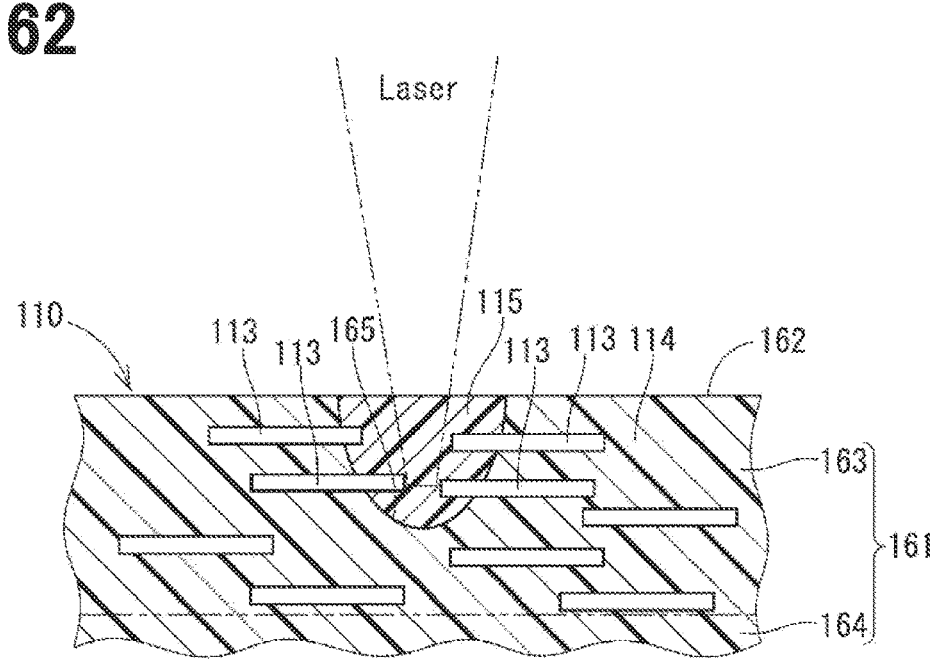
FIG. 62 is a cross-sectional view taken along a line LXII-LXII in FIG. 61.

The carbonization step P2, as shown in FIGS. 61 and 62, includes heating the base portion 161 prepared in the preparing step P1. The base portion 161 is heated such that the carbonized portion 115 is located on the outer surface 162 of the base portion 161 and at least a part of the fillers 113 enters into the carbonized portion 115. The carbonized portion 115 of the base polymer 114 contains the carbonized material 166 to have conductivity and the entering fillers 113 restrict the carbonized portion 115 from falling off from the base portion 161. In addition, the skin layer 163 is heated such that a part of the skin layer 163 is carbonized to form the carbonized portion 115 on a position distanced from the core layer 164.

In the carbonization step P2, as shown in FIG. 61, the skin layer 163 is heated such that carbonized portion 115 extends in a direction intersecting with the fillers 113 extending along the outer surface 162 of the base portion 161 on the skin layer 163.

(Advantages)

As described above, in the fourteenth embodiment, the resin member 110 includes the base portion 161 and the carbonized portion 115. The base portion 161 includes the base polymer 114 and the fillers 113. The base polymer 114 is formed of a resin material and has an insulation property. The fillers 113 have a strength higher than that of the base polymer 114. The base polymer 161 is reinforced by the fillers 113 mixed with the base polymer 114. The carbonized portion 115 is provided on the outer surface 162 of the base portion 161 and contains the carbonized material 166 to have an electrical conductivity. At least a part of the fillers 113 enters into the carbonized portion 115 and restricts the carbonized portion 115 from falling off from the base portion 161.

The method for manufacturing the resin member 110 includes the preparing step P1 of preparing the base portion 161 and the carbonization step P2. In the carbonization step P2, the base portion 161 is heated such that the carbonized portion 115 is located on the outer surface 162 of the base portion 161 and at least a part of the fillers 113 enters into the carbonized portion 115.

The carbonized portion 115 contains the carbonized material 166 that is formed by carbonizing a part of the base polymer 114 to have electrical conductivity. The entering fillers 113 restrict the carbonized portion 115 from falling off from the base portion 161.

According to the resin member 110 and the method for manufacturing the resin member 110, the fillers 113 restrict the carbonized material 166 from falling off after the resin member 110 is molded. Therefore, it is possible to restrict the carbonized material 166 from falling off and the conductivity of the carbonized portion 115 from decreasing. In addition, when the carbonized portion 115 is formed by carbonizing the base polymer 114 through the heat treatment, the fillers 113 restrict the carbonized portion 115 from scattering along with a generation of the decomposition gas. Thus, it is possible to restrict a part of the carbonized portion 115 from scattering through the heating, which causes the conductivity of the carbonized portion 115 to decrease, and to restrict the carbonized portion 115 from being divided.

In the fourteenth embodiment, the resin member 110 includes the skin layer 163 extending along the outer surface 162 of the base portion 161 and the core layer 164 provided inside the skin layer 163. At least the core layer 164 in the skin layer 163 and the core layer 164 forms the base portion 161. The outer surface 162 of the base portion 161 has the groove-shaped concave surface 165 that is recessed toward the core layer 164. The carbonized portion 115 is located on the groove-shaped concave surface 165 such that the carbonized portion 115 extends from the skin layer 163 toward the core layer 164. In the preparing step P1, the base portion 161 having the skin layer 163 and the core layer 164 are prepared. In the carbonization step P2, the skin layer 163 is heated such that at least a part of the skin layer 163 is carbonized to form the carbonized portion 115.

In the resin member 110, the fillers 113 in the skin layer 163 whose orientations are aligned are more likely to restrict the carbonized portion 115 from falling off than the fillers 113 in the core layer 164 whose orientations are irregular. Therefore, according to the resin member 110 and the manufacturing method thereof described above, it is possible to further restrict the carbonized portion 115 from falling off from the core layer 164.

The fillers 113 are likely to orient irregularly in the core layer 154. Thus, in the configuration in which the carbonized portion 115 is located in the core layer 164, it may be difficult for the fillers 113 to restrict the carbonized portion 115 from falling off from the core layer 164.

In contrast, in the fourteenth embodiment, the carbonized portion 115 is located in the skin layer 163 at a position distanced from the core layer 164. In the carbonization step P2, the skin layer 163 is heated such that the carbonized portion 115 is formed on a position distanced from the core layer 164. According to the above-described resin member 110 and the manufacturing method thereof, since the carbonized portion 115 is not located in the core layer 164, the carbonized portion 115 can be more effectively restricted from falling off from the core layer 164.

If the fillers 113 are entirely included in the carbonized portion 115, the fillers 113 may be separated from the base portion 161 together with the carbonized portion 115.

In contrast, in the fourteenth embodiment, the carbonized portion 115 extends in the direction intersecting with the fillers 113 that extend along the outer surface 162 of the base portion 161 in the skin layer 163. In the carbonization step P2, the skin layer 163 is heated such that the carbonized portion 115 extends in a direction intersecting with the fillers 113 that extend along the outer surface 162 of the base portion 161 in the skin layer 163. When the carbonized portion 115 and the fillers 113 intersect with each other in this way, one end of the fillers 113 enters into the base portion 161 and the other end of the fillers 113 is stuck in the carbonized portion 115. Therefore, the fillers 113 together with the carbonized portion 115 can be restricted from being separated from the base portion 161.

In the fourteenth embodiment, the fillers 113 pass through the carbonized material 166 in the carbonized portion 115. Thus, the fillers 113 can more reliably restrict the carbonized material 166 from falling off. When heating the base polymer 114 that has a polymer portion (i.e., a lump of polymer) through which the fillers 113 pass, the polymer portion is converted into the carbonized materials 166 in a state where the fillers 113 remain passing through the polymer portion. With this matter, the fillers 113 can restrict the carbonized materials from scattering when the base polymer 114 is combusted.

Fifteenth Embodiment

Figure 63:
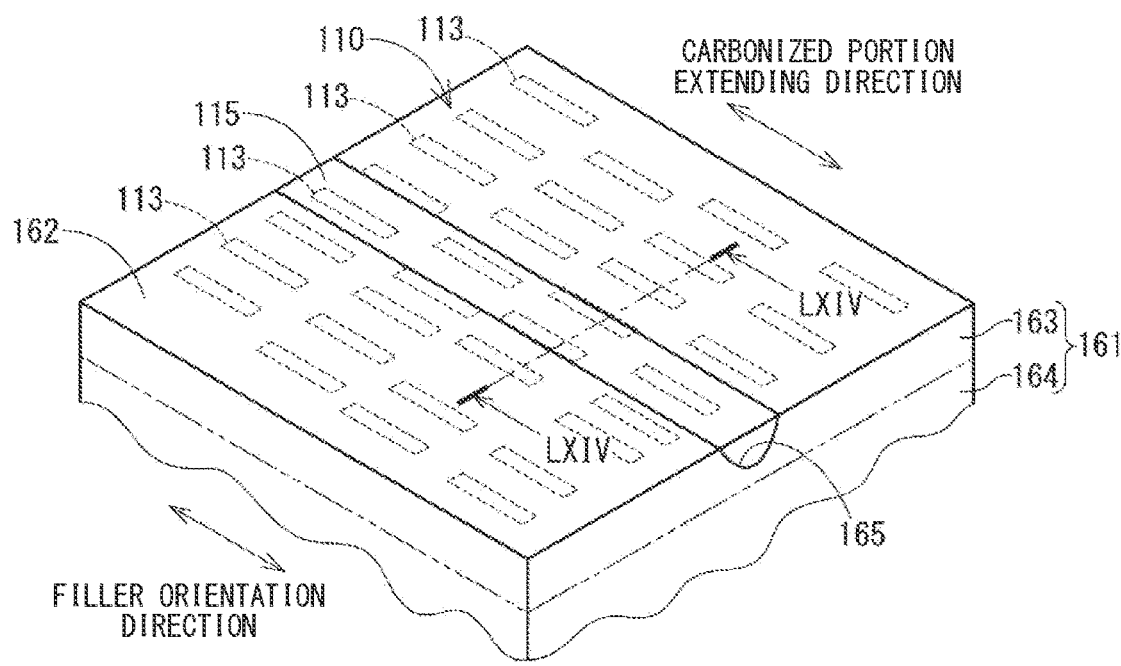
FIG. 63 is a perspective view of a resin in a fifteenth embodiment.
Figure 64:
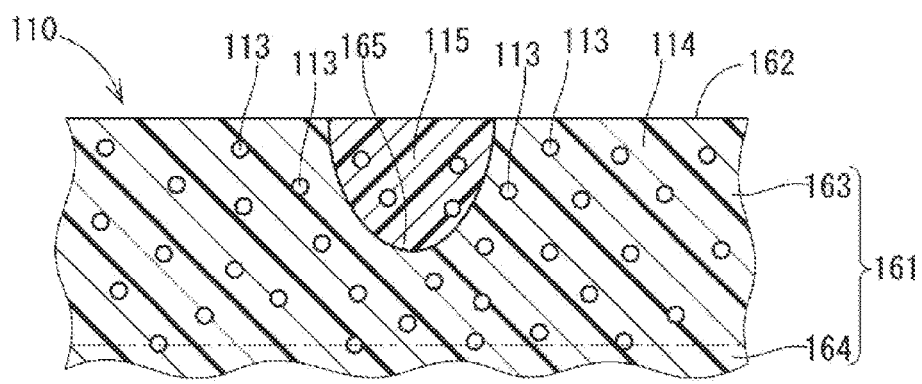
FIG. 64 is a cross-sectional view taken along a line LXIV-LXIV in FIG. 63.
Figure 65:
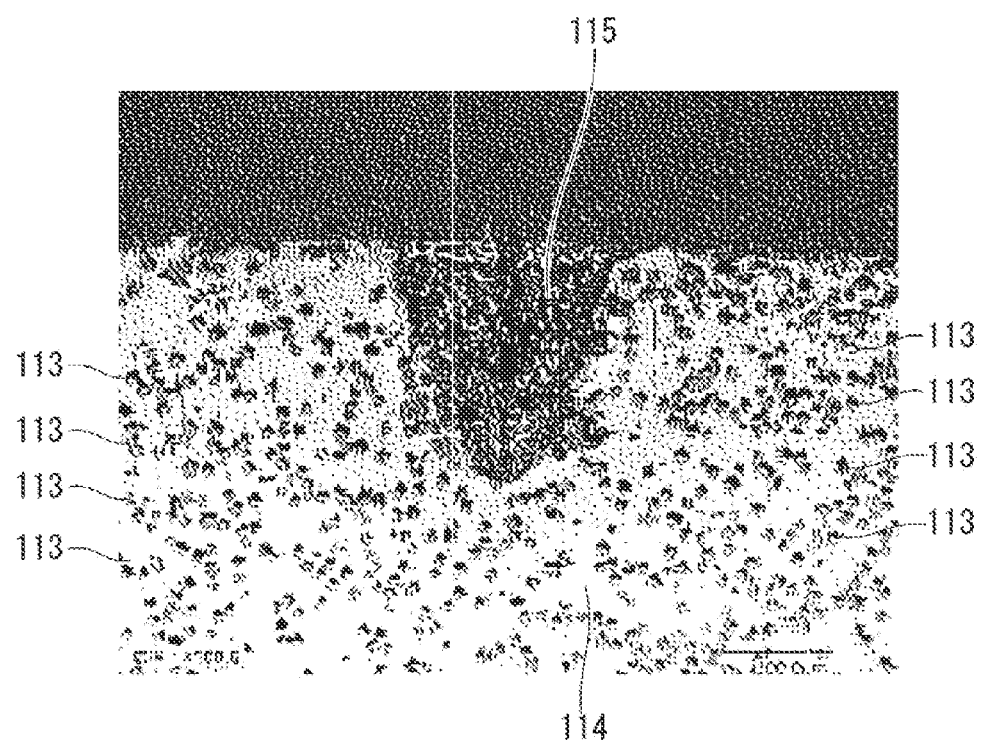
FIG. 65 is a photograph of a cross section in FIG. 64.
Figure 66:
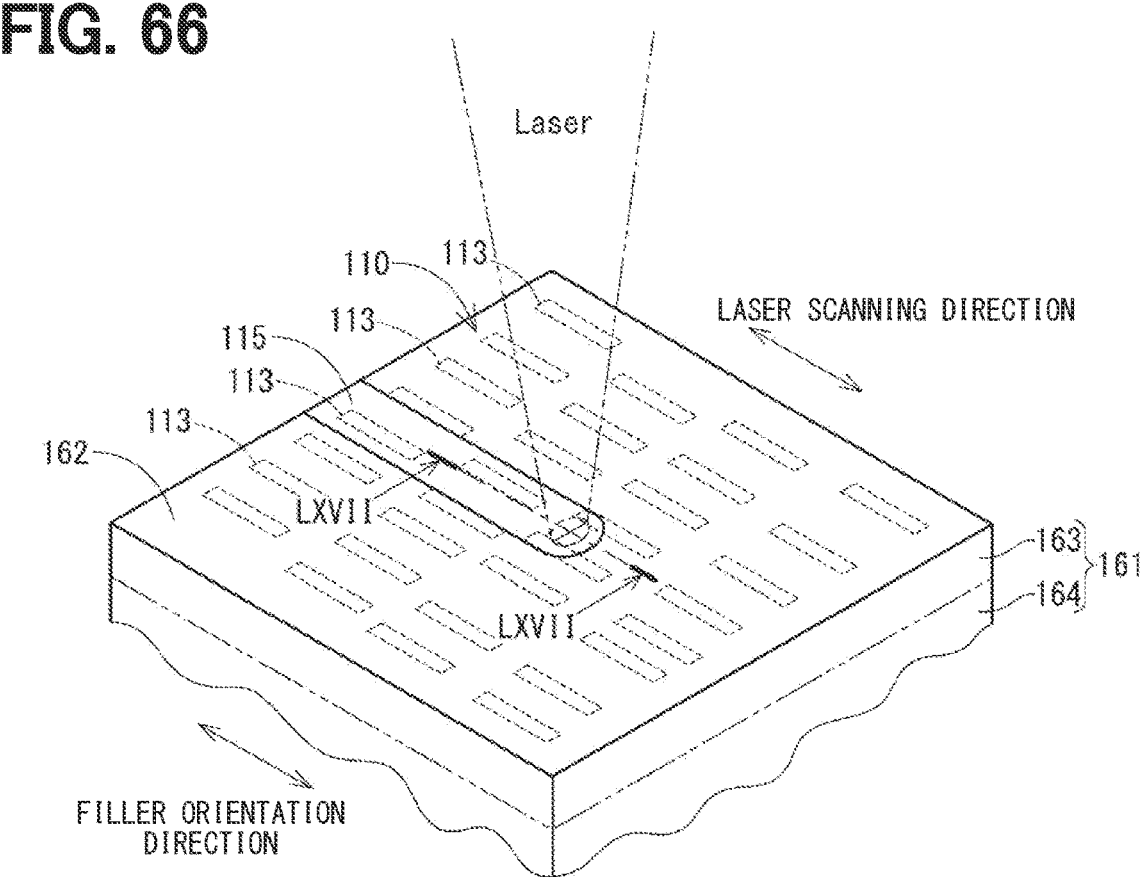
FIG. 66 is a perspective view illustrating a state in which a base is irradiated with laser beam in the carbonization step in the fifteenth embodiment.
Figure 67:
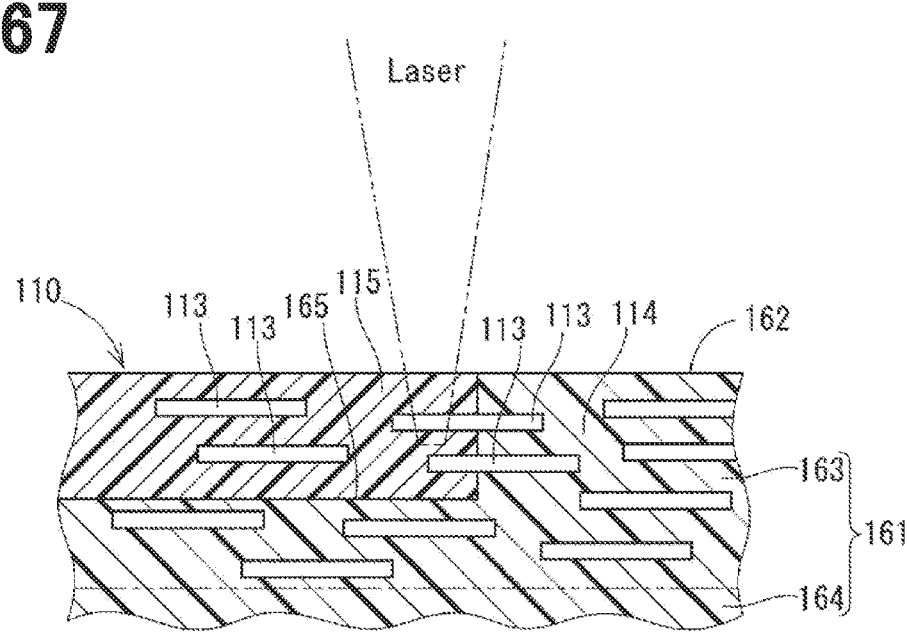
FIG. 67 is a cross-sectional view taken along a line LXVII-LXVII in FIG. 66.

In a fifteenth embodiment, as shown in FIGS. 63 to 65, the carbonized portion 115 extends in a direction parallel to the oriented fillers 113. In the carbonization step P2 (see FIG. 58), as shown in FIGS. 66 to 67, the skin layer 163 is heated by scanning the skin layer 163 with the laser beam in the direction parallel to the oriented fillers 113 such that the carbonized portion 115 extends in the direction parallel to the oriented fillers 113. That is, the scanning direction of the laser beam and the orientation direction of the oriented fillers 113 are parallel to each other.

As described above, an extending direction of the carbonized portion 115 and the orientation direction of the oriented fillers 113 do not necessary cross with each other. As shown in FIG. 66, during the carbonization with the laser irradiation, the fillers 113 are fixed to a resin part that is located adjacent to the carbonized portion 115 and that is not to be carbonized, or a resin part that is located ahead of a position in the laser scanning direction on the laser orbit and that has not irradiated with the laser yet. Thus, the carbonized material caught by the fillers 113 is restricted from falling off. As a result, the carbonized material is restricted from scattering and falling off, thereby improving the fixability.

Sixteenth Embodiment

Figure 68:
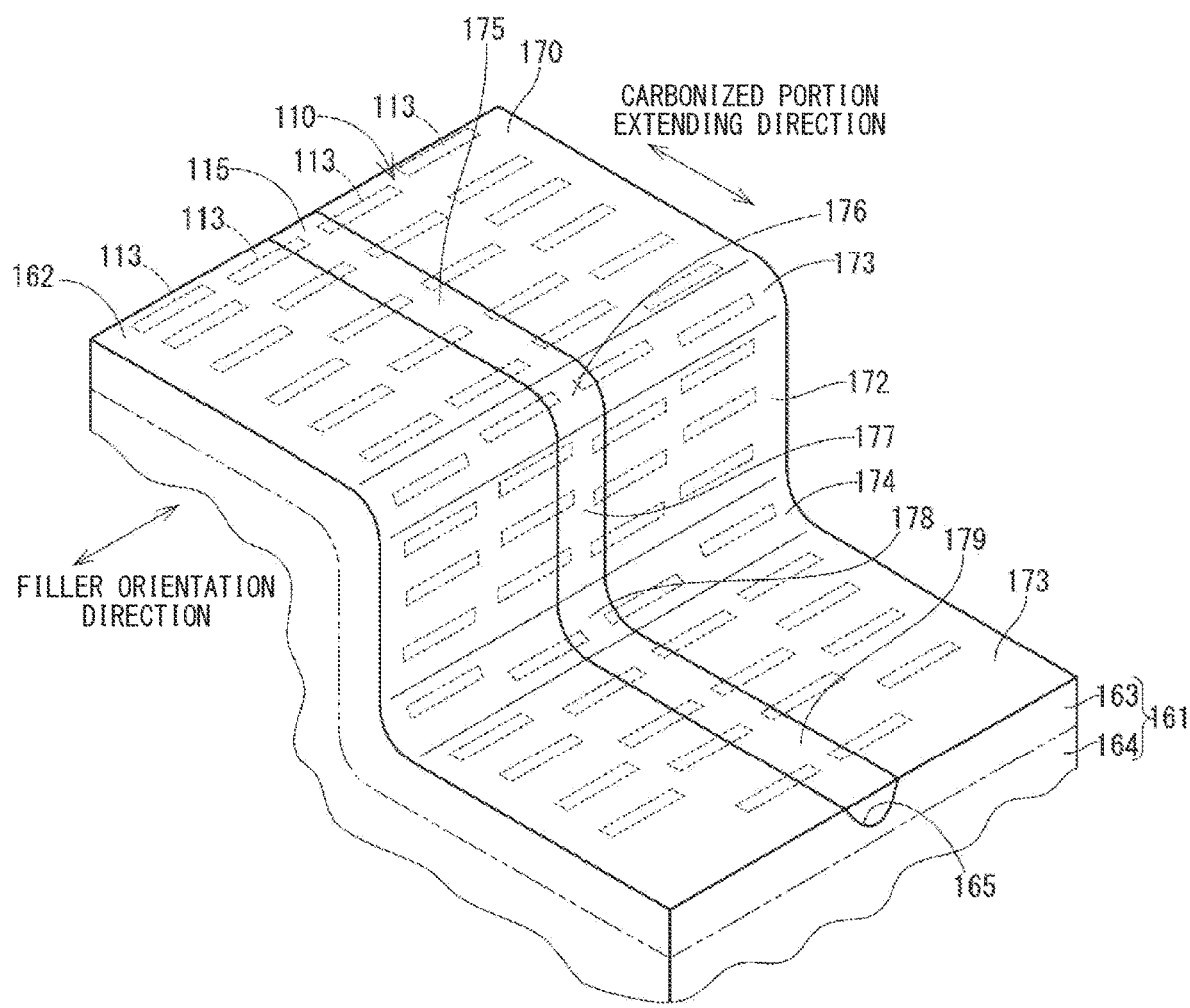
FIG. 68 is a perspective view of a resin member in a sixteenth embodiment.

In a sixteenth embodiment, as shown in FIG. 68, the outer surface 162 of the base portion 161 of the resin member 110 has a first surface 170 as a "first outer surface" and a second surface 171 as a "second outer surface" extending in a direction crossing with the first surface 170 and a chamfered surface 173 as a "chamfered outer surface" formed by chamfering a portion where the first surface 170 and the second surface 171 cross with each other (i.e., a corner portion). The outer surface 162 also has a third surface 172 as a "first outer surface" extending in a direction crossing with the second surface 171 and a chamfered surface 174 as a "chamfered outer surface" formed by chamfering a portion at which the third surface 172 and the second surface 171 cross with each other (i.e., a corner portion).

The carbonized portion 115 includes a first carbonized portion 175 located on the first surface 170, a second carbonized portion 176 located on the second surface 171, and a connecting carbonized portion 178 located on the chamfered surface 173. The connecting carbonized portion 178 connects the first carbonized portion 175 to the second carbonized portion 176. The carbonized portion 115 also has a third carbonized portion 177 located on the third surface 172 and a connecting carbonized portion 179 located on the chamfered surface 174. The connecting carbonized portion 179 connects the second carbonized portion 176 to the third carbonized portion 177.

In a comparative example, two surfaces cross with each other and a corner portion of the two surfaces are directly connected without being chamfered. In such comparative example, the fillers are less likely to exist at the corner portion and a ratio of the base polymer 114 becomes relatively high at the corner portion. As a result, a heating rate in the laser irradiation becomes too high at the corner portion and decomposition gas are rapidly generated, which causes the carbonized material to scatter. Thereby, the carbonized material at the corner portion may be electrically disconnected. In addition, if the resin member is slightly deformed and stress is concentrated on the corner portion, the carbonized portions located on the two surfaces are physically separated with each other and the carbonized portion at the corner portion may be broken.

In contrast, in the sixteenth embodiment, the corner portion between the first surface 170 and the second surface 171 is chamfered and the chamfered surface 173 includes the connecting carbonized portion 178. The corner portion between the second surface 171 and the third surface 172 is chamfered and the chamfered surface 174 includes the connecting carbonized portion 179. As a result, the connecting carbonized portions 178 and 179 can restrict electric disconnection at a boundary between the first carbonized portion 175 and the second carbonized portion 176 and a boundary between the second carbonized portion 176 and the third carbonized portion 177.

Figure 69:
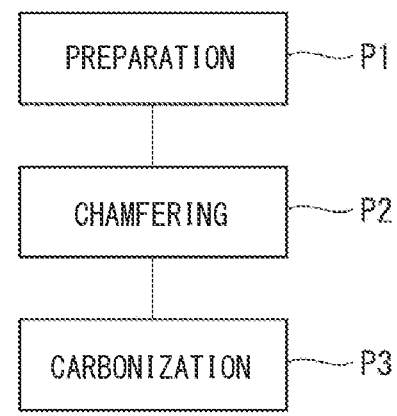
FIG. 69 is a step diagram illustrating a method for manufacturing the resin member in the sixteenth embodiment.
Figure 70:
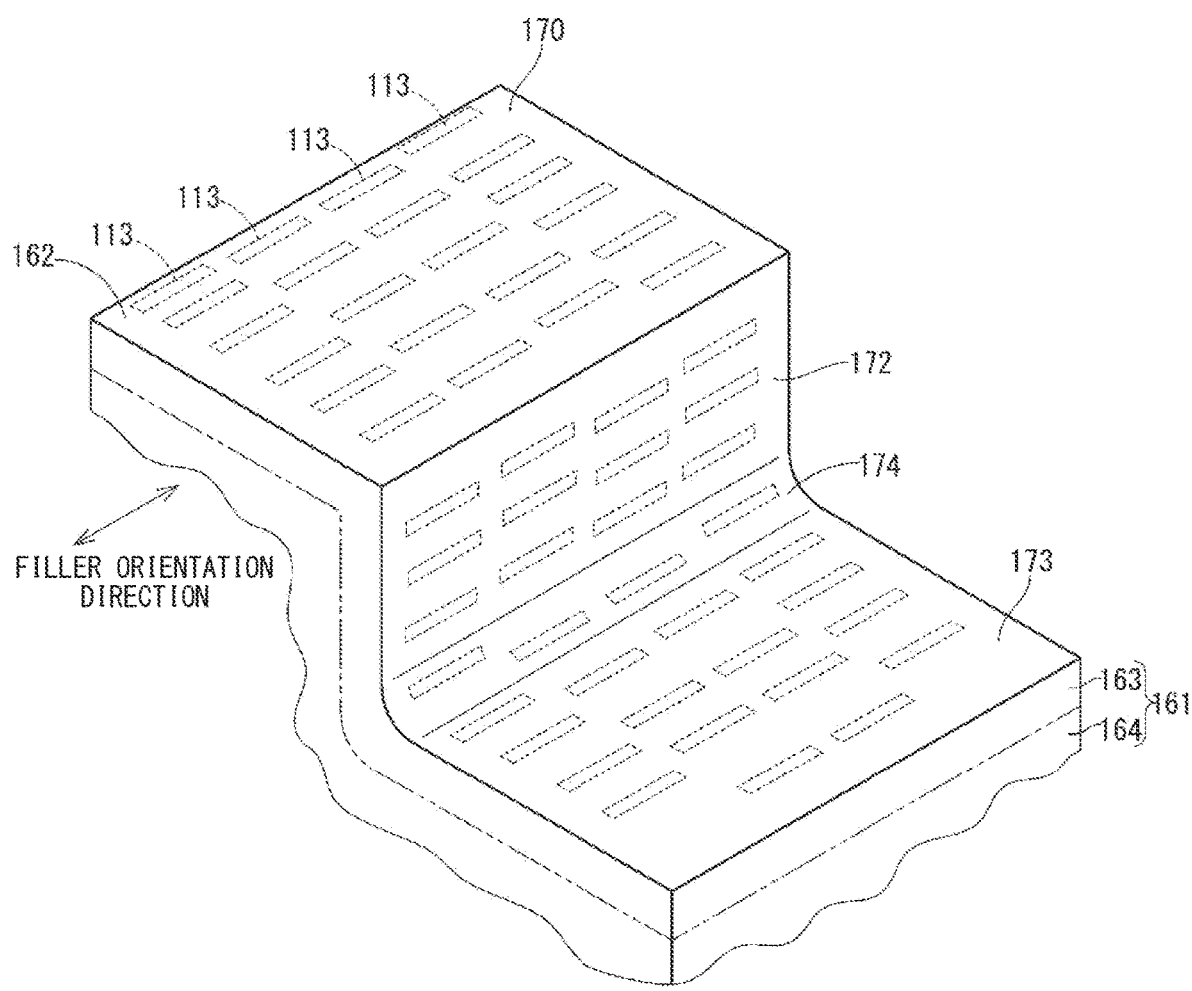
FIG. 70 is a perspective view of a base prepared in a preparing step in FIG. 69.

As shown in FIG. 69, the method for manufacturing the resin member 10 includes a preparing step P1, a chamfering step P2, and a carbonization step P3. In the preparing step P1, as shown in FIG. 70, a base portion 161 having three surfaces crossing with each other (i.e., the first surface 170, the second surface 171, and the third surface 172) are prepared. The chamfered surface 174 has been formed at a portion at which the third surface 172 and the second surface 171 cross with each other. In contrast, a portion at which the first surface 170 and the second surface 171 cross with each other is sharp without being chamfered (i.e., the sharp corner without being chambered).

Figure 71:
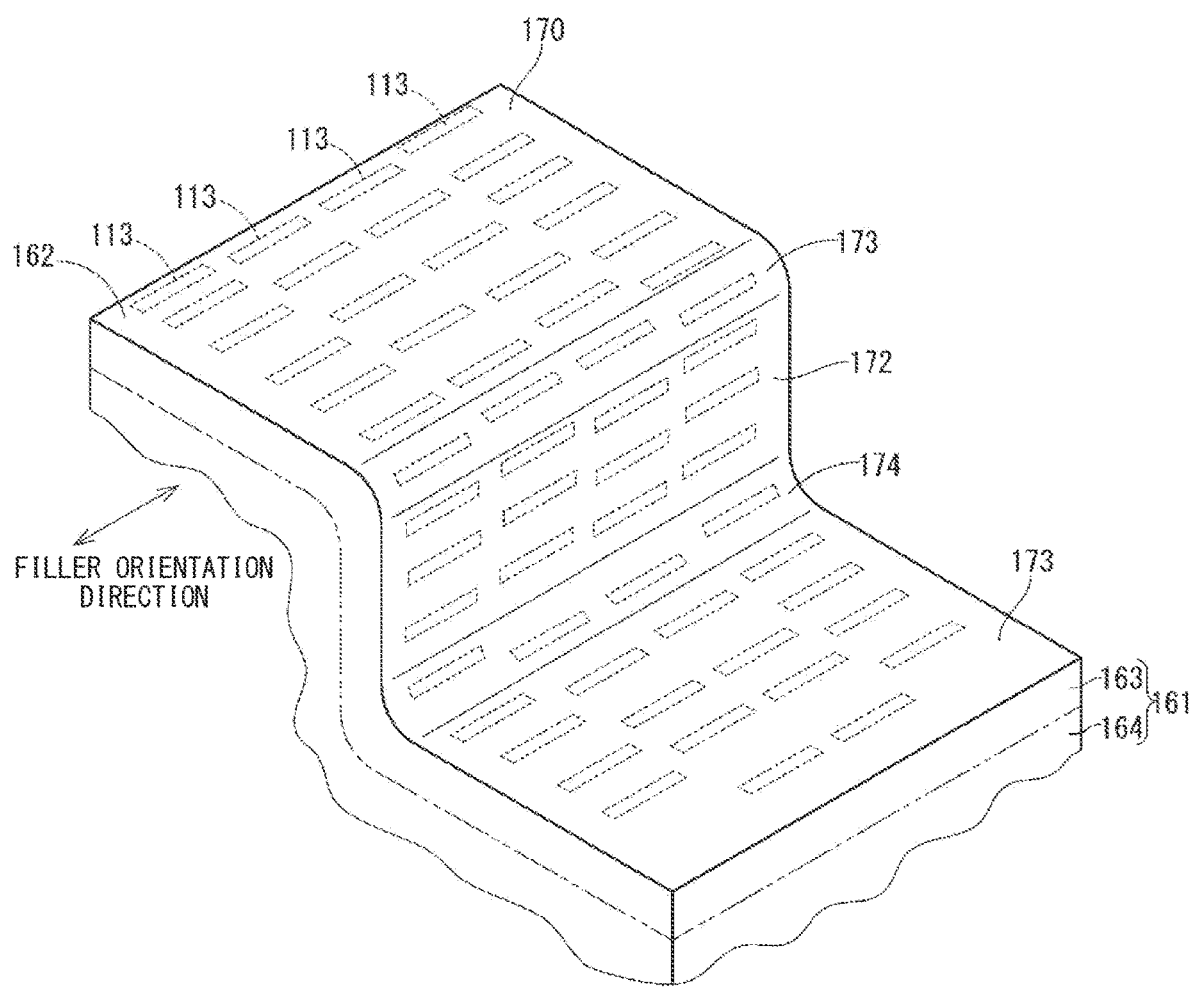
FIG. 71 is a perspective view of the base having been chamfered in a chamfering step in FIG. 69.

In the chamfering step P2, as shown in FIG. 71, the chamfered surface 173 is formed by chamfering a portion at which the first surface 170 and the second surface 171 cross with each other. The chamfering is performed by removing the sharp corner through the laser irradiation.

Figure 72:
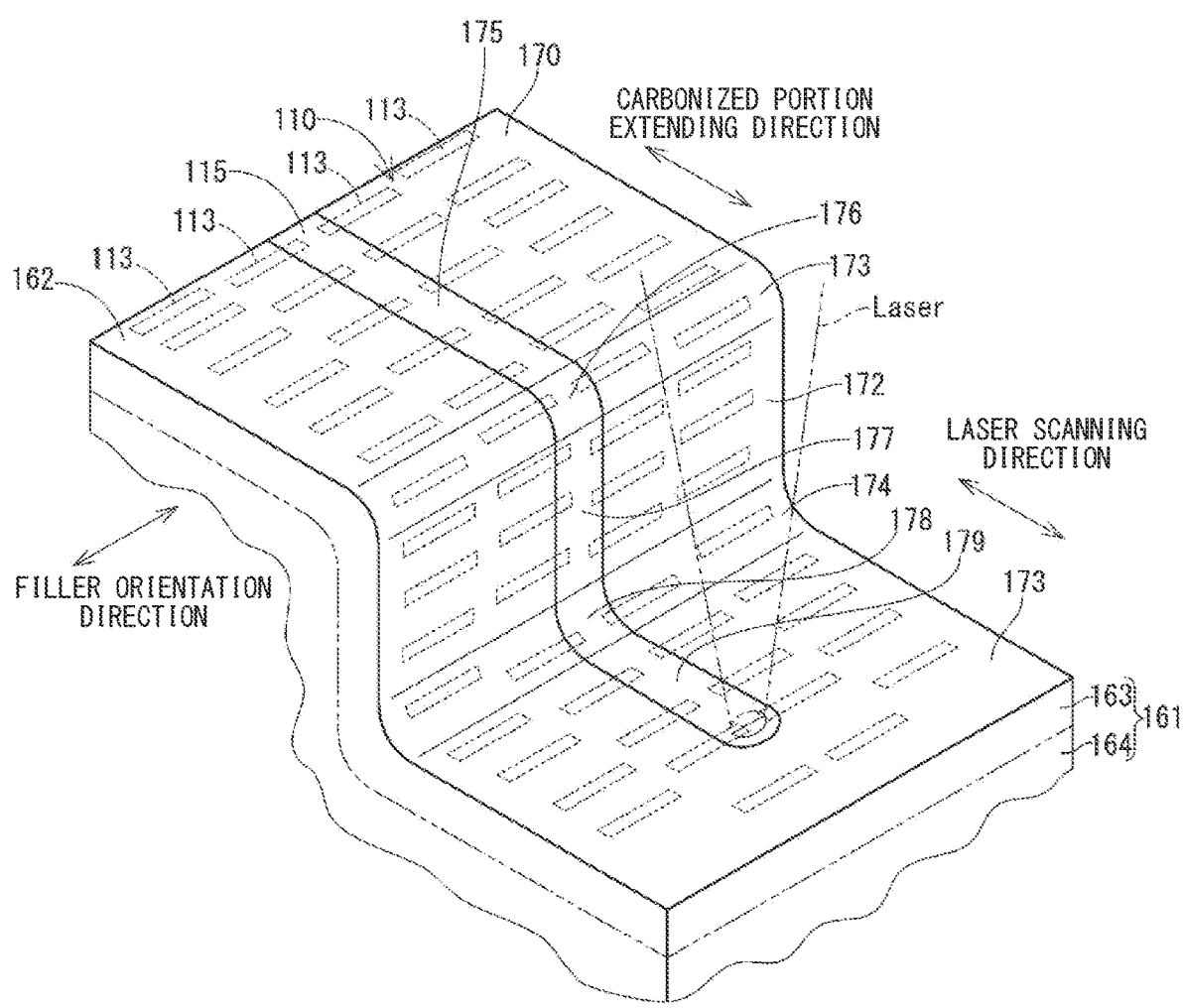
FIG. 72 is a perspective view illustrating a state in which the base is irradiated with laser in a carbonization step in FIG. 69.

In the carbonization step P3, as shown in FIG. 72, the base portion 161 is heated such that, as the carbonized portion 115, the first carbonized portion 175 that is extending along the first surface 170, the second carbonized portion 176 that is extending along the second surface 171, and the connecting carbonized portion 178 that is extending along the chamfered surface 173 and that is connecting the first carbonized portion 175 to the second carbonized portion 176 is formed on the outer surface 162 of the base portion 161. In addition, the base portion 161 is heated such that, as the carbonized portion 115, the third carbonized portion 177 that is extending along the third surface 172 and the connecting carbonized portion 179 that is extending along the chamfered surface 174 and that is connecting the third carbonized portion 177 to the second carbonized portion 176 are formed on the outer surface 162 of the base portion 161.

A manufacturing method in which the first carbonized portion 175, the second carbonized portion 176, and the third carbonized portion 177 are firstly formed and then the connecting carbonized portions 178 and 179 are formed will be described. In such manufacturing method, the first carbonized portion 175 and the second carbonized portion 176 may not be connected to each other through the connecting carbonized portion 178 and the second carbonized portion 176 and the third carbonized portion 177 may not be connected to each other through the connecting carbonized portion 179 at a time when the carbonized portion 115 is formed.

In contrast, in the sixteenth embodiment, in the carbonization step P3, the base portion 161 is continuously heated from the first surface 170 to the second surface 171 over the chamfered surface 173 such that the first carbonized portion 175 and the second carbonized portion 176 are connected to each other through the connecting carbonized portion 178. The base portion 161 is continuously heated from the second surface 171 to the third surface 172 through the chamfered surface 174 such that the second carbonized portion 176 and the third carbonized portion 177 is connected to each other through the connecting carbonized portion 179. Thus, at a time when the carbonized portion 115 has been formed, the first carbonized portion 175 and the second carbonized portion 176 are surely connected to the connecting carbonized portion 178 and the second carbonized portion 176 and the third carbonized portion 177 are surely connected to the connecting carbonized portion 179.

Seventeenth Embodiment

Figure 73:
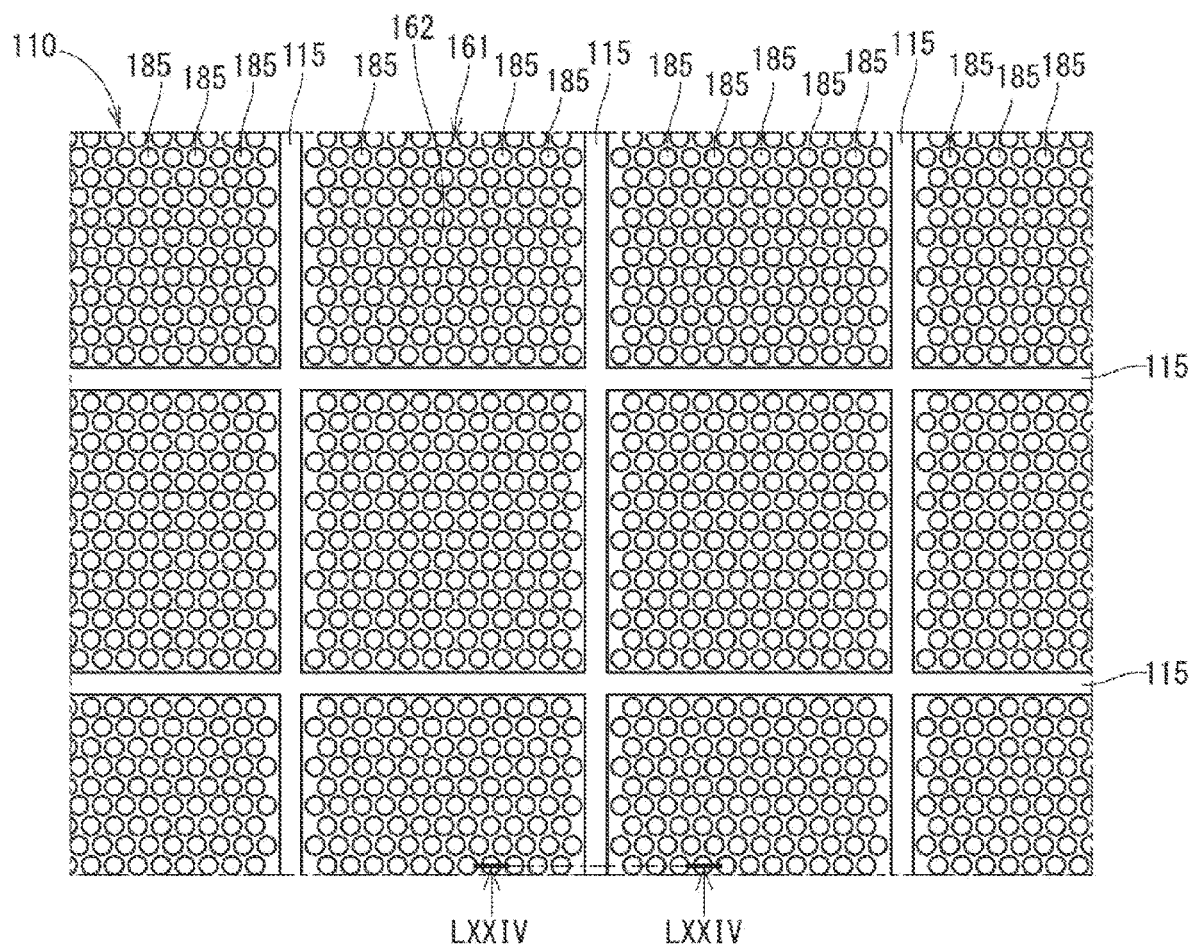
FIG. 73 is an enlarged photograph of a front surface of a resin member in a seventeenth embodiment.
Figure 74:
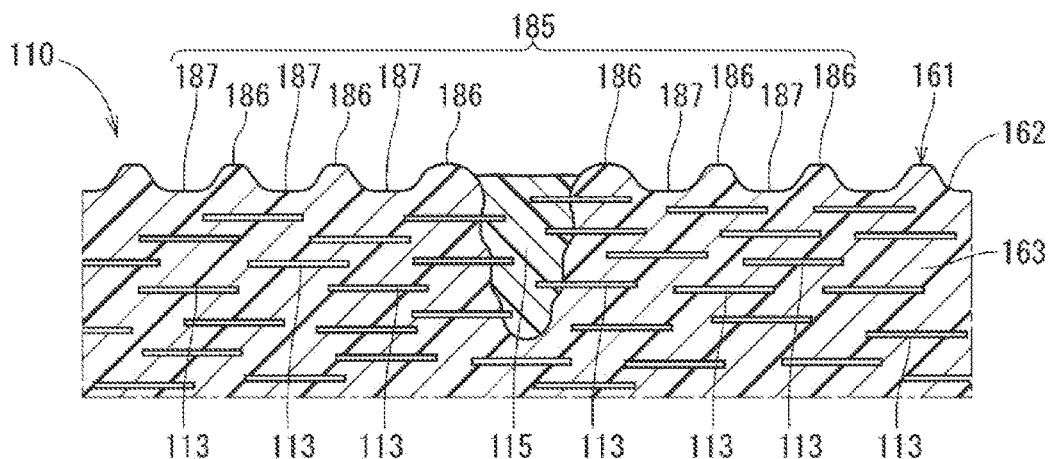
FIG. 74 is a cross-sectional view taken along a line LXXIV-LXXIV in FIG. 73.

In a seventeenth embodiment, as shown in FIGS. 73 and 74, the carbonized portion 115 is formed into a lattice shape. The carbonized portion 115 may be located on an outer wall surface of the housing of an electronic device such as an air flowmeter and a rotation angle sensor and used as a static electricity removing circuit.

The outer surface 162 of the base portion 161 includes deformation marks 185 that extend along an outer peripheral part of the carbonized portion 115. The deformation marks 185 are marks generated by deforming a part of the base portion 161. In the seventeenth embodiment, the deformation marks 185 are melting and solidified marks generated by being melted and solidified. In other embodiment, the deformation marks 185 may be removal marks generated by laser processing, mechanical processing such as polishing, and dissolution processing with solution. When foreign matters generated when the carbonized portion 115 is formed are attached to the base portion 161, the foreign matters can be removed from the base portion 161 in forming the deformation marks 185. The deformation marks 185 can avoid deteriorating a design of the base portion 161 due to the foreign matters.

The deformation marks 185 include foamed portions 186 generated by foaming at least a part of the base portion 161 and multiple dotted recesses 187 located on the outer surface 162 of the base portion 161. The foamed portions 186 and the dotted recesses 187 are deformation marks that can be generated by heating the base portion 161.

Figure 75:
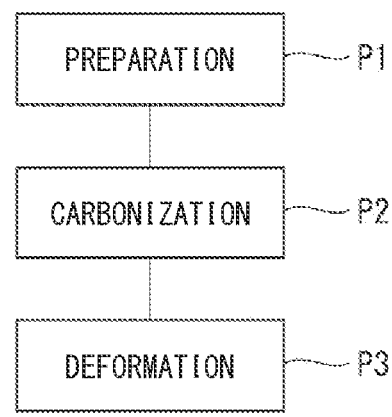
FIG. 75 is a step diagram illustrating a method for manufacturing the resin member in the seventeenth embodiment.

As shown in FIG. 75, the method for manufacturing the resin member 10 includes a preparing step P1, a carbonization step P2, and a deformation step P3. In the deformation step P3 following the carbonization step P2, at least a part of the base portion 161 is deformed such that the deformation marks 185 extend along the peripheral part of the carbonized portion 115 on the outer surface 162 of the base portion 161. In the deformation step P3, at least a part of the base portion 161 and at least a part of the carbonized portion 115 are heated such that the deformation marks 185 are formed on the outer surface 162 of the base portion 161. The temperature of heating in the deformation step P3 is lower than the heating temperature of the base portion 161 in the carbonization step P2.

When foreign matters generated through the heating in the carbonization step P2 are remained attached to the outer surface 162 of the base portion 161, the foreign matters may restrict the carbonized portion 115 from discharging.

In contrast, in the seventeenth embodiment, the foreign matters attached to the base portion 161 can be removed by burning the foreign matters or the like in the deformation step P3.

When the carbonized portion 115 include a portion attached to the base portion 161 with an unstable posture, the flowability of the electric charge in the carbonized portion 115 is changed by changing the posture of the portion. In this case, the electric conductivity of the carbonized portion 115 is changed in accordance with the posture of the portion, and thus the electric conductivity may be unstable.

In contrast, in the seventeenth embodiment, not only the base portion 161 but also a part of the carbonized portion 115 are removed when the deformation marks 185 are formed. In this time, a portion of the carbonized portion 115 having unstable posture is more likely to be removed than a portion of the carbonized portion 115 having a stable posture. That is, in the deformation step P3, not only the base portion 161 but also the carbonized portion 115 are heated, thereby removing the portion of the carbonized portion 115 having unstable posture through heating and combustion. Thus, the electric conductivity of the carbonized portion 115 is restricted from changing and can be stabilized.

In addition, by performing a trimming that removes a part of the carbonized portion 115, a resistance value of the carbonized portion 115 can be adjusted to a predetermined value.

In the carbonization step P2, the carbonized portion 115 is formed by irradiating the base portion 161 with the electromagnetic wave such as laser beam and heating the base portion 161. In the deformation step P3, the deformation marks 185 are formed by irradiating the base portion 161 with the electromagnetic wave at a lower intensity (i.e., a lower output), a higher scanning rate, and a lower frequency than those in the carbonization step P2.

As described above, both of the carbonized portion 115 and the deformation marks 185 are formed through electromagnetic irradiation. Thus, a work load for forming the carbonized portion 115 and the deformation marks 185 can be reduced. For example, in a configuration in which the carbonization step P2 and the deformation step P3 are successively performed, it is needed to operate once a process in which the base portion 161 is placed relative to a device that is configured to transmit electromagnetic wave.

When laser is used to form the deformation marks 185, the resin may be foamed and changed in color depending on an energy of the laser, which may be intentionally used as the design. When laser is used to form the deformation marks 185, it is preferable to use a pulse laser because the pulse laser is appropriate for removal processing. By using the pulse laser, the dotted recesses 187 can be periodically formed.

Hereinafter, multiple practical examples will be described. These practical examples are examples in which a short time processing is performed using laser beam having a relatively high output in view of obtaining both of economic efficiency and conductivity. However, the present disclosure is not limited to this. In order to improve the conductivity, a long time processing may be performed using laser beam having a relatively low output. In this case, the heating rate becomes gentle and the conductivity is expected to be further improved.

Example 1

Figure 76:
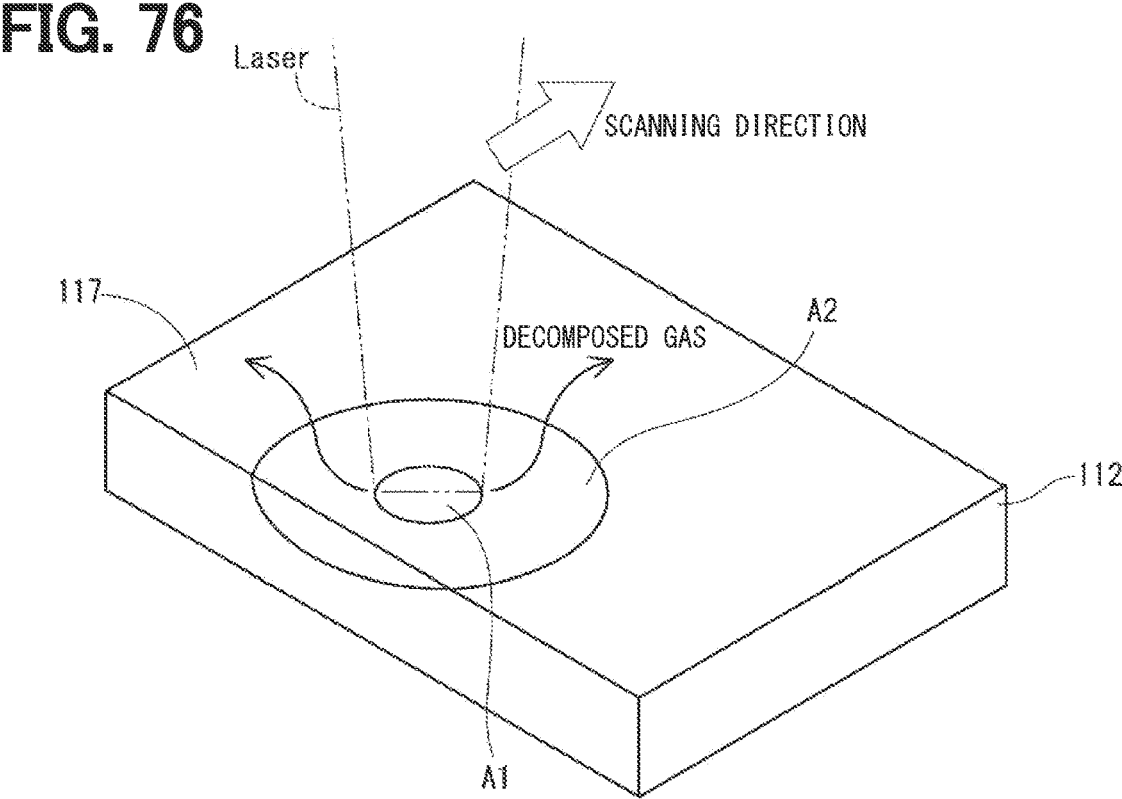
FIG. 76 is a perspective view illustrating a state of an initial stage in which an oriented layer of a molding is irradiated with laser beam in a carbonization step of a practical example 1.
Figure 77:
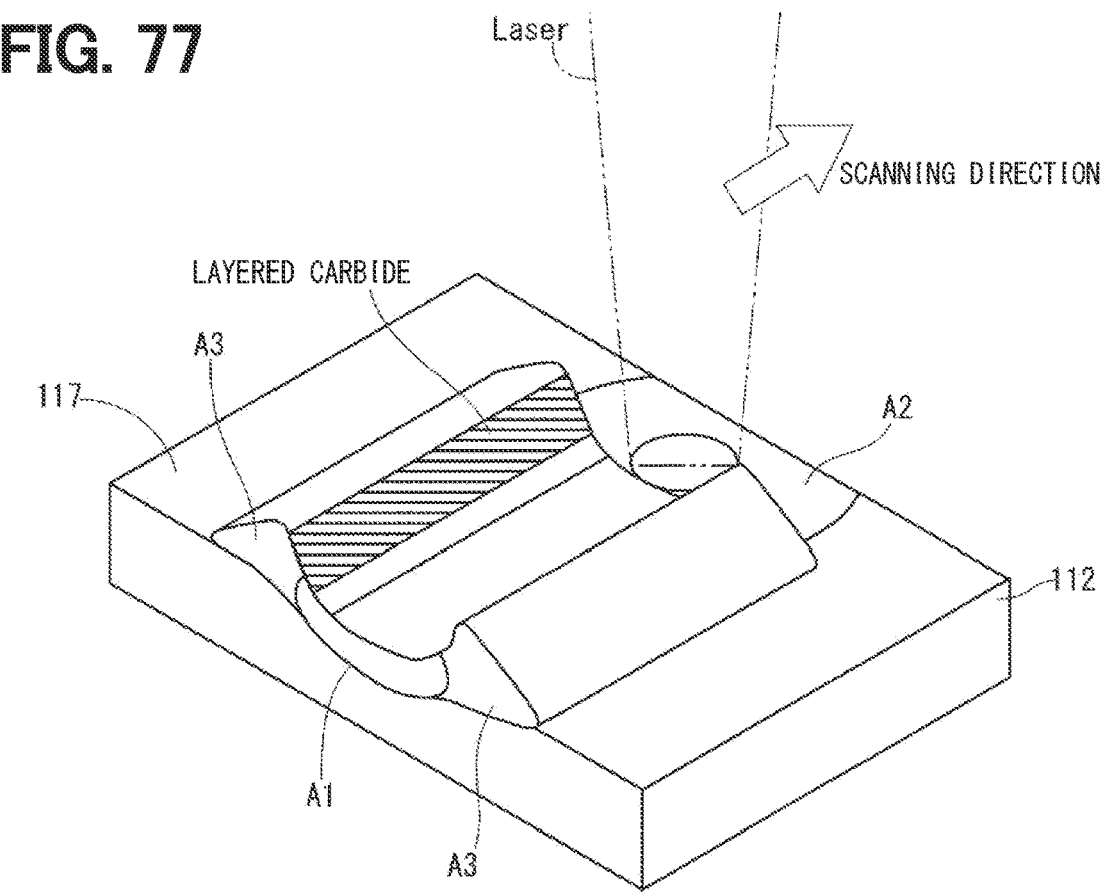
FIG. 77 is a perspective view illustrating a state of a final stage in which the oriented layer of the molding is irradiated with laser beam in the carbonization step of the practical example 1.

In example 1, as shown in FIG. 76, the molding 117 is configured with an insulation resin member having a volume resistivity equal to or greater than 1013 Ωm. The insulation resin member is generated by adding 40 wt % of glass fibers as fillers to a base polymer that contains polyphenylenesulfide as a main component. The oriented layer 112 is formed in a range of the depth equal to or greater than 0.3 mm from a surface of the molding 117. The molding 117 has a flat plate shape having both width and depth of 80 mm and a thickness of 3 mm. The focusing distance of a semiconductor laser is adjusted to near the just focus relative to the surface of the molding 117. As shown in FIGS. 76 and 77, a predetermined portion of the oriented layer 112 on the surface of the molding 117 having a straight length of 40 mm is scanned with the semiconductor laser that has an oscillation wavelength of 940 nm and the focusing diameter of 0.6 mm at a rate of 50 mm/s with an output of 100 W under argon gas atmosphere having a pressure of 0.15 MPa. As a result, the part of the oriented layer 112 is carbonized.

As shown in FIGS. 76 and 77, the temperature of the portion of the oriented layer 112 irradiated with the laser beam (hereinafter, referred to as a first region A1) is increased to the temperature from 2300° C. to 2500° C. and high-temperature decomposition gas is actively generated. In this case, the portion of the oriented layer 112 is expanded since the resin member is foamed, but the expanded portion is evaporated and removed with the laser beam. Thus, the recess is formed in the first region A1 and the carbonized material in the recess has a porous structure.

Along with this, due to thermal conduction from the first region A1 heated to the high temperature and high-temperature decomposition gas generated in the first region A1, a temperature of a peripheral part of the first region A1 is increased to a temperature of 1800° C. to 2200° C. As a result, the peripheral part of the first region A1 is carbonized to form a second region A2.

Figure 78:
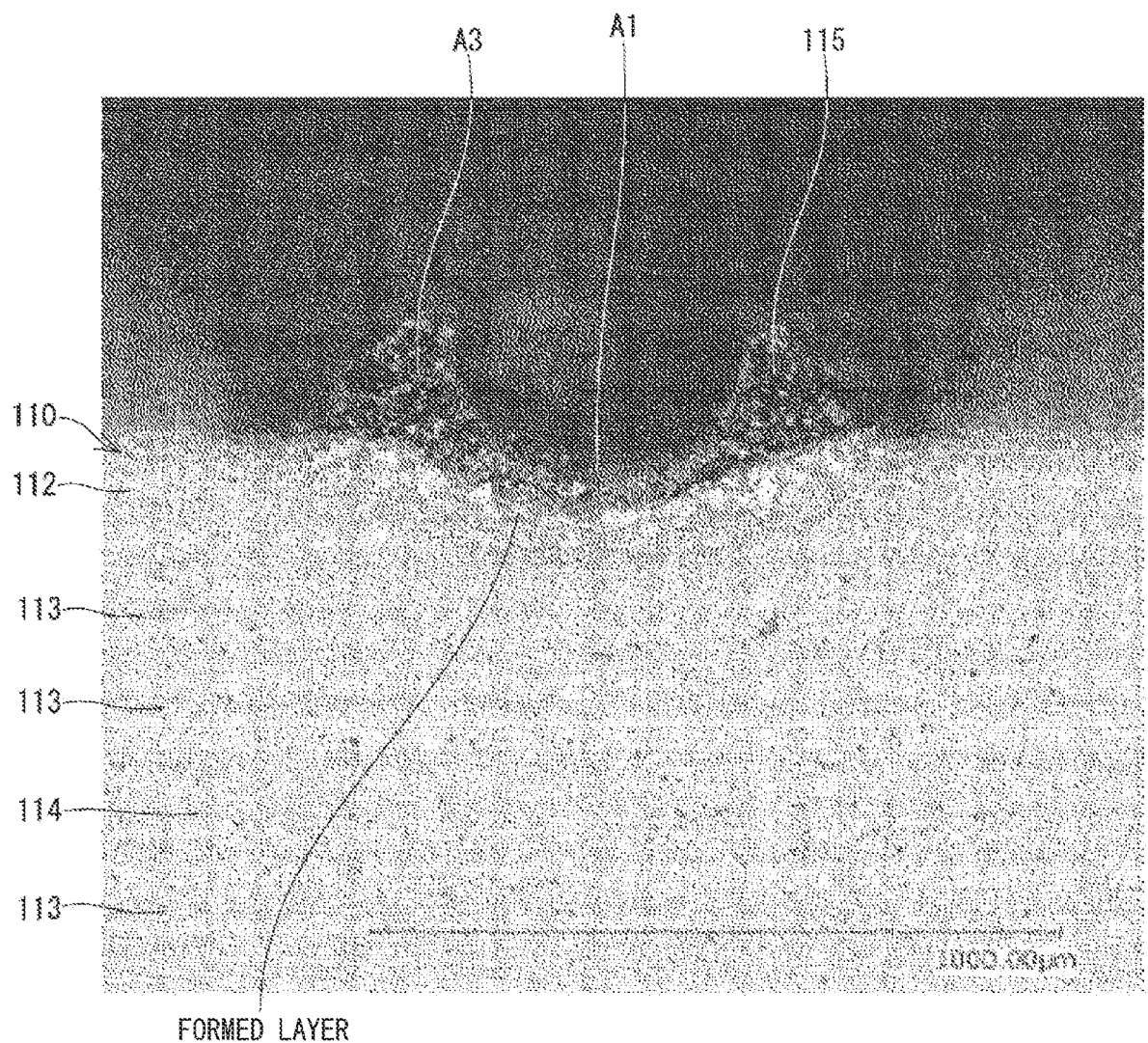
FIG. 78 is a photograph of an end of a carbonized portion formed on the oriented layer in the carbonization step in the practical example 1.
Figure 79:
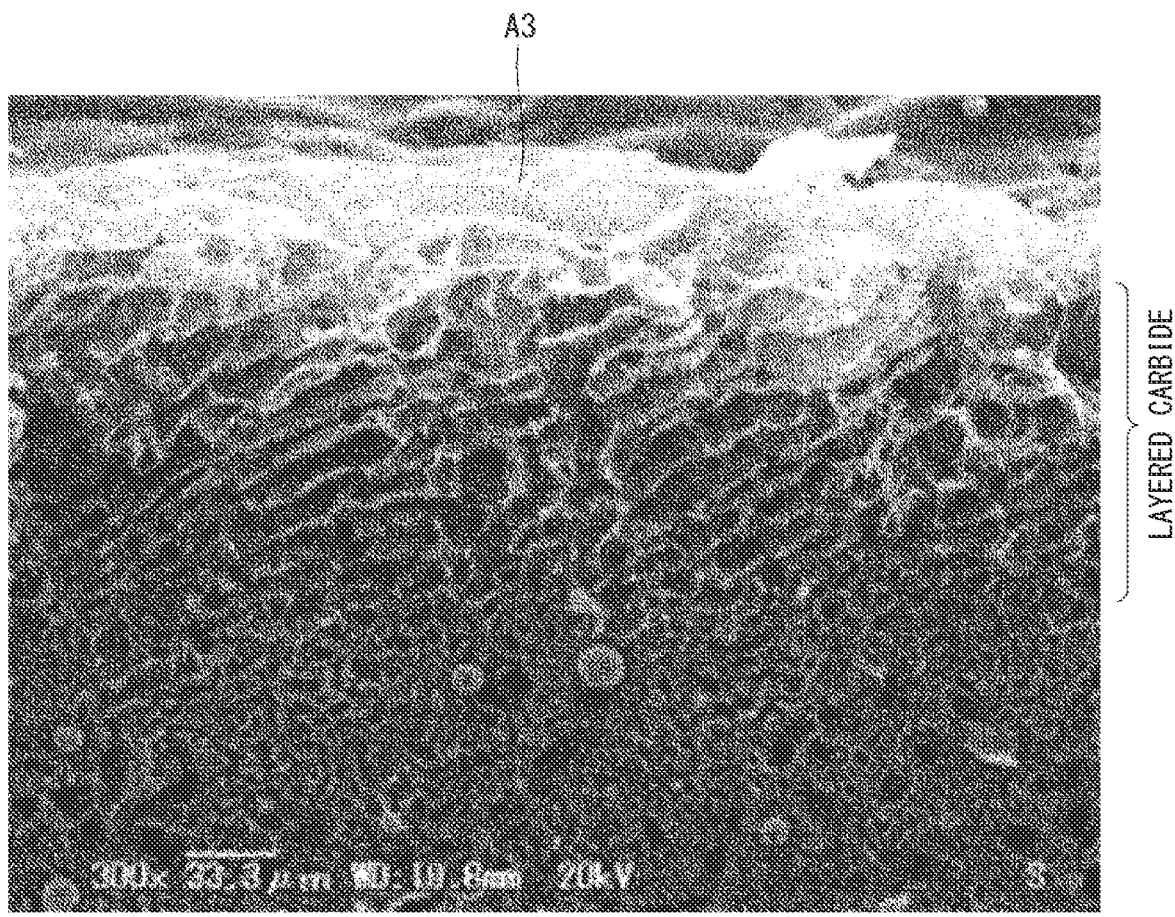
FIG. 79 is a photograph of a carbonized layer in a third region of a carbonized portion formed on the oriented layer in the carbonization step in the practical example.

Since the second region A2 is offset from the scanning orbit of the laser beam, the laser beam does not directly reach the second region A2. A portion that is carbonized by receiving a temperature of decomposition gas (hereinafter, referred to as a third region A3) is less likely to evaporate and be removed. Thus, the third region A3 becomes a protrusion due to the foaming and volume expansion (see FIG. 78). In the third region A3, the fillers are oriented before the carbonization. Reflecting this orientation state, a carbonized structure was formed in a state where at least 10 layers extending in the surface direction were formed (see FIG. 79).

Figure 80:
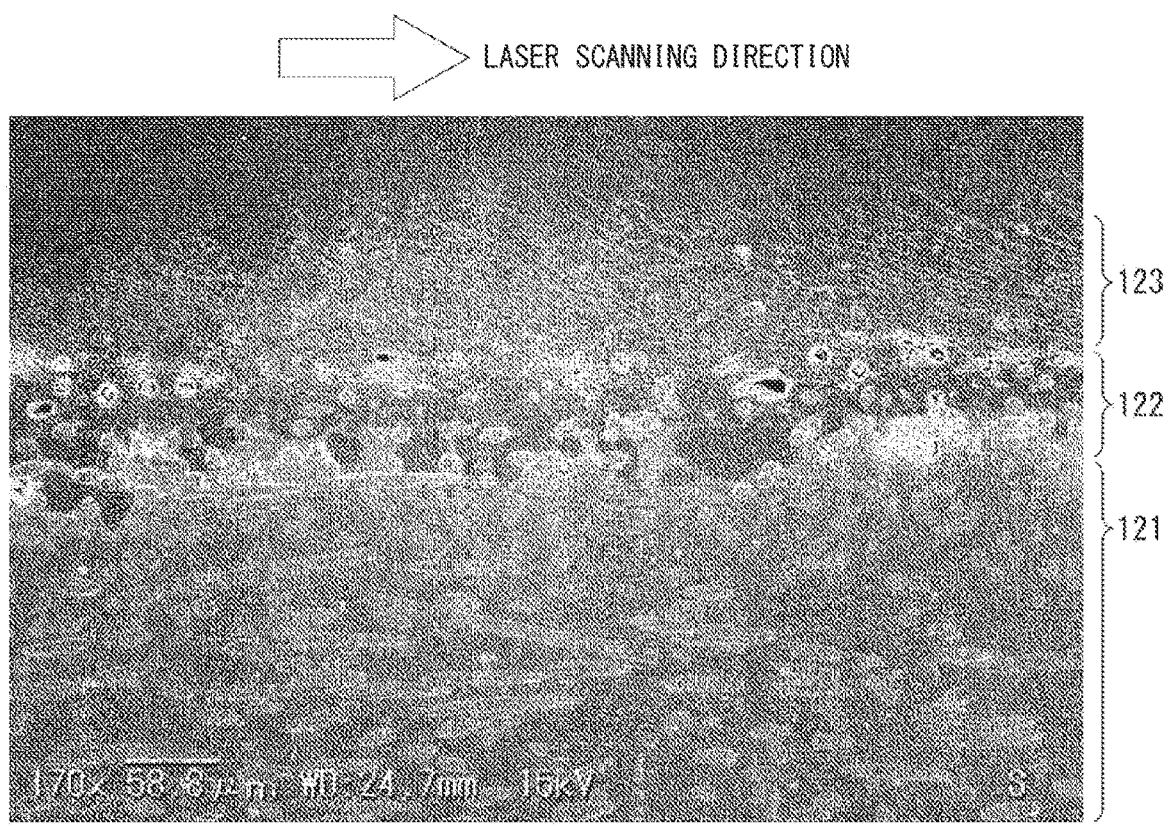
FIG. 80 is a photograph of a cross section of the carbonized material of a resin member in the third region taken along a trajectory of the laser beam, the resin member as a whole after the carbonization step being fixed with a casting material made of epoxy resin.

In FIG. 80, a first layer 121, a foamed second layer 122, and a third layer 123 are observed. The first layer 121 is made of a resin material in which fillers 113 are oriented. The foamed second layer 122 is located on the first layer 121. The third layer 123 is located on the foamed second layer 122 and has layered carbonized material as described above. In a range of 100 μm in a normal line direction of the third layer 123, at least 10 layers of the carbonized material can be observed. At a lower part of the first region A1 and the third region A3, the foamed second layer 122 at which the resin is foamed is located.

In FIG. 80, a direction in which the fillers 113 are oriented is the same with a direction in which the carbonized material is formed, but it is necessary that the fillers 113 be oriented in a predetermined main direction of the surface of the resin member and the main direction may extend any direction on the surface of the resin member. For example, the fillers 113 may be oriented in a direction perpendicular to a plane of paper in FIG. 80. An angle formed between the layer of the carbonized material and the surface of the resin member is defined by a position that is firstly carbonized and expanded depending on the scanning direction of the laser beam. The layer of the carbonized material is formed such that an upstream side of the carbonized material on the laser orbit in the laser scanning direction is located on an upper side of the surface (i.e., a far side from the surface) with a slight angle.

In example 1, the conductive pattern formed in the first region A1 and the third region A3 had a straight linear shape having a width of 0.9 mm, a depth of 0.12 mm, and a length of 40 mm. The depth is a depth of a carbonized portion from the surface of the resin member in the thickness direction. When a commercially available silver paste was applied and cured at both ends of the conductive pattern and the electric resistance value at the center of 20 mm was measured, the electric resistance value at the both ends was 97.1 $\Omega$.

The conductive pattern formed in the first region A1 and the third region A3 was covered and fixed with a casting material made of epoxy resin. After it is confirmed that the electric resistance value of the whole did not change, cross-section polishing was performed to remove the carbonized material formed in the first region A1 to form a sample. According to relations between the electric resistance value, length, and cross-sectional shape, the electric conductivity of the carbonized material formed in the first region A1 and the electric conductivity of the carbonized material formed in the third region A3 are compared to each other. As a result, the carbonized material formed in the first region A1 has the electric conductivity that is three times or more than the electric conductivity of the carbonized material formed in the third region A3.

Raman spectroscopic analysis was performed on the third region A3 and peaks at 1580 cm$^{-1}$ (G band) and 1360 cm$^{-1}$ (D band) were observed. As a result, the peak intensity ratio of the G band and the D band (I1580/I1360) was 1.61.

The produced carbonized material was oxidized in nitric acid having a concentration of 60% at room temperature for 5 minutes and the nitric acid was rinsed with distilled water. The obtained portion is sufficiently dried in a constant temperature bath at 50° C. The electric resistance was measured in the similar manner as described above to find that the electric conductivity was reduced by 30%.

Example 2

In example 2, the molding was formed using an insulation resin material having a volume resistivity of 1013 $\Omega$m or more in a similar manner in the example 1. The insulation material is configured with a base polymer containing a polyphenylenesulfide as a main component without including fillers. The carbonization is performed in the similar to that in example 1. In this case, the carbonized material was violently scattered and the carbonized material was not fixed. After that, the electrical resistance was measured in the similar manner to that in the example 1 to find that the electrical conductivity was at least equal to or greater than 50 M$\Omega$. The electric resistance was measured multiple times with changing the output of the laser beam to 5 W, 10 W, 50 W, 100 W, 150 W, and 200 W, but the electric resistance was equal to or greater than 50 M$\Omega$ in all conditions.

Example 3

A molding is formed using a conductive resin member having a volume resistivity of 10 $\Omega$m in a similar manner to that in example 1. The conductive resin member is generated by adding 30 wt % of carbon fibers as the fillers to a base polymer containing polyphenylenesulfide as a main component. The carbonization is performed in a similar manner to that in example 1 and a conductive pattern similar to that in example 1 is formed. The electric resistance was measured in a similar manner to that in example 1 to find that the electric resistance was 21.8$\Omega$. The volume resistivity of the conductive pattern was roughly estimated from the length, cross-sectional shape, and electric resistance value as 8.4× 10$^{-5}$ $\Omega$m.

Example 4

Figure 81:
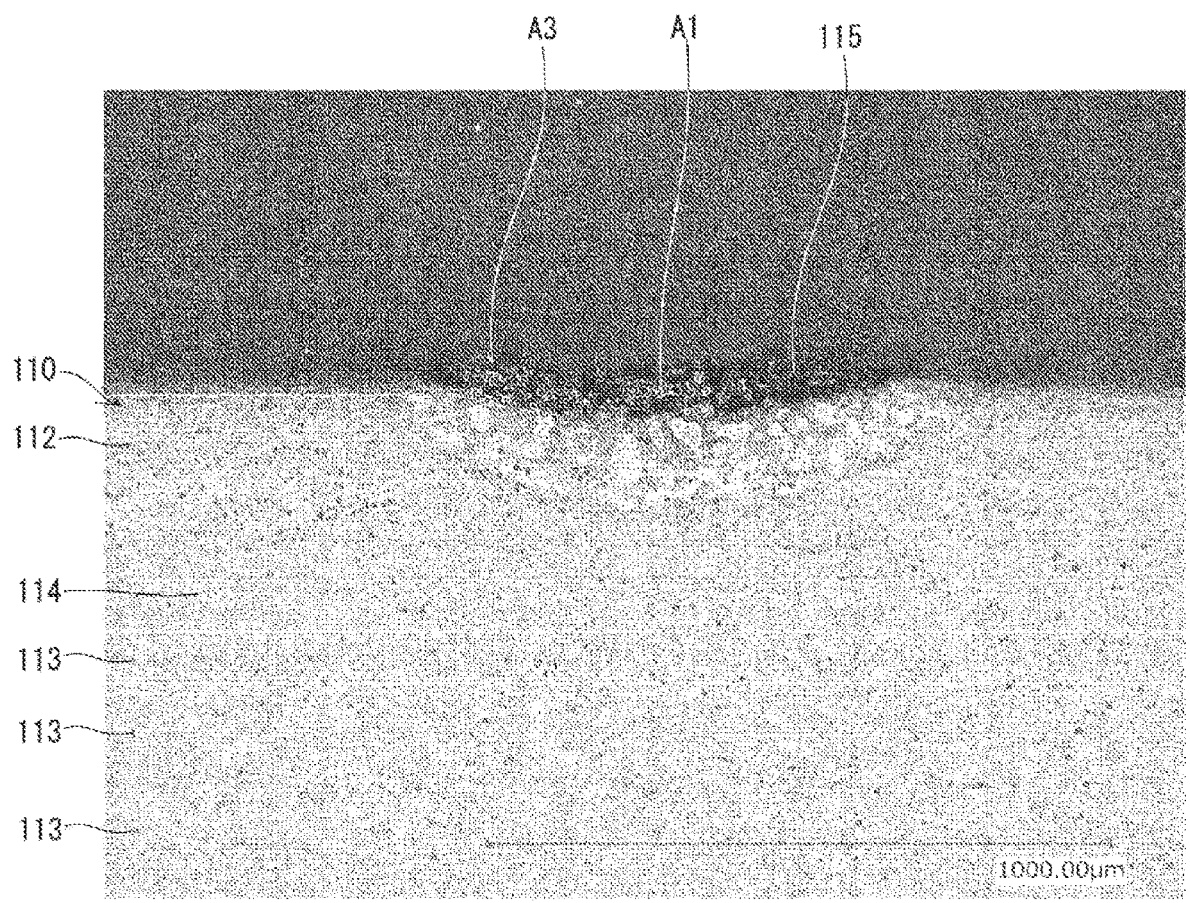
FIG. 81 is a photograph of an end of the carbonized portion formed on the oriented layer in a carbonization step in a practical example 4.

The carbonized material is formed in the same manner as that in example 1 except for changing the pressure of the atmosphere during the laser beam irradiation to 0.001 MPa that is a decompression atmosphere. The temperature of the generated decomposition gas was rapidly decreased and the layers of the carbonized materials are rarely formed in the third region A3 (see FIG. 81). The generated wiring pattern in this time has a straight linear shape having a width of 0.6 mm, a depth of 0.05 mm, and a length of 40 mm. The depth is a depth of a carbonized portion of the resin member from the surface of the resin member in the thickness direction. When a commercially available silver paste was applied and cured on both ends of the conductive pattern and the electric resistance value at the center of 20 mm was measured, the electric resistance value at both ends was 1124 $\Omega$.

Example 5

Figure 82:
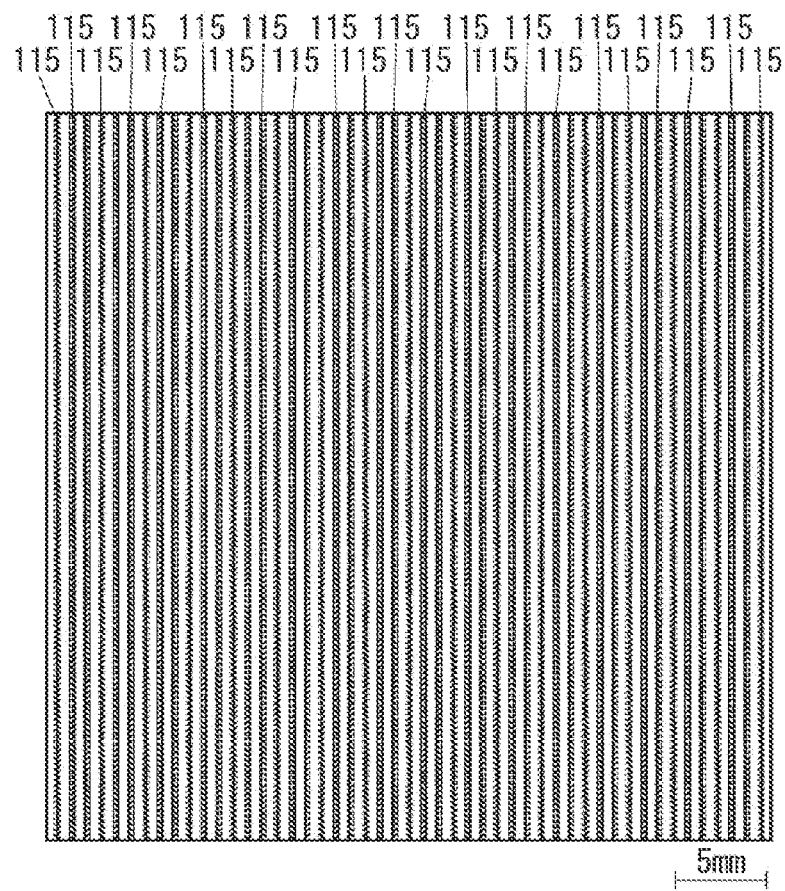
FIG. 82 is a schematic view of a carbonized portion formed on the oriented layer in the carbonization step in a practical example 5.

As shown in FIG. 82, 50 lines of the carbonized portions each having a straight linear shape and a length of 40 mm were formed in the similar manner to that in the example 1. The 50 lines of the carbonized portions are formed by displacing the scanning orbit of the laser beam by 0.8 mm in a direction perpendicular to the surface direction each after forming one line of the carbonized portions. As a result, the carbonized portions were linearly and electrically connected to each other and a conductive pattern having a 40 mm square shape was formed. The electric conductivity of the carbonized material generated at this time was about the same as that of the carbonized material generated in example 1. The surface became uneven similarly to that in example 1.

Example 6

The molding is formed in the similar manner to that in example 1 using an insulation resin material having a volume resistivity of equal to greater than 1013 $\Omega$m. The insulation resin material is formed by adding total 66 wt % of fillers consisting of 33 wt % of glass fibers and 33 wt % of calcium carbide to the base polymer that contains polyphenylenesulfide as a main component. The carbonized treatment was performed in the similar manner to that in example 1 to form the wiring pattern similar to that in example 1. The electric resistance was measured in the same way in example 1 to find that the electric resistance was 1270 Ω.

Example 7

The molding was formed in the similar manner to that in example 1 using an insulation resin material having a volume resistivity of equal to greater than 1013 Ωm. The insulation resin material is formed by adding 30 wt % of glass fibers as fillers to the base polymer that contains polyphenylenesulfide as a main component. The carbonization was performed in the similar manner to that in example 1 to form a wiring pattern similar to that in example 1. The electric resistance was measured in the same way in example 1 to find that the electric resistance was 139.3 Ω.

Example 8

The molding was formed in the similar manner to that in example 1 using an insulation resin material having a volume resistivity that is equal to or greater than 1013 Ωm. The insulation resin material is formed by adding 45 wt % of glass fibers as the fillers to the base polymer that contains polyphenylenesulfide as a main component. The carbonization was performed in the similar way to that in example 1 to form a wiring pattern similar to that in example 1. The electric resistance was measured in the same way in example 1 to find that the electric resistance was 169.1 Ω.

Example 9

The molding was formed with compression molding using an insulation resin material having a volume resistivity that is equal to or greater than 1013 Ωm. The insulation resin material is formed by adding total 50 wt % of fillers consisting of 35 wt % of glass fibers and 15 wt % of other inorganic fillers to the base polymer that contains phenol resin as a main component. The carbonization was performed in the similar manner to that in example 1 to form a pattern that has a width of 0.75 mm, a depth of 0.05 mm, and a length of 40 mm. The depth is a depth of a carbonized portion of the molding from the surface of the resin member in the thickness direction. The electric resistance was measured in a section of 20 mm in the same way in example 1 to find that the electric resistance was 171.2 Ω.

Example 10

The molding was formed with injection molding using the same insulation resin material in example 9. The carbonization was performed in the similar manner to that in example 1 to form a wiring pattern similar to that in example 9. The electric resistance was measured in a section of 20 mm in the similar way to that in example 1 to find that the electric resistance was 133.3 Ω.

Example 11

The carbonized material was formed in a same method in example 1 except for that the atmospheric pressure during the laser irradiation was 1.0 MPa (i.e., pressurized atmosphere). As a result, the electrical conductivity of the conductive pattern was improved by 30% compared to that in example 1.

Example 12

The molding was formed in the similar manner to that in example 1 and wet polishing was performed from the surface of the molding by 1.5 mm in the thickness direction to remove the oriented layer. The obtained molding was sufficiently dried. The carbonized material was formed on the dried surface of the resin member in the similar way to that in eleventh example to form a conductive pattern similar to that in example 1. The electric resistance was measured in a section of 20 mm in the same way to that in example 1 to find that the electric resistance was 558 Ω.

Example 13

Figure 83:
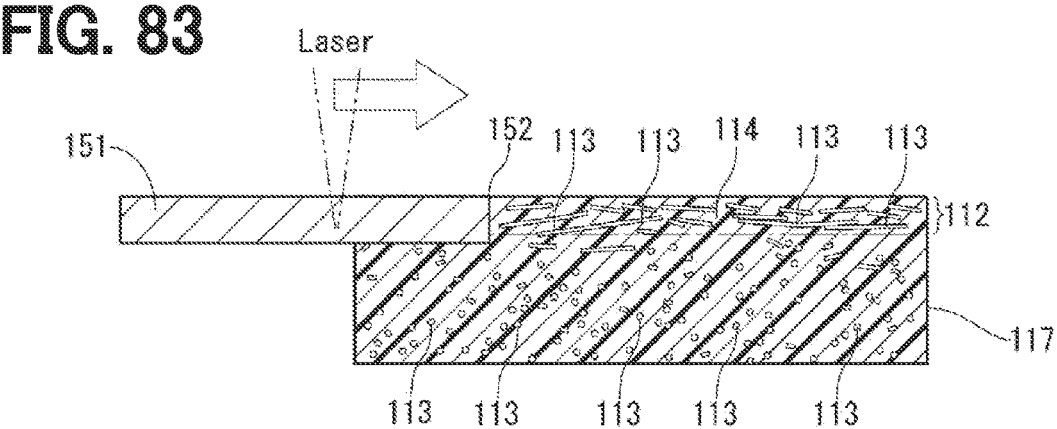
FIG. 83 is a cross-sectional view illustrating a state in which a contact interface between the oriented layer of the molding and a metal member is irradiated with laser beam in a carbonization step of a practical example 13.
Figure 84:
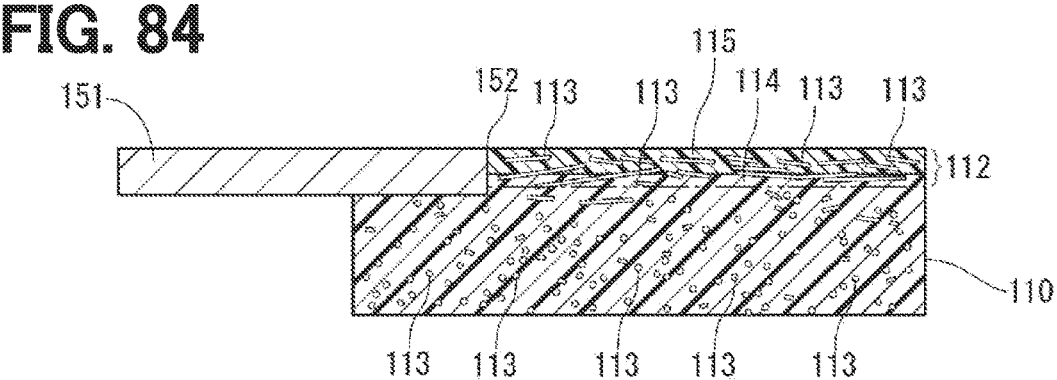
FIG. 84 is a cross-sectional view illustrating a state in which the contact interface between the oriented layer and the metal member is carbonized in the practical example 13.

As shown in FIG. 83, the carbonized portion 115 as shown in FIG. 84 is formed by closely contacting the oriented layer 112 of the molding 117, which was formed in the similar manner to that in example 1, with a metal member 151 made of iron, copper or brass, and by irradiating a contact boundary 152 between the oriented layer 112 and the metal member 151 with the laser beam under the same condition as that in example 1. Sufficient conduction was secured between the carbonized portion 115 and the metal member 151.

Example 14

Figure 85:
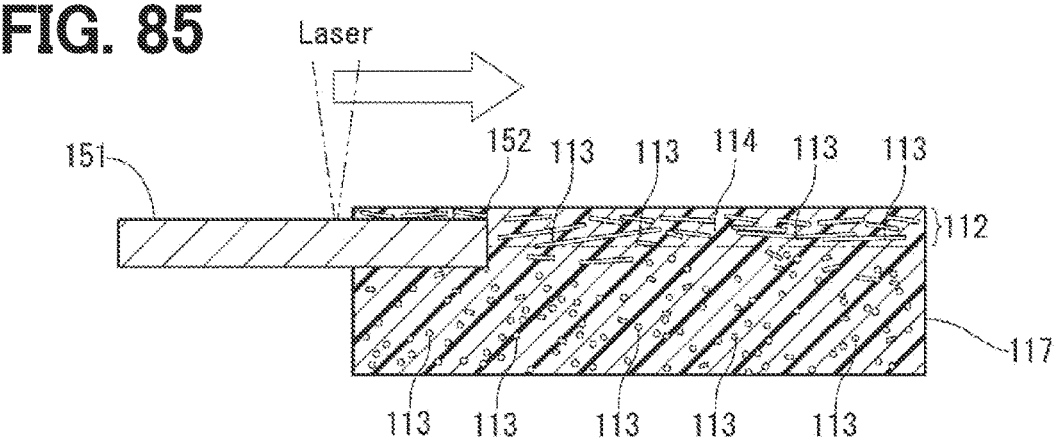
FIG. 85 is a cross-sectional view illustrating a state in which a contact interface between an oriented layer of a molding and a metal member is irradiated with laser beam in a carbonization step of a manufacturing method in a practical example 14.
Figure 86:
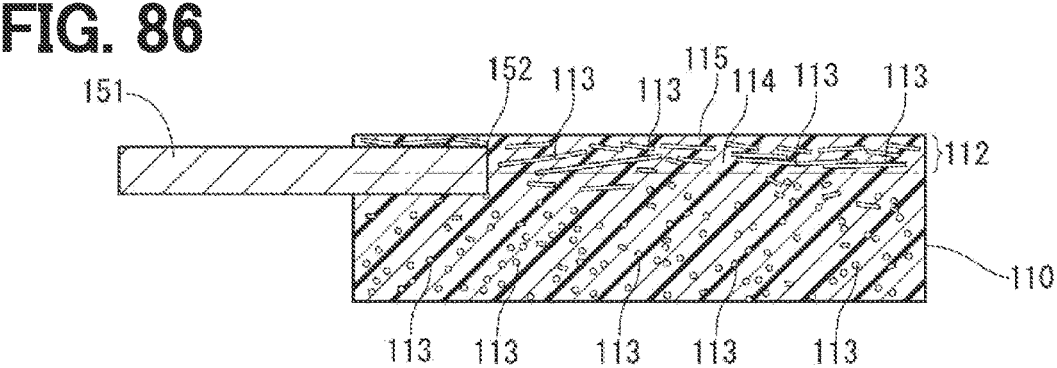
FIG. 86 is a cross-sectional view illustrating a state in which the contact interface between the oriented layer and the metal member is carbonized in the practical example 14.

As shown in FIG. 85, the carbonized portion 115 as shown in FIG. 86 is formed by thinning a predetermined part of the molding 117 using the same insulation material as that in example 1 to a thickness of about 0.1 mm, closely contacting the thin part with the metal member 151, and irradiating the thin part of the molding 117 with the laser beam toward the metal member 151 in the thickness direction under the same condition as that in example 1. The carbonized portion 115 corresponding to the predetermined portion having the thin portion is in contact with the metal member 151 in the thickness direction and sufficient conduction was secured between the carbonized portion 115 and the metal member 151.

When the carbonized portion is formed at the contact boundary between the oriented layer of the molding and the metal member, the heat source for carbonizing the oriented layer may be obtained not only by heating the resin in the oriented layer but also by heating the metal member.

The metal member used in the above-described method is not limited, but particularly good connection and conduction can be obtained by selecting the metal with which carbon is likely to form a solid solution such as nickel, bismuth, and iron. Particularly, nickel is effective because by using nickel, a catalytic action works at the boundary and high quality graphite can be formed. The above-described method is also effective in the case that the metal such as iron forms the conductive material by reacting with carbon depending on the temperature and the supplied amount of the carbon. Further, these metal species may be attached to the surface of the metal member by plating and the like.

Example 15

The carbonized materials formed in examples 1 to 14 were covered with a casting material made of epoxy resin. In this case, the electric conductivity of the carbonized materials were not changed and the resin members having good electric conductive pattern therein were obtained.

Other Embodiments

In other embodiments, a portion on which the non-insulation portion is formed is not limited to the surface of the housing and may be inside of the housing. For example, the portion may be a portion of the inner part of the housing that is hidden after welding.

In other embodiments, the ground connecting terminal is not limited to the intake air temperature terminal and may be other portion such as an intake pipe. In short, the ground connecting terminal is connected to the ground 45 and able to discharge the electric charge to the ground 45.

Figure 33:
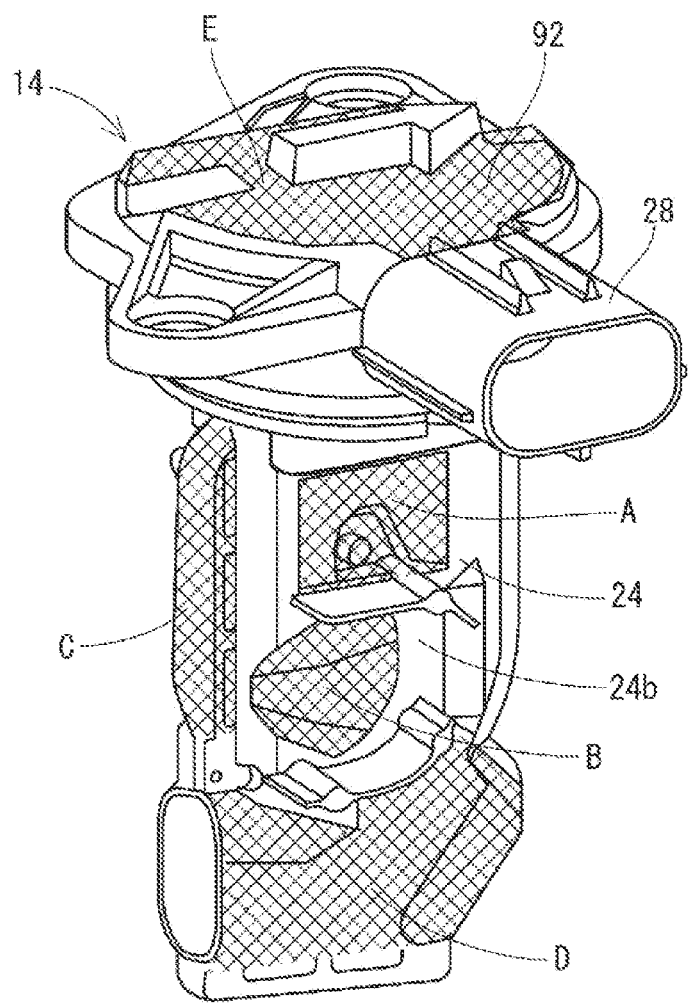
FIG. 33 is a schematic view illustrating positions on which the non-insulation portion is formed in other embodiment.

In other embodiment, the graphitization processing through laser irradiation may be performed on a partial area or multiple areas. As shown in FIG. 33, the non-insulation portion 90 may be formed more than one of parts of the outer wall 24$b$ of the bypass housing 24 that are a part A corresponding to the flow rate detector, a part B corresponding to the measuring outlet portion, a part C corresponding to the discharge passage, and a part D corresponding to flow passage. The non-insulation portion 90 may be formed on a part E of the outer wall 92$a$ of the outside main passage housing 92.

In other embodiments, the carbonized portion is not limited to a pattern shape and may be formed in a film shape. In this case, a dense conductive film can be formed on the surface of the resin member as compared with a resin member in which conductive fillers are mixed and dispersed in a resin material to impart conductivity. Therefore, it is possible to impart a more excellent electromagnetic wave shielding property to the resin member. It is possible to improve both the electrical conductivity and thermal conductivity of a thick resin member having a thickness of more than 300 μm, and to improve the electromagnetic wave shielding property.

In other embodiments, the carbonized portion is not necessarily provided on a position separated from the core layer. That is, the carbonized portion may be provided so as to reach from the skin layer to the core layer. In the core layer, the orientations of the fillers are likely to be irregular, but the carbonized portion is restricted from falling off from the base portion because at least a part of the fillers enters into the carbonized portion.

In other embodiment, a carbonized portion may be formed in a planar shape in a range including the entire outer surface of the resin member, and the carbonized portion may be provided so as to reach from the skin layer to the core layer. In that case, the base portion is composed of only the core layer.

In other embodiment, the electrical resistance value may be adjusted by adjusting the additive amount of the fillers and the heating condition. The resultant with the electrical resistance adjusted may be used as a resistor or a heater inside an electric device.

In other embodiment, electroplating may be performed using, as an electrode, the carbonized material formed on the surface of the resin member to improve both the electrical conductivity and thermal conductivity. Additionally, an oxidizing treatment may be performed using an oxidant to improve the electrical conductivity.

In other embodiment, to form a complicated conductive pattern, the conductive pattern may be formed on any surface of the molding. For example, a through hole may be defined in the molding and conductive patterns may be formed on both side surfaces of the molding. Then, the conductive patterns on the both side surfaces may be electrically connected to each other by carbonizing an inside of the through hole or inserting a current-carrying member into the through hole.

Figure 87:
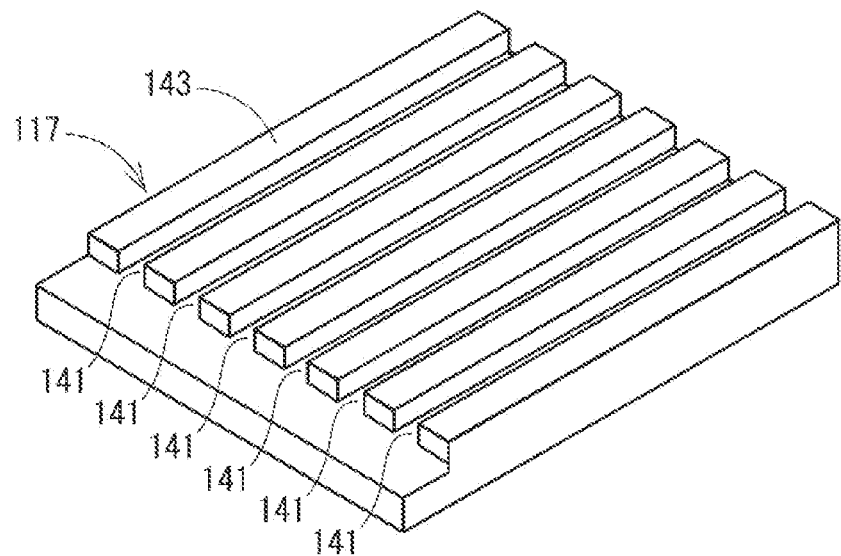
FIG. 87 is a perspective view of a molding in other embodiment.
Figure 88:
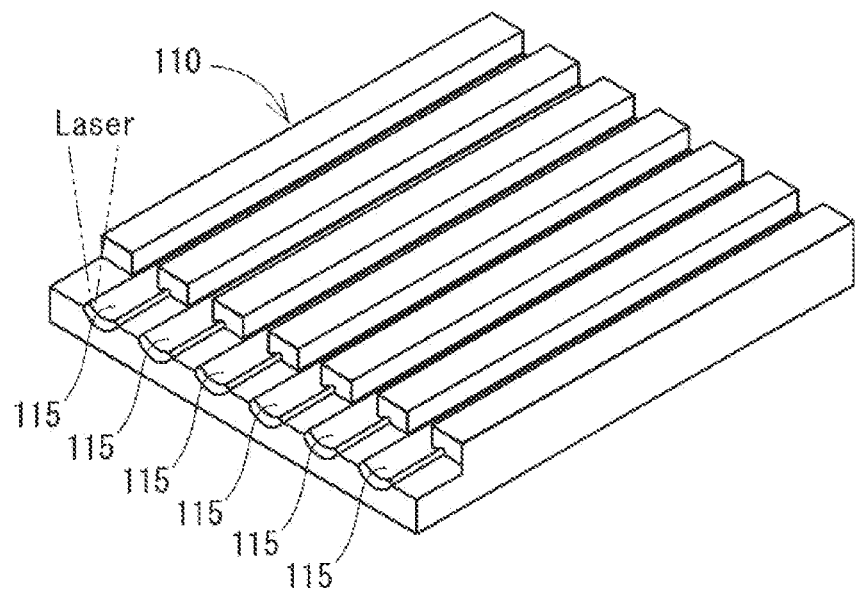
FIG. 88 is a perspective view of a molding including a carbonized portion in other embodiment.
Figure 89:
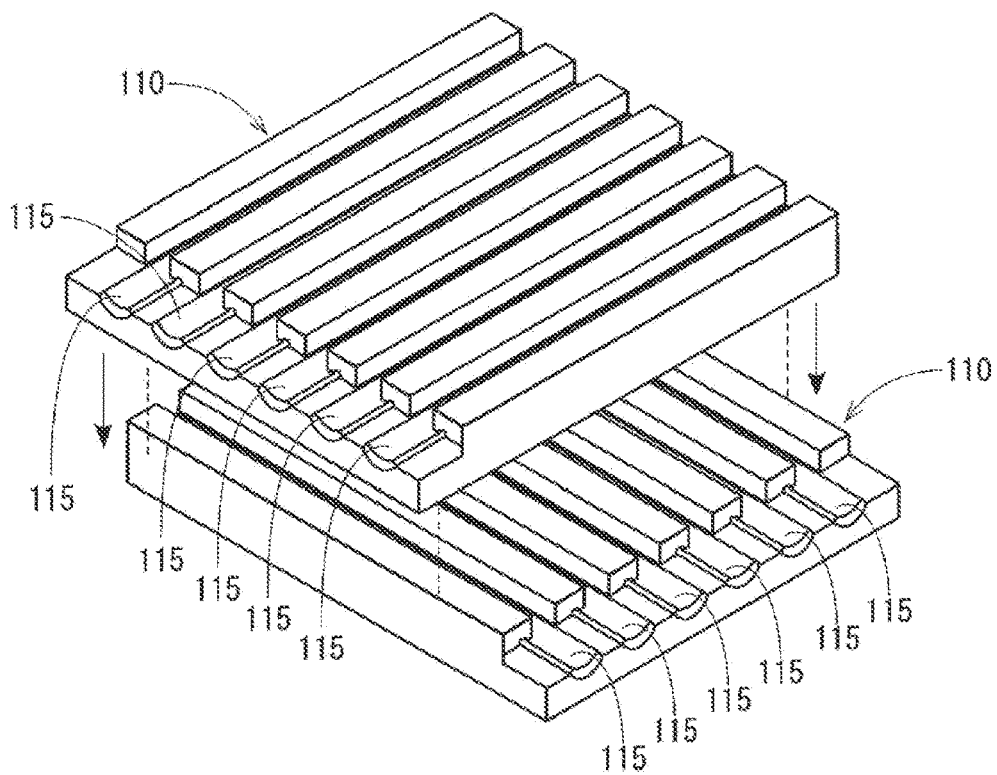
FIG. 89 is a perspective view illustrating a state in which multiple resin members are combined in other embodiment.
Figure 90:
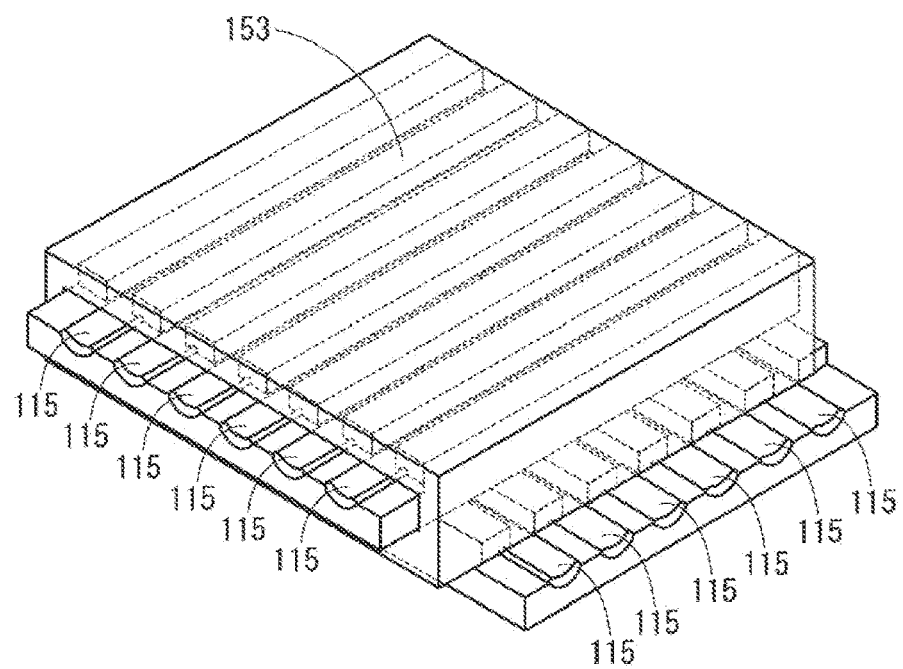
FIG. 90 is a perspective view of multiple resin members including covered portion in other embodiment.

In other embodiment, to form a more complicated crossover, the molding 117 molded as shown in FIG. 87 is prepared and carbonized portions 115 are formed on predetermined positions of the molding 117 in a similar way shown in FIG. 88 to form the resin member 110. Then, as shown in FIG. 89, multiple resin members 110 may be prepared and integrally molded by engagement of press-fitting or snap-fitting, adhesion, welding, insert molding, or the like. In order to restrict the carbonized material from falling off, as shown in FIG. 90, a covering portion 153 for fixing the periphery of the carbonized material may be formed by insert molding, potting, application of a hardening material, other coating, or the like. At this time, some of the fillers pass through the carbonized material and are exposed to the outside of the resin members 110. Therefore, the exposed portions of the fillers enter into the covering portion 153, which is the secondary molding, to improve the adhesion between the resin members 110 and the covering portion 153.

In other embodiment, in order to prevent the carbonized material from falling off, a part of the resin forming the molding may be heated and melted to seal the carbonized material. A laser beam may be used as the heat source at this time.

Figure 91:
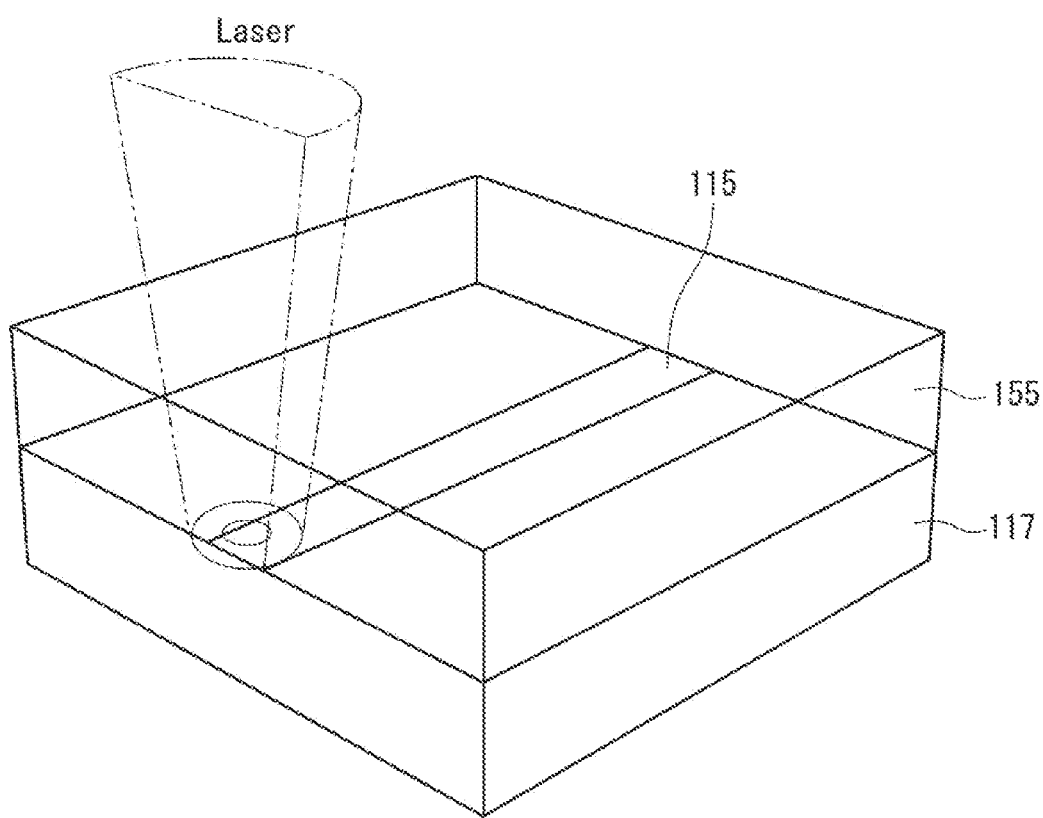
FIG. 91 is a perspective view illustrating a state in which a molding is irradiated with laser beam through a transmitting material in other embodiment.

In other embodiment, a layer of a material (i.e., transmitting material) that transmits a laser beam is formed on the surface of the molding 117 before carbonization, and the molding 117 is irradiated with the laser beam through the transmitting material 155 as shown in FIG. 91. Thereby, the carbonized portion 115 is formed between the molding 117 and the transmitting material 155. At this time, for example, it is preferable to dispose a porous layer between the molding 117 and the transmitting material 155 or to form irregularities on the surface of the molding 117 or the transmitting material 155 so that a passage through which decomposition gas is released is defined.

In order to ensure conduction between the generated carbonized material and the other metal member, it is possible to contact simply the carbonized material with the metal member. However, in other embodiment, a conductive adhesive such as silver paste or carbon paste, melting metal such as solder, or the like may be disposed between the carbonized material and the metal member.

In other embodiment, processing such as deburring or printing of the resin member may be performed with a laser used in the carbonization step.

The present disclosure has been described based on the embodiments. However, the present disclosure is not limited to the embodiments and structures. The present disclosure also encompasses various modifications and variations within the scope of equivalents. Furthermore, various combination and formation, and other combination and formation including one, more than one or less than one element may be made in the present disclosure.

What is claimed is:

1. A flowmeter configured to measure a flow rate of a gas flowing through a main passage, the flowmeter comprising:
 a housing that is made of a resin and includes a bypass passage branched off from the main passage;
 a flow rate detector that is disposed in the bypass passage and transmits detection signals in accordance with the flow rate of the gas flowing through the main passage; and
 a ground connecting portion attached to an outer wall of the housing and connected to a ground, wherein
 the housing includes a non-insulation portion including graphite,
 the bypass passage includes a flow passage that extends through the housing in a flow direction of the gas flowing in the main passage, and a measuring passage branched from an intermediate part of the flow passage, the measuring passage includes a detection passage where the flow rate detector is disposed, an introduction passage extending from the flow passage to the detection passage to introduce the gas into the detection passage from the flow passage, and a discharge passage extending from the detection passage to a measuring outlet opening to discharge the gas from the detection passage, the non-insulation portion is formed on the outer wall of the housing such that the non-insulation portion covers the flow passage, the introduction passage and an inlet of the detection passage, and the non-insulation portion extends to a position near the ground connecting portion.

2. The flowmeter according to claim 1, wherein the non-insulation portion is a portion that is irradiated with electromagnetic wave.

3. The flowmeter according to claim 2, wherein the electromagnetic wave is laser.

4. The flowmeter according to claim 1, wherein the housing includes a bypass housing that is disposed in the main passage and defines the bypass passage therein, and the bypass housing includes the non-insulation portion.

5. The flowmeter according to claim 4, wherein the bypass housing includes an inner wall defining the bypass passage, and the non-insulation portion is formed on the inner wall.

6. The flowmeter according to claim 4, wherein the bypass housing includes an outer wall, and the non-insulation portion is formed on the outer wall.

7. The flowmeter according to claim 1, wherein the housing includes an outside main passage housing that is disposed at a position outside of the main passage, and the non-insulation portion is formed in the outside main passage housing.

8. The flowmeter according to claim 1, further comprising a sensor holder that is made of a resin and holds the flow rate detector, wherein the non-insulation portion is formed on the sensor holder.

9. The flowmeter according to claim 1, wherein the non-insulation portion is connected to a constant potential.

10. The flowmeter according to claim 9, wherein the constant potential is a ground potential or power potential.

11. The flowmeter according to claim 1, wherein the non-insulation portion has a surface specific resistance that is equal to or less than 1012 Ω/sq.

12. The flowmeter according to claim 1, wherein the housing includes a bypass housing protruding inward in the main passage, the bypass housing includes the non-insulation portion, the non-insulation portion is formed on an outer wall of the bypass housing, the flow passage extends through the bypass housing at a distal end of the bypass housing facing inward of the main passage, the introduction passage extends in the bypass housing from the flow passage toward a proximal end of the bypass housing facing outward of the main passage, and the discharge passage extends in the bypass housing from the detection passage toward the distal end of the bypass housing.

13. The flowmeter according to claim 1, wherein the non-insulation portion is electrically connected to the ground connecting portion.

14. A physical quantity measuring device configured to measure a physical quantity of a fluid flowing through a main passage, the physical quantity measuring device comprising:

a housing that contains at least a resin and defines a bypass passage through which the fluid flows;

a physical quantity detector configured to transmit detection signals in accordance with the physical quantity of the fluid flowing through the bypass;

a ground connecting portion attached to an outer wall of the housing and connected to a ground; and an electrical conductive portion that is disposed on an outer surface of the housing, that contains a carbonized material to have an electrical conductivity, and that discharges an electric charge to the ground through the ground connecting portion, the bypass passage includes a flow passage that extends through the housing in a flow direction of the fluid flowing in the main passage, and a measuring passage branched from an intermediate part of the flow passage, the measuring passage includes a detection passage where the flow rate detector is disposed, an introduction passage extending from the flow passage to the detection passage to introduce the fluid into the detection passage, and a discharge passage extending from the detection passage to a measuring outlet opening to discharge the fluid from the detection passage, the electrical conductive portion is formed on the outer wall of the housing such that the electrical conductive portion covers the flow passage, the introduction passage and an inlet of the detection passage, and the electrical conductive portion extends to a position near the ground connecting portion.

15. The physical quantity measuring device according to claim 14, further comprising a pair of terminal protruding from the outer surface of the housing, wherein one of the pair of terminal is the ground connecting portion.

16. The physical quantity measuring device according to claim 14, wherein the ground connecting portion is disposed on one side portion of the outer surface of the housing, and the electrical conductive portion is disposed only on the one side portion of the housing.

* * * * *